US010564646B2

United States Patent
Kuhara

(10) Patent No.: US 10,564,646 B2
(45) Date of Patent: Feb. 18, 2020

(54) AUTONOMOUS MOBILE ROBOT

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 93 days.

(21) Appl. No.: 15/669,321

(22) Filed: Aug. 4, 2017

(65) Prior Publication Data
US 2018/0059681 A1    Mar. 1, 2018

(30) Foreign Application Priority Data

Sep. 1, 2016 (JP) .................. 2016-170730
Apr. 28, 2017 (JP) .................. 2017-089560

(51) Int. Cl.
*G05D 1/02* (2006.01)
*A47L 9/28* (2006.01)

(52) U.S. Cl.
CPC .......... *G05D 1/0274* (2013.01); *A47L 9/2852* (2013.01); *A47L 9/2889* (2013.01); *A47L 2201/04* (2013.01); *A47L 2201/06* (2013.01); *G05D 2201/0207* (2013.01); *G05D 2201/0215* (2013.01)

(58) Field of Classification Search
CPC ......... G05D 1/0274; G05D 2201/0215; G05D 2201/0207; G05D 1/0242; G05D 1/0255; G05D 2201/0217; A47L 2201/06; A47L 2201/04; A47L 9/2889; A47L 9/2852
See application file for complete search history.

(56) References Cited

U.S. PATENT DOCUMENTS 5,652,489 A * 7/1997 Kawakami ........... G05D 1/0242
                                            318/568.12
2017/0332862 A1* 11/2017 Jun ..................... A47L 11/4069

FOREIGN PATENT DOCUMENTS

JP        2016-045598        4/2016

* cited by examiner

*Primary Examiner* — Nadeem Odeh
*Assistant Examiner* — Michael V Kerrigan
(74) *Attorney, Agent, or Firm* — Greenblum & Bernstein, P.L.C.

(57) ABSTRACT

An autonomous mobile robot includes: a sensor that acquire sensing information by sensing at least one of a situation around the autonomous mobile robot and a state of the autonomous mobile robot; storage that stores a first condition; a transmitter; and a processor that, in operation, performs operations including: judging whether the sensing information satisfies the first condition; and controlling the transmitter to output a collision preventing signal to a predetermined range outside of the autonomous mobile robot when it is judged that the sensing information satisfies the first condition. The collision preventing signal is a signal that inhibits a different autonomous mobile robot from entering the predetermined range.

13 Claims, 34 Drawing Sheets

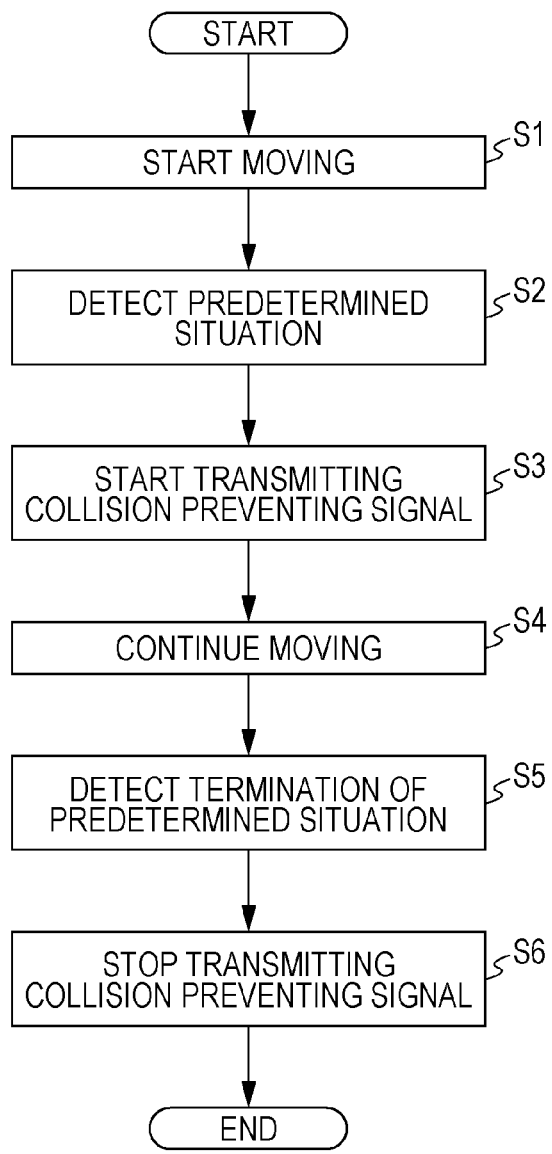

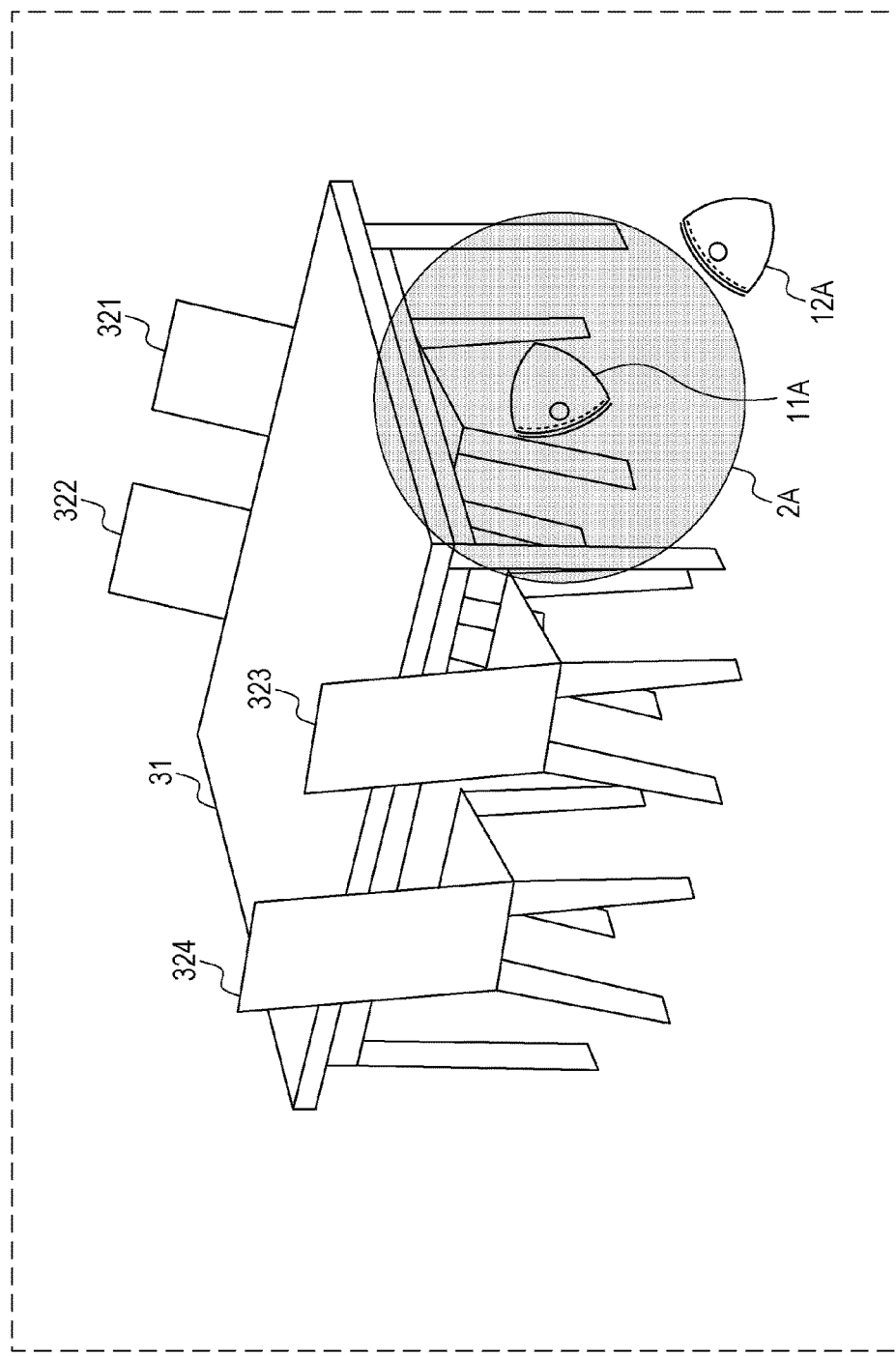

FIG. 9

| NO. | ELAPSED TIME AFTER PREVIOUS OBSTACLE DETECTION | TRAVEL DISTANCE AFTER PREVIOUS OBSTACLE DETECTION | TURN |
|---|---|---|---|
| 1 | 40 sec | 200 cm | 90° TO RIGHT |
| 2 | 8 sec | 40 cm | 90° TO LEFT |
| 3 | 5 sec | 25 cm | 90° TO LEFT |
| 4 | 7 sec | 35 cm | 90° TO RIGHT |
| 5 | 6 sec | 30 cm | 90° TO LEFT |

AUTONOMOUS MOBILE ROBOT

BACKGROUND

1. Technical Field

The present disclosure relates to avoidance of collision between autonomous mobile robots.

2. Description of the Related Art

An example of conventional autonomous mobile robots is a self-propelled vacuum described in Japanese Unexamined Patent Application Publication No. 2016-45598 (JP2016-45598A), for example.

SUMMARY

The aforementioned conventional technique requires further improvements.

One non-limiting and exemplary embodiments provide an autonomous mobile robot that detects that the autonomous mobile robot is in a predetermined situation while moving and transmits radio signal for preventing collision based on the detection result to avoid collision with another autonomous mobile robot.

In one general aspect, the techniques disclosed here feature an autonomous mobile robot including: a sensor that acquires sensing information by sensing at least one of a situation around the autonomous mobile robot and a state of the autonomous mobile robot; storage that stores a first condition; a transmitter; and a processor that, in operation, performs operations including judging whether the sensing information satisfies the first condition, and controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range.

The autonomous mobile robot according to the disclosed embodiments transmits a radio collision preventing signal when it is detected that the autonomous mobile robot is in the predetermined situation, based on the sensing information obtained by the sensor. Accordingly, the autonomous mobile robot is able to avoid collision with another autonomous mobile robot in such a predetermined situation that collision with another autonomous mobile robot causes disadvantage, for example.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart illustrating an operation of the self-propelled vacuum of Embodiment 1 to transmit collision preventing signal;

FIG. 6 is a conceptual diagram illustrating an entire image of a robot system of Embodiment 2;

FIG. 9 is a diagram illustrating an example of obstacle detection history information of the self-propelled vacuum of Embodiment 2;

Figure 1:
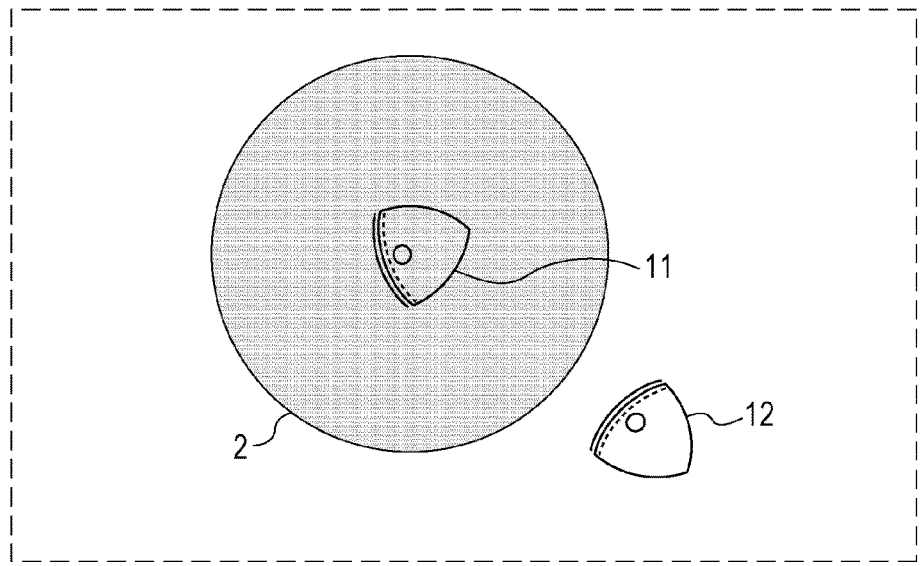
FIG. 1 is a conceptual diagram of a robot system of Embodiment 1.

DETAILED DESCRIPTION (Underlying Knowledge Forming Basis of the Present Disclosure)

As a conventional autonomous mobile robot, a self-propelled vacuum is described in JP2016-45598A, for example. The self-propelled vacuum includes various types of sensors. The self-propelled vacuum performs sensing using the sensors, decides moving operation based on the sensing result in accordance with a previously programmed movement algorithm, and performs the decided moving operation.

The self-propelled vacuum is provided with an obstacle sensor as one of the sensors. The self-propelled vacuum detects an obstacle by using the obstacle sensor, and performs an operation to avoid the obstacle so as not to collide with the obstacle.

The obstacle sensor provided on the self-propelled vacuum employs an infrared sensor in many cases. Such an obstacle sensor employing an infrared sensor sometimes cannot detect dark black-based obstacles, transparent glass obstacles, and thin obstacles.

The obstacle sensor cannot detect, for example, an obstacle short in height in some cases depending on the position where the obstacle sensor is mounted. Moreover, the obstacle sensor sometimes cannot detect obstacles when the obstacle sensor is dirty.

To minimize collision of a self-propelled vacuum with an obstacle, it is necessary to mount many highly-accurate obstacle sensors on the self-propelled vacuum. However, this configuration increases the cost of the self-propelled vacuum.

Self-propelled vacuums are lightweight and move at low speed. Even if self-propelled vacuums collide with obstacles, therefore, the self-propelled vacuums and obstacles are less likely to get significant damage due to the collision.

Accordingly, some self-propelled vacuums are provided with a function of performing operation to avoid an obstacle after the self-propelled vacuums collide with the obstacle by failing to avoid the obstacle. Herein, the operation to avoid an obstacle includes moving the self-propelled vacuum in the direction opposite to or a direction different from a direction in which the self-propelled vacuum has collided with the obstacle.

Self-propelled vacuums have become popular in recent years and are used in many places. Currently, one self-propelled vacuum cleans one space in many cases. Self-propelled vacuums will become more popular in the future, and each user will own plural self-propelled vacuums. It is therefore thought that one space will be cleaned with plural self-propelled vacuums in many cases.

When plural self-propelled vacuums simultaneously move and clean one space, the self-propelled vacuums are likely to collide with each other.

Now, consider an example where a first self-propelled vacuum is moving in a space under desks and chairs or where a first self-propelled vacuum, just after colliding with an obstacle such as a desk or chair while moving in a space under desks and chairs, is performing an obstacle avoidance operation. If a second self-propelled vacuum enters the same space in the above case, the second self-propelled vacuum is highly likely to collide with the first self-propelled vacuum. When the first and second self-propelled vacuums collide with each other, the first and second self-propelled vacuums individually perform the obstacle avoidance operation.

Under the above situation, the first and second self-propelled vacuums repeat the obstacle avoidance operation for long time and spend a lot of time until any of the first and second self-propelled vacuums moves out of the space containing many obstacles, such as under desks and chairs. When spending a lot of time moving out of the space, the first and second self-propelled vacuums spend only little time cleaning under the time constraint by the battery capacity of the first and second self-propelled vacuums, resulting in low efficiency.

In another example, a first self-propelled vacuum which is moving along the upper edge of a drop-off, such as stairs, collides with a second self-propelled vacuum. The first self-propelled vacuum is likely to fall down the drop-off due to the impact of the collision with the second self-compelled vacuum and stop moving. When the drop-off is large in particular, the fallen first propelled vacuum may break down.

In still another example, a first self-propelled vacuum becomes low on charge in the battery, searches for infrared signal transmitted from a charger in order to return to the charger, and collides with a second self-propelled vacuum while moving towards the charger based on the infrared signal detected by the search. After the collision, the first self-propelled vacuum performs an operation to avoid the second self-propelled vacuum as an obstacle. After avoiding the second self-propelled vacuum, the first self-propelled vacuum needs to again perform the operation to search for the infrared signal transmitted from the charger in order to return to the charger. In this case, the first self-propelled vacuum may spend a lot of time performing the operations to avoid the second self-propelled vacuum and search for the infrared signal from the charger. The first self-propelled vacuum therefore may be out of charge before returning to the charger in the worst case.

Self-propelled vacuums therefore need to be controlled depending on the situation so as not to collide with other self-propelled vacuums.

As a conventional control technique to prevent a self-propelled vacuum from colliding with another self-propelled vacuum, a technique is disclosed, in which an installed charger outputs a radio collision preventing signal to a predetermined range, and thereby prevents the self-propelled electric vacuum from accidentally colliding with the charger such as when the electric vacuum is cleaning or returning to the charger (see JP2016-45598A, for example).

In the configuration disclosed in JP2016-45598A, the charger is installed in advance and outputs the radio collision preventing signal to the predetermined range from the installed position to prevent the self-propelled vacuum from colliding with the charger. However, JP2016-45598A does not disclose a configuration in which a self-propelled vacuum, not the previously installed charger, outputs a radio collision preventing signal to a predetermined range depending on the situation while the self-propelled vacuum is moving, and thereby prevents another self-propelled vacuum from entering the same range to avoid collision with the other self-propelled vacuum.

Moreover, the charger described in JP2016-45598A is supplied with electric power from a power plug at the installed position and always outputs the radio collision preventing signal. JP2016-45598A does not take into account a structure, like a self-propelled vacuum, which outputs the radio collision preventing signal by using electric power supplied by the limited battery.

Based on the aforementioned knowledge, the inventors have reached each aspect of the disclosure.

An autonomous mobile robot of the present disclosure includes: a sensor that acquires sensing information by sensing at least one of a situation around the autonomous mobile robot and a state of the autonomous mobile robot; storage that stores a first condition; a transmitter; and a processor that, in operation, performs operations including judging whether the sensing information satisfies the first condition, and controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range.

According to the configuration, the autonomous mobile robot transmits a radio collision preventing signal when it is detected that the autonomous mobile robot is in the predetermined situation, based on the sensing information obtained by the sensor. Accordingly, the autonomous mobile robot is able to avoid collision with another autonomous mobile robot in such a predetermined situation that collision with another autonomous mobile robot causes disadvantage, for example.

The autonomous mobile robot of the present disclosure, the operations may further include controlling the transmitter to transmit the collision preventing signal for a predetermined period.

According to the configuration, the autonomous mobile robot is able to continuously transmit the collision preventing signal when it is detected that the predetermined situation detected by the autonomous mobile robot based on the sensing information obtained by the sensor has continued for a predetermined period of time. This configuration exerts an effect when the duration of the predetermined situation can be previously estimated. This is because the autonomous mobile robot is able to continue transmitting the collision preventing signal with the simple configuration without wasting the transmission power.

The autonomous mobile robot of the present disclosure, the storage may further store a second condition, and the operations may further include judging whether the sensing information satisfies the second condition, and controlling the transmitter to stop outputting the collision preventing signal when it is judged that the sensing information satisfies the second condition.

According to the configuration, the autonomous mobile robot is able to stop transmitting the collision preventing signal when it is detected that the predetermined situation detected by the autonomous mobile robot based on the sensing information obtained by the sensor is terminated after continuing for the predetermined period of time. With this configuration, the autonomous mobile robot is able to continue transmitting the collision preventing signal only when needed and is prevented from uselessly continuing transmitting the collision preventing signal.

The autonomous mobile robot of the present disclosure, the storage may further store a transmission power control condition, and the operations may further include controlling the transmitter so that power to transmit the collision preventing signal satisfies the transmission power control condition.

According to the configuration, the autonomous mobile robot is prevented from transmitting the collision preventing signal to a larger range than needed. The autonomous mobile robot thereby consumes less electric power at transmitting the collision preventing signal.

The autonomous mobile robot of the present disclosure may further include a receiver that acquires moving operation information of the different autonomous mobile robot, and the operations may further include judging based on the moving operation information, whether the different autonomous mobile robot is performing moving operation, and in the case where it is judged that the different autonomous mobile robot is not performing the moving operation, not outputting the collision preventing signal even if it is judged that the sensing information satisfies the first condition.

According to the configuration, the autonomous mobile robot determines the presence of another autonomous mobile robot based on information about the different autonomous mobile robot. In the case of determining that there is no other autonomous mobile robot, the autonomous mobile robot does not transmit radio collision preventing signal even if the first condition is satisfied. This prevents the autonomous mobile robot from transmitting the collision preventing signal uselessly, thus reducing the power consumption.

The autonomous mobile robot of the present disclosure, the sensor may include a first sensor that detects an obstacle, and the first condition may be that the number of obstacle detections by the first sensor for a predetermined period of time is more than a predetermined number.

According to the configuration, when the number of successive obstacle detections within a predetermined period exceeds a predetermined number in the obstacle detection process performed by the sensor, it is estimated that the autonomous mobile robot is moving in a space containing many obstacles, and the autonomous mobile robot transmits the collision preventing signal. This prevents the autonomous mobile robot from falling into a situation, while moving in the space containing many obstacles, where the autonomous mobile robot repeatedly collides with the many obstacles and another autonomous mobile robot in the space containing many obstacles and spends escaping from of the situation.

The autonomous mobile robot of the present disclosure, the sensor may include a first sensor that detects an obstacle, and the first condition may be that while the autonomous mobile robot is moving along an obstacle detected by the first sensor, the first sensor detects another obstacle.

According to the configuration, while moving along an obstacle detected by the sensor, the autonomous mobile robot detects another obstacle in the direction of travel. The autonomous mobile robot is therefore able to estimate that the autonomous mobile robot is moving in a room corner or the like and transmits the collision preventing signal. This prevents the autonomous mobile robot moving in the room corner or the like from colliding with another autonomous mobile robot and falling into a situation where the autonomous mobile robot repeatedly collides with the wall forming the room corner and another autonomous mobile robot. It is therefore possible to prevent the autonomous mobile robot from spending a lot of time escaping from the situation.

The autonomous mobile robot of the present disclosure, the sensor may include a first sensor that detects an obstacle, and the first condition may be that the first sensor detects obstacles on right and left sides of the autonomous mobile robot in a direction of travel thereof.

According to the configuration, the autonomous mobile robot detects obstacles on both the right and left sides with respect to the direction of travel of the autonomous mobile robot. The autonomous mobile robot is able to estimate that the autonomous mobile robot is moving in a narrow space, such as between pieces of furniture and transmits the collision preventing signal. This prevents the autonomous mobile robot from colliding with another autonomous mobile robot while moving in a narrow space, such as between pieces of furniture and falling into a situation where the autonomous mobile robot repeatedly collides with furniture and another autonomous mobile robot in the narrow space, such as between pieces of furniture. It is therefore possible to prevent the autonomous mobile robot from spending a lot of time escaping from the situation.

The autonomous mobile robot of the present disclosure, the sensor may include a first sensor that detects a radio signal, and the first condition may be that the first sensor detects a radio signal from a charger that charges the autonomous mobile robot.

According to the configuration, the autonomous mobile robot estimates that the autonomous mobile robot starts an operation to return to a charger when the sensor detects a radio signal from the charger. Upon detecting the radio signal from the charger, the autonomous mobile robot outputs the collision preventing radio signal. This prevents the autonomous mobile robot from colliding with another autonomous robot while moving toward the charger so that the autonomous mobile robot can move to the charger smoothly.

The autonomous mobile robot of the present disclosure, the sensor may include a first sensor that detects a radio signal, and the first condition may be that the first sensor detects a radio signal from a virtual wall device that defines a virtual wall.

According to the configuration, the autonomous mobile robot estimates that the autonomous mobile robot is moving near the virtual wall composed of radio signal transmitted from the virtual wall device when the sensor detects a radio signal from the virtual wall device. Upon detecting the radio signal from the virtual wall device, the autonomous mobile robot outputs the collision preventing signal. This prevents the autonomous mobile robot from traveling across the virtual wall due to collision with another autonomous mobile robot.

The autonomous mobile robot of the present disclosure, the sensor may include a first sensor that detects a difference in level, and the first condition may be that the first sensor detects a difference in level.

According to the configuration, the edge sensor detects an edge, and the autonomous mobile robot thereby estimates that the autonomous mobile robot is moving near the edge. Upon detecting the edge, the autonomous mobile robot outputs the collision preventing signal. This prevents the autonomous mobile robot from falling from the edge due to collision with another autonomous mobile robot.

The autonomous mobile robot of the present disclosure, the sensor may include a first sensor that detects an obstacle entangled, and the first condition may be that the first sensor detects that an obstacle is entangled on a wheel of the autonomous mobile robot.

According to the configuration, the sensor detects an obstacle entangled on a wheel of the autonomous mobile robot, and the autonomous mobile robot thereby estimates that the autonomous mobile robot starts an operation to remove the obstacle entangled on the wheel. Upon detecting the entangled obstacle, the autonomous mobile robot outputs the collision preventing signal. This prevents the obstacle from being entangled on the wheel complicatedly when the autonomous mobile robot collides with another autonomous mobile robot while performing the operation to remove the obstacle entangled on the wheel and the wheel rotates and/or moves in an unexpected direction.

Hereinafter, a description is given of embodiments of the disclosure with reference to the drawings.

(Embodiment 1)

In Embodiment 1, a description is given of a method with which a self-propelled vacuum as an autonomous mobile robot outputs a radio collision preventing signal (hereinafter, referred to as a collision preventing signal) to prevent another self-propelled vacuum from coming close to the same self-propelled vacuum when detecting a predetermined situation based on sensing information. The sensing information is obtained by sensing with a sensor provided for the self-propelled vacuum.

FIG. 1 is a diagram conceptually illustrating an entire image of a self-propelled vacuum system of Embodiment 1.

The self-propelled vacuum system illustrated in FIG. 1 includes self-propelled vacuums 11 and 12. In FIG. 1, the self-propelled vacuum 11 detects that the self-propelled vacuum 11 is in a predetermined situation, based on sensing information obtained by sensing with a sensor provided for the self-propelled vacuum 11, and outputs a collision preventing signal 2 so as to prevent the self-propelled vacuum 12 from coming close to the self-propelled vacuum 11.

Figure 2:
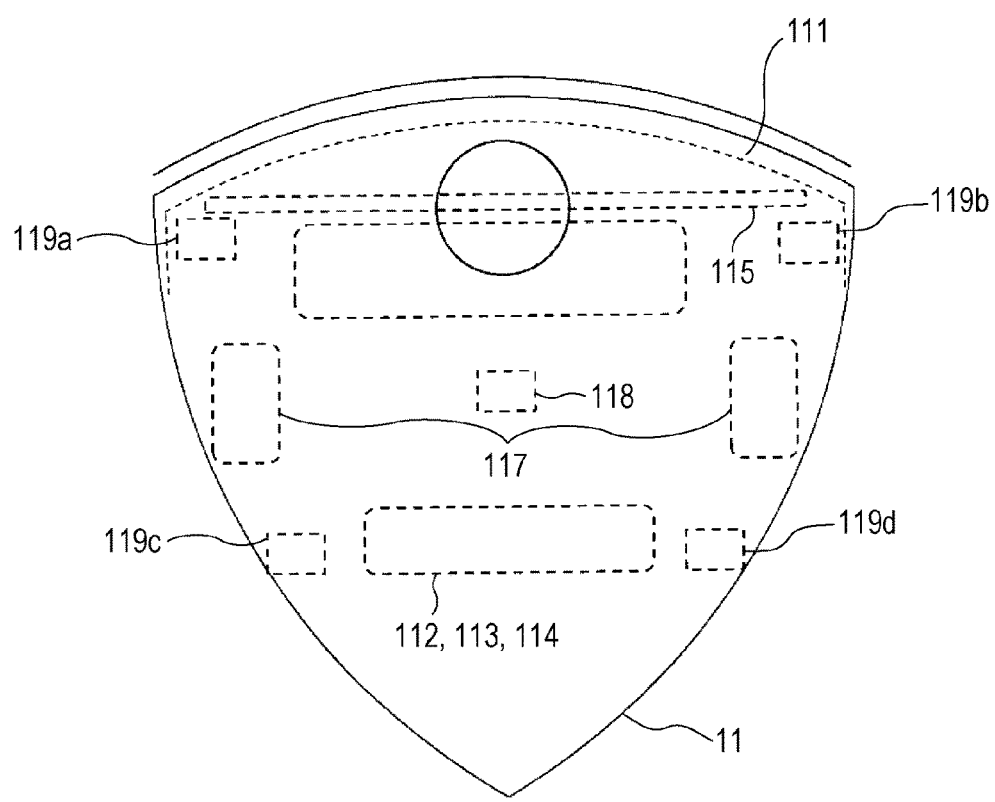
FIG. 2 is a translucent top exterior view of a self-propelled vacuum of Embodiment 1.
Figure 3:
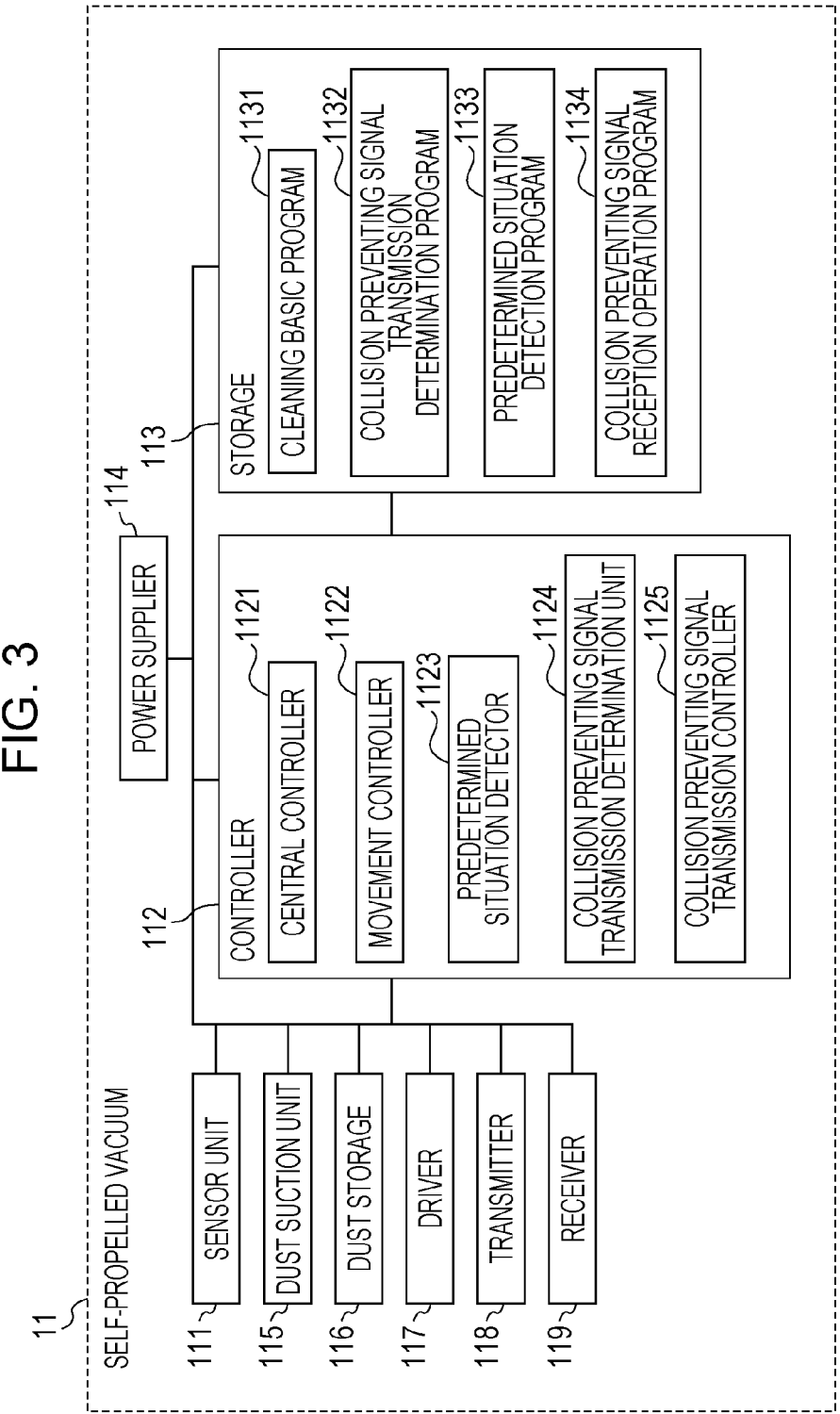
FIG. 3 is a block diagram illustrating the configuration of the self-propelled vacuum of Embodiment 1.

FIG. 2 is a translucent exterior top view of the self-propelled vacuum 11 of Embodiment 1. FIG. 3 is a block diagram illustrating the functional configuration of the self-propelled vacuum 11 of Embodiment 1. The self-propelled vacuum 11 includes a sensor unit 111, a controller 112, a storage 113, a power supplier 114, a dust suction unit 115, a dust storage 116, a driver 117, a transmitter 118, and a receiver 119.

The sensor unit 111 includes a sensor which senses the situation around the self-propelled vacuum 11 and the state of the self-propelled vacuum 11.

Herein, the sensor may be composed of a contact sensor, an obstacle sensor, a gyroscope sensor, a travel sensor, a timer, a radio reception sensor, a cliff sensor, an entangled obstacle sensor, or the like or may be composed of some of these sensors. The contact sensor is a sensor which detects a substance as an obstacle by contacting with the substance. The obstacle sensor is a sensor which emits infrared rays or ultrasonic waves towards an obstacle and measure the distance to the obstacle by measuring the reflection from the obstacle. The gyroscope sensor is a sensor which measures the angle of the body of the self-propelled vacuum 11. The travel sensor is a sensor which measures the distance traveled by the self-propelled vacuum 11. The timer is a sensor which measures the time period to the start of cleaning when the user sets the time to start cleaning in the self-propelled vacuum 11. The radio reception sensor is a sensor which detects radio signal transmitted from another device. The cliff sensor measures the distance to the floor surface. The entangled obstacle sensor is a sensor which detects an obstacle, such as a cable, entangled on a wheel of the self-propelled vacuum 11.

The controller 112 is composed of a central processing unit (CPU), for example, and controls the operation of the self-propelled vacuum 11. The controller 112 includes a central controller 1121, a movement controller 1122, a predetermined situation detector 1123, a collision preventing signal transmission determination unit 1124, and a collision preventing signal transmission controller 1125.

The storage 113 is a semiconductor memory, for example and stores various types of information. The storage 113 includes a cleaning basic program 1131, a collision preventing signal transmission determination program 1132, a predetermined situation detection program 1133, and a collision preventing signal reception operation program 1134.

Figure 4A:
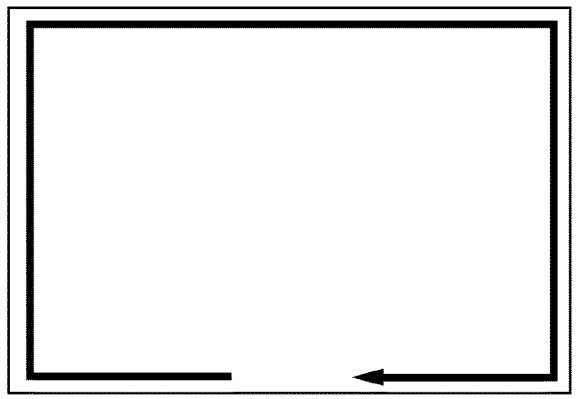
FIGS. 4A to 4D are diagrams illustrating operation pattern examples of a basic cleaning program of the self-propelled vacuum of Embodiment 1.
Figure 4B:
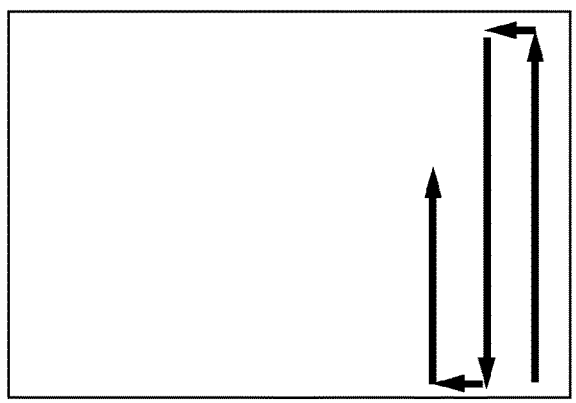
Figure 4C:
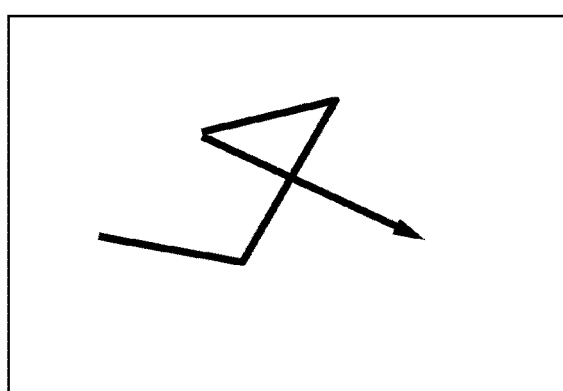
Figure 4D:
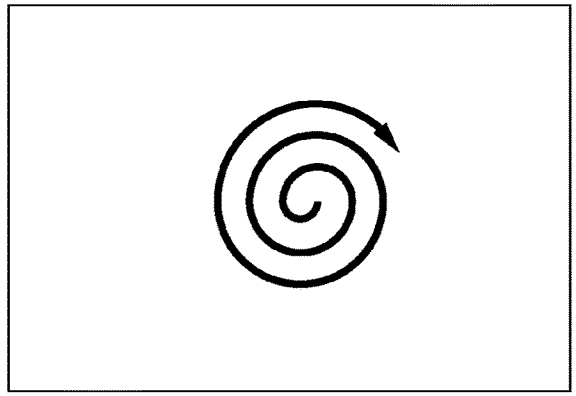

The cleaning basic program 1131 is a program to move the self-propelled vacuum 11 based on predetermined moving patterns. The movement controller 1122 controls the driver 117 based on moving patterns of the cleaning basic program 1131 to move the self-propelled vacuum 11. The moving patterns include wall travel, zigzag travel, random travel, and spiral travel, for example. The self-propelled vacuum 11 moves while changing the operation pattern depending on the situation. FIGS. 4A to 4D are diagrams illustrating operation pattern examples of the self-propelled vacuum 11. FIG. 4A illustrates the wall travel of the self-propelled vacuum 11. The self-propelled vacuum 11 moves along the wall. When detecting a wall in the direction of travel while moving along the wall, the self-propelled vacuum 11 turns just before the wall in the direction of travel and starts moving along the wall again. FIG. 4B illustrates zigzag travel of the self-propelled vacuum 11. When traveling straight and detecting an obstacle in the direction of travel, the self-propelled vacuum 11 turns 90 degrees to the left just before the obstacle and travels a predetermined distance. The self-propelled vacuum 11 then turns 90 degrees to the right and travels straight. The self-propelled vacuum 11 repeats these movements. FIG. 4C illustrates random travel of the self-propelled vacuum 11. The self-propelled vacuum 11 moves randomly. The self-propelled vacuum 11 moves as turning to random angles at random time intervals, for example. FIG. 4D illustrates spiral travel of the self-propelled vacuum 11. The self-propelled vacuum 11 moves in a spiral manner.

The collision preventing signal transmission determination program 1132 is a program to determine start and stop transmitting a collision preventing signal to prevent the self-propelled vacuum 11 from colliding with another self-propelled vacuum 12. The collision preventing signal transmission determination program 1132 is executed by the collision preventing signal transmission determination unit 1124.

In Embodiment 1, the collision preventing signal transmission determination unit 1124 starts transmitting a collision preventing signal when the predetermined situation detector 1123 detects, based on sensing information obtained with the sensor unit 111, that the self-propelled vacuum 11 is in a predetermined situation.

The collision preventing signal transmission determination unit 1124 stops transmitting a collision preventing signal when the predetermined situation detector 1123 detects, based on the sensing information obtained with the sensor unit 111, that the self-propelled vacuum 11 has escaped from the predetermined situation.

Herein, detecting the predetermined situation based on the sensing information obtained by the sensor unit 111 includes using the sensor unit 111 to detect the situation of the self-propelled vacuum 11 to the obstacle and the situation of the self-propelled vacuum 11 based on information obtained with the sensor unit 111 concerning the obstacle and self-propelled vacuum 11, for example.

The collision preventing signal reception operation program 1134 is a program to, upon detecting reception of a collision preventing signal transmitted from another self-propelled vacuum 12, control and move the self-propelled vacuum 11 so that the self-propelled vacuum 11 cannot receive the collision preventing signal transmitted from the different self-propelled vacuum 12. When the self-propelled vacuum 11 detects the collision preventing signal transmitted from another self-propelled vacuum 12 while moving, for example, the collision preventing signal reception operation program moves the self-propelled vacuum 11 opposite to the direction that the self-propelled vacuum 11 has traveled. The collision preventing signal reception operation program 1134 continues the movement until the self-propelled vacuum 11 stops receiving the collision preventing signal transmitted from the different self-propelled vacuum 12. When the self-propelled vacuum 11 stops receiving the collision preventing signal transmitted from the self-propelled vacuum 12, the movement control by the collision preventing signal reception operation program 1134 is terminated. The self-propelled vacuum 11 starts the movement based on the cleaning basic program 1131 again.

In another example, when the self-propelled vacuum 11 detects reception of the collision preventing signal transmitted from the self-propelled vacuum 12 while moving, the collision preventing signal reception operation program 1134 uses the received collision preventing signal to calculate the direction of the source of the collision preventing signal. The collision preventing signal reception operation program 1134 moves the self-propelled vacuum 11 opposite to the calculated direction. The collision preventing signal reception operation program 1134 then continues the movement control until the self-propelled vacuum 11 stops receiving the collision preventing signal transmitted from the self-propelled vacuum 12. When the self-propelled vacuum 11 stops receiving the collision preventing signal transmitted from the self-propelled vacuum 12, the movement control by the collision preventing signal reception operation program 1134 is terminated. The self-propelled vacuum 11 starts again the movement based on the cleaning basic program 1131.

Hereinabove, two examples of the collision preventing signal reception operation program 1134 are described. The collision preventing signal reception operation program 1134 may have any configuration as long as, when the collision preventing signal transmitted from the self-propelled vacuum 12 is detected, the collision preventing signal reception operation program 1134 controls and moves the self-propelled vacuum 11 so that the self-propelled vacuum 11 stop receiving the collision preventing signal transmitted from the self-propelled vacuum 12.

The power supplier 114 is a battery and supplies electric power to each constituent component of the self-propelled vacuum 11.

The dust suction unit 115 is composed of a motor, a fan, a filter, and an exhaust port, which are not illustrated, for example. In the dust suction unit 115, the fan is rotated by the motor to suck dust together with air, and only air is passed through the filter and is exhausted through the exhaust port.

The dust storage 116 accumulates dust sucked by the dust suction unit 115.

The driver 117 moves the self-propelled vacuum 11 and is composed of a motor and wheels (not illustrated), for example. The driver 117 moves the self-propelled vacuum 11 by controlling the revolutions of the motor and rotating the wheels.

The transmitter 118 transmits a short-distance radio signal as a collision preventing signal to the surroundings of the self-propelled vacuum 11 so that the self-propelled vacuum 11 cannot come close to another self-propelled vacuum 12. The transmitter 118 performs infrared communication, for example. FIG. 2 illustrates a configuration example in which the transmitter 118 is mounted in the center of the top of the self-propelled vacuum 11. The transmitter 118 transmits infrared signal to the surroundings of the self-propelled vacuum 11 from the center of the top.

The transmitter 118 is not limited to the configuration illustrated in FIG. 2 and may have another configuration as long as the transmitter 118 is able to transmit the collision preventing signal to the surroundings of the self-propelled vacuum 11. For example, the self-propelled vacuum 11 may be provided with plural transmitters at the edge of the body thereof to transmit the collision preventing signal to the surroundings of the self-propelled vacuum 11.

Moreover, when there are devices that transmit infrared signal to the self-propelled vacuum 11 other than self-propelled vacuums, the self-propelled vacuum 11 and the devices are desirably configured to transmit modulated infrared signal so that the self-propelled vacuum 11 receiving infrared signal distinguish which device has transmitted the received infrared signal. In this configuration, the receiving self-propelled vacuum 11 only needs to be provided with an infrared receiver, thus lowering the design cost. The devices that transmit infrared signal other than the self-propelled vacuums include a charger and a virtual wall device, for example. The charger is a device that transmits infrared signal to inform the self-propelled vacuum 11 of the position of the charger when the self-propelled vacuum 11 returns to the charger. By receiving the infrared signal transmitted from the charger, the self-propelled vacuum 11 knows the position of the charger and moves to the position to return to the charger. When there is an area that the self-propelled vacuum 11 is not wanted to enter, the virtual wall device is configured to transmit an infrared signal to form a virtual infrared wall so that the self-propelled vacuum 11 cannot travel across the infrared wall. The virtual wall device is previously installed by the user.

The receiver 119 receives a radio collision preventing signal outputted from another self-propelled vacuum, a radio signal from a charger, and a radio signal from the virtual wall. The receiver 119 is able to distinguish the received radio signals from each other. In the configuration example of FIG. 2, totally four infrared receivers are mounted, including a receiver 119a at the left front end, a receiver 119b at the right front end, a receiver 119c at the left rear end, and a receiver 119d at the right rear end.

FIG. 5 is a flowchart illustrating the flow of the operation of the self-propelled vacuum 11 of Embodiment 1 to start and stop transmitting the collision preventing signal when detecting the predetermined situation based on the sensing information obtained by the sensor unit 111.

The flowchart is described in detail below.

The self-propelled vacuum 11 starts moving by causing the movement controller 1122 to control the driver 117 based on the cleaning basic program 1131 of the storage 113 (S1). Herein, the self-propelled vacuum 11 moves as sensing with the sensor unit 111. The predetermined situation detector 1123 determines, based on the information obtained through the sensing with the sensor unit 111, whether the self-propelled vacuum 11 is in the predetermined situation previously stored in the predetermined situation detection program 1133.

When detecting that the self-propelled vacuum 11 is in the predetermined situation (S2), the predetermined situation detector 1123 notifies the collision preventing signal transmission determination unit 1124 of the determination. Upon being notified, the collision preventing signal transmission determination unit 1124 instructs the collision preventing signal transmission controller 1125 to start transmitting collision preventing signal from the transmitter 118 (S3). The self-propelled vacuum 11 then continues moving while transmitting the collision preventing signal (S4).

The self-propelled vacuum 11 performs sensing with the sensor unit 111 while moving in the same manner as at the start of movement. Based on the information obtained by sensing with the sensor unit 111, the predetermined situation detector 1123 determines whether the self-propelled vacuum 11 is in the predetermined situation previously stored in the predetermined situation detection program 1133.

When detecting that the self-propelled vacuum 11 is not in the predetermined situation (S5), the predetermined situation detector 1123 notifies the collision preventing signal transmission determination unit 1124 of the determination. Upon being notified, the collision preventing signal transmission determination unit 1124 instructs the collision preventing signal transmission controller 1125 to stop transmitting the collision preventing signal from the transmitter 118 (S6).

In such a manner, the self-propelled vacuum 11 is able to prevent another self-propelled vacuum from coming close to the self-propelled vacuum 11 by outputting the collision preventing signal when it is detected that the self-propelled vacuum 11 falls in the predetermined situation, based on the sensing information obtained by sensing with the sensor unit 111 included in the self-propelled vacuum 11.

The self-propelled vacuum 11 of Embodiment 1 may further include a communication unit and share information with another self-propelled vacuum 12. With this configuration, the self-propelled vacuum 11 is able to acquire information about another self-propelled vacuum. The self-propelled vacuum 11 is able to recognize that another self-propelled vacuum 12 is not moving while only the self-propelled vacuum 11 is moving, for example. In such a case, the different self-propelled vacuum will not collide with the self-propelled vacuum 11. The self-propelled vacuum 11 is therefore able to be controlled so as not to transmit a collision preventing signal even when it is detected that the self-propelled vacuum 11 is moving in a space containing many obstacles. This reduces power consumption for transmitting the collision preventing signal.

In another example, the self-propelled vacuum 11 may be configured to receive movement plan information of another self-propelled vacuum 12. The self-propelled vacuum 11 compares the movement plan information of the self-propelled vacuum 11 with that of the different self-propelled vacuum. It is estimated that the self-propelled vacuum 11 cannot collide with the different self-propelled vacuum in a part of the movement plan information of the self-propelled vacuum 11 that does not correspond to that of the different self-propelled vacuum. The self-propelled vacuum 11 is therefore able to be controlled so as not to transmit the collision preventing signal even when it is detected that the self-propelled vacuum 11 is moving in a space containing many obstacles. This reduces power consumption for transmitting the collision preventing signal.

Next, a description is given of embodiments in which the sensor unit 111 described in Embodiment 1 is embodied. In Embodiments 2 to 7, a description is given of the detail of the sensing information obtained by sensing with the sensor unit of the self-propelled vacuum and the detail of the operation to output the collision preventing signal in the predetermined situation based on the sensing information.

(Embodiment 2)

In Embodiment 2, a description is given of the method with which a self-propelled vacuum 11A outputs the collision preventing signal to prevent another self-propelled vacuum 12A from approaching and colliding with the self-propelled vacuum 11A when the self-propelled vacuum 11A is moving in a space containing many obstacles such as under tables and chairs.

FIG. 6 is a diagram conceptually illustrating the entire image of a self-propelled vacuum system in Embodiment 2.

In the self-propelled vacuum system illustrated in FIG. 6, two self-propelled vacuums 11A and 12A are cleaning the space where a table 31 and chairs 321 to 324 are located. In FIG. 6, the self-propelled vacuum 11A determines that there are many obstacles while moving under the table 31 and chairs 321 to 324 and transmits a collision preventing signal 2A. The self-propelled vacuum 12A receives the collision preventing signal 2A from the self-propelled vacuum 11A while moving towards the table 31 and chairs 321 to 324.

Figure 7:
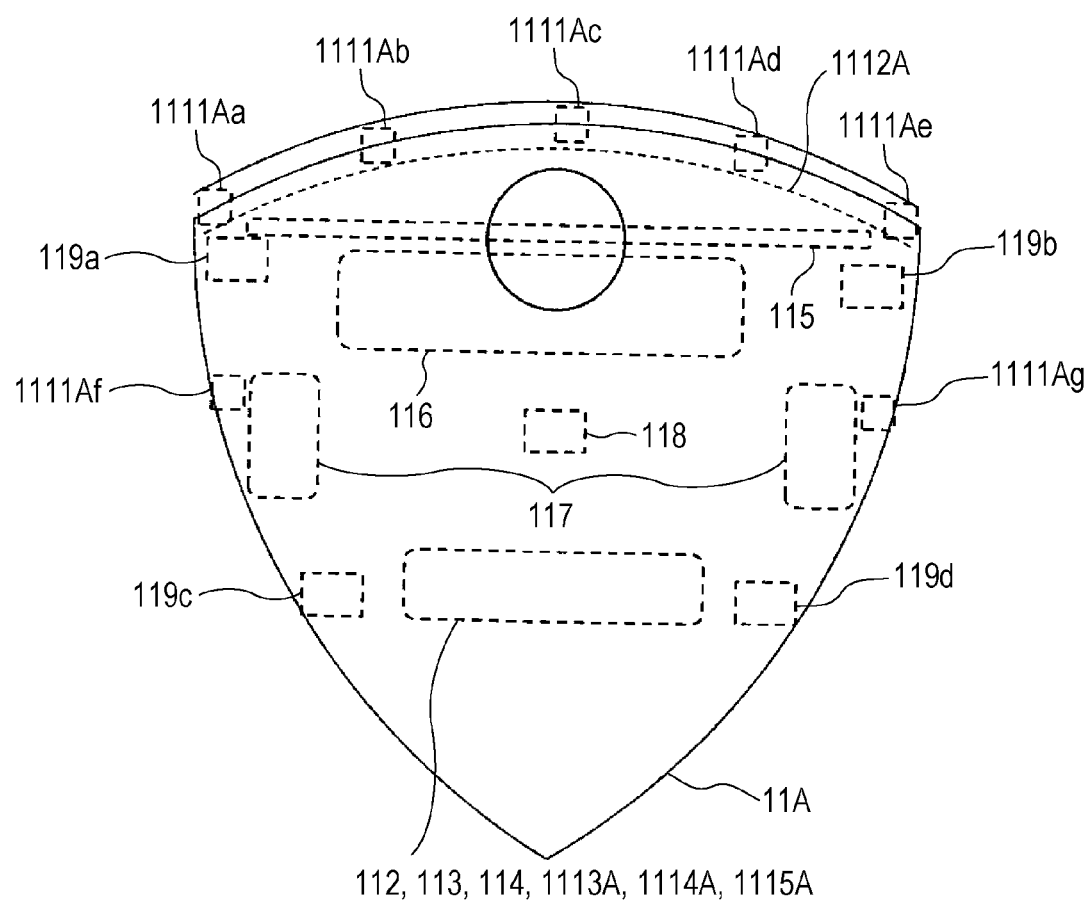
FIG. 7 is a translucent top exterior view of a self-propelled vacuum of Embodiment 2.
Figure 8:
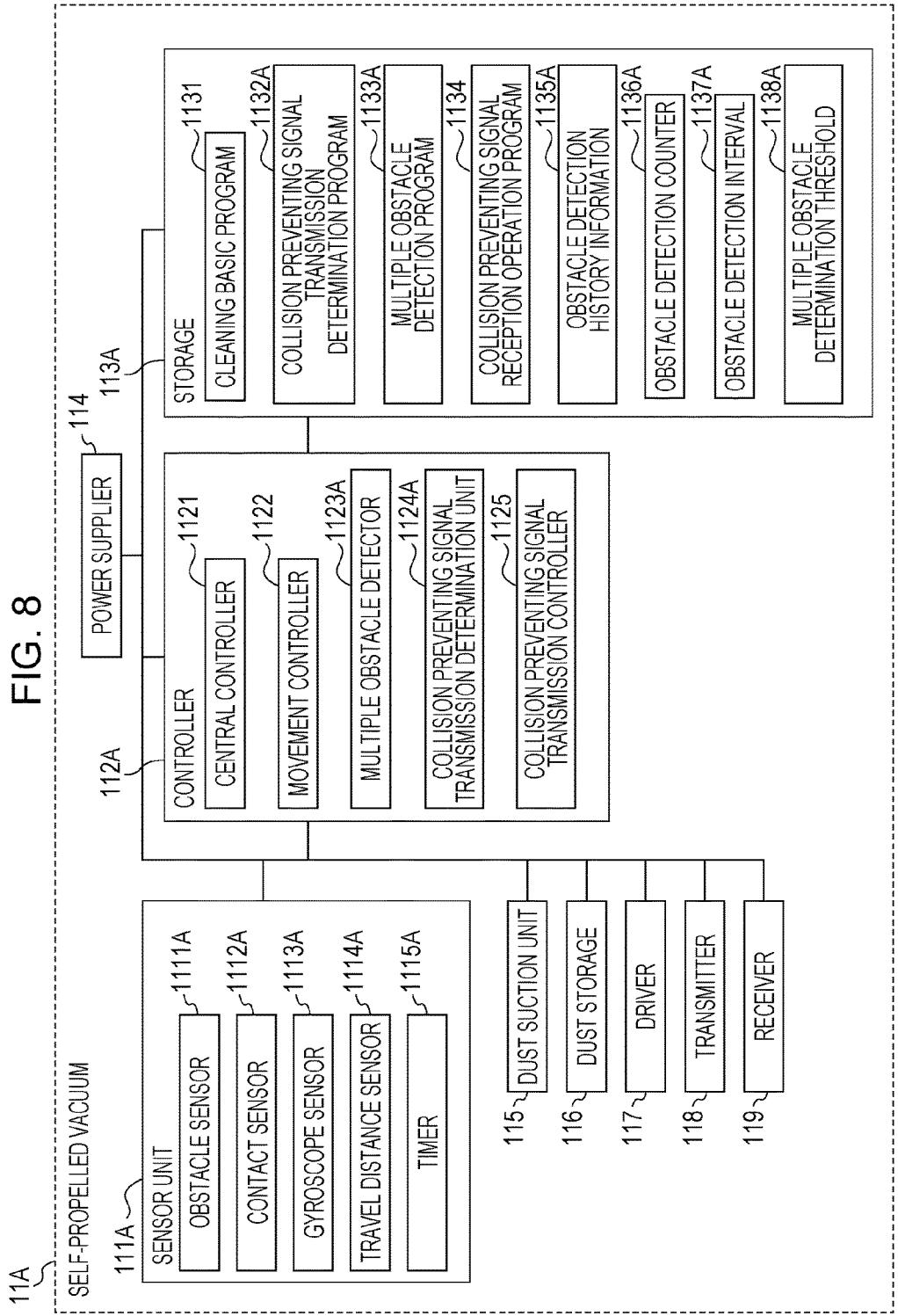
FIG. 8 is a block diagram illustrating the configuration of the self-propelled vacuum of Embodiment 2.

FIG. 7 is a translucent top exterior view of the self-propelled vacuum 11A of Embodiment 2. FIG. 8 is a block diagram illustrating the functional configuration of the self-propelled vacuum 11A.

The same elements as those in FIG. 3 are given the same numerals, and the detailed description thereof is not limited.

The self-propelled vacuum 11A illustrated in FIG. 8 is different from the self-propelled vacuum 11 illustrated in FIG. 3 in a sensor unit 111A, a controller 112A, and a storage 113A.

The sensor unit 111A is composed of an obstacle sensor 1111A, a contact sensor 1112A, a gyroscope sensor 1113A, a travel distance sensor 1114A, and a timer 1115A.

The obstacle sensor 1111A is a sensor to measure the distance to an obstacle. The obstacle sensor 1111A emits infrared rays or ultrasonic waves and measures the distance to an obstacle for obstacle detection by measuring the reflection from the obstacle, for example. In the configuration example of FIG. 7, the self-propelled vacuum 11A is provided with five obstacle sensors 1111Aa to 1111Ae in the front, an obstacle sensor 1111Af in the left side, and an obstacle sensor 1111Ag in the right side.

The contact sensor 1112A is a sensor which detects a substance when coming into contact with the same. When the obstacle sensors 1111Aa to 1111Ae do not detect an obstacle, the contact sensor 1112A detects an obstacle by coming into contact with the substance. In the configuration example illustrated in FIG. 2, the contact sensor 1112A is mounted in the front of the self-propelled vacuum 11A.

The gyroscope sensor 1113A is a sensor which measures the angle of the body of the self-propelled vacuum 11A. When the self-propelled vacuum 11A is turned, the turning angle is recognized by the gyroscope sensor 1113A.

The travel distance sensor 1114A is a sensor which measures the distance that the self-propelled vacuum 11A has travelled. The travel distance sensor 1114A measures the travel distance based on the size of the wheels and the number of revolutions of the wheels, for example.

The timer 1115A is a sensor which measures time. When the user schedules the time to start cleaning in the self-propelled vacuum 11A, for example, the self-propelled vacuum 11A uses the timer 1115A to measure the time period to the beginning of cleaning and measure the time period between the beginning and end of cleaning.

The controller 112A is different from the controller 112 of the self-propelled vacuum 11 illustrated in FIG. 3 in a multiple obstacle detector 1123A and a collision preventing signal transmission determination unit 1124A.

The multiple obstacle detector 1123A performs processing based on a multiple obstacle detection program 1133A.

The collision preventing signal transmission determination unit 1124A performs processing based on a collision preventing signal transmission determination program 1132A.

The storage 113A is different from the storage 113 of the self-propelled vacuum 11 illustrated in FIG. 3 in the collision preventing signal transmission determination program 1132A, the multiple obstacle detection program 1133A, obstacle detection history information 1135A, an obstacle detection counter 1136A, an obstacle detection interval 1137A, and a multiple obstacle determination threshold 1138A.

The collision preventing signal transmission determination program 1132A is a program to determine start and stop of transmission of the collision preventing signal in order to prevent the self-propelled vacuum 11A from colliding with the self-propelled vacuum 12A. The collision preventing signal transmission determination program 1132A is executed by the collision preventing signal transmission determination unit 1124A. In Embodiment 2, the collision preventing signal transmission determination unit 1124A transmits the collision preventing signal when the multiple obstacle detector 1123A detects that the self-propelled vacuum 11A is moving in a space containing many obstacles.

The multiple obstacle detection program 1133A is a program to detect that the self-propelled vacuum 11A is moving in a space containing many obstacles. Specifically, the multiple obstacle detection program 1133A determines whether the number of obstacles detected at time intervals, not longer than a threshold previously stored in the obstacle detection interval 1137A, exceeds the multiple obstacle determination threshold 1138A each time the self-propelled vacuum 11A detects an obstacle with the obstacle sensor 1111A or contact sensor 1112A. When the number of obstacles detected exceeds the threshold stored in the multiple obstacle determination threshold 1138A, the multiple obstacle detection program 1133A determines that the self-propelled vacuum 11A is moving in a space containing many obstacles.

The obstacle detection history information 1135A is information including a history of information concerning obstacle detection in which the self-propelled vacuum 11A detects obstacles. The information concerning obstacle detection includes information about the travel distance and time between the previous and current obstacle detections by the self-propelled vacuum 11A and information of the angle by which the self-propelled vacuum 11A turns upon obstacle detection. The travel distance and time between the previous and current obstacle detections by the self-propelled vacuum 11A can be measured by using the travel distance sensor 1114A and timer 1115A of the self-propelled vacuum 11A. The angle by which the self-propelled vacuum 11A turns upon obstacle detection can be measured by using the gyroscope sensor 1113A. FIG. 9 illustrates an example of the obstacle detection history information 1135A.

The obstacle detection counter 1136A counts the number of obstacle detections which occur at time intervals not long than the threshold stored in the obstacle detection interval 1137A among the obstacle detections by the obstacle sensor 1111A or contact sensor 1112A. The initial value of the obstacle detection counter 1136A is set to O. When the time period between the previous and current obstacle detections is not longer than the threshold stored in the obstacle detection interval 1137A, the value of the obstacle detection counter 1136A is incremented by one. When the time period between the previous and current obstacle detections is longer than the threshold stored in the obstacle detection interval 1137A, the value of the obstacle detection counter 1136A is set to one.

The obstacle detection interval 1137A is a threshold to determine the length of time intervals at which the self-propelled vacuum 11A detects obstacles with the obstacle sensor 1111A or contact sensor 1112A. When the time intervals at which obstacles are detected are shorter than the obstacle detection interval 1137A, it is determined that the detected obstacles are close to each other. When the time intervals at which obstacles are detected are longer than the obstacle detection interval 1137A, it is determined that the detected obstacles are distant from each other.

The multiple obstacle determination threshold 1138A is a threshold to determine whether the self-propelled vacuum 11 is moving in a space containing many obstacles. Specifically, when the value of the obstacle detection counter 1136A exceeds the value of the multiple obstacle determination threshold 1138A, it is determined that the self-propelled vacuum 11A is moving in a space containing many obstacles.

Next, a description is given of the outline of the operation of the self-propelled vacuum 11A configured as described above.

Figure 10:
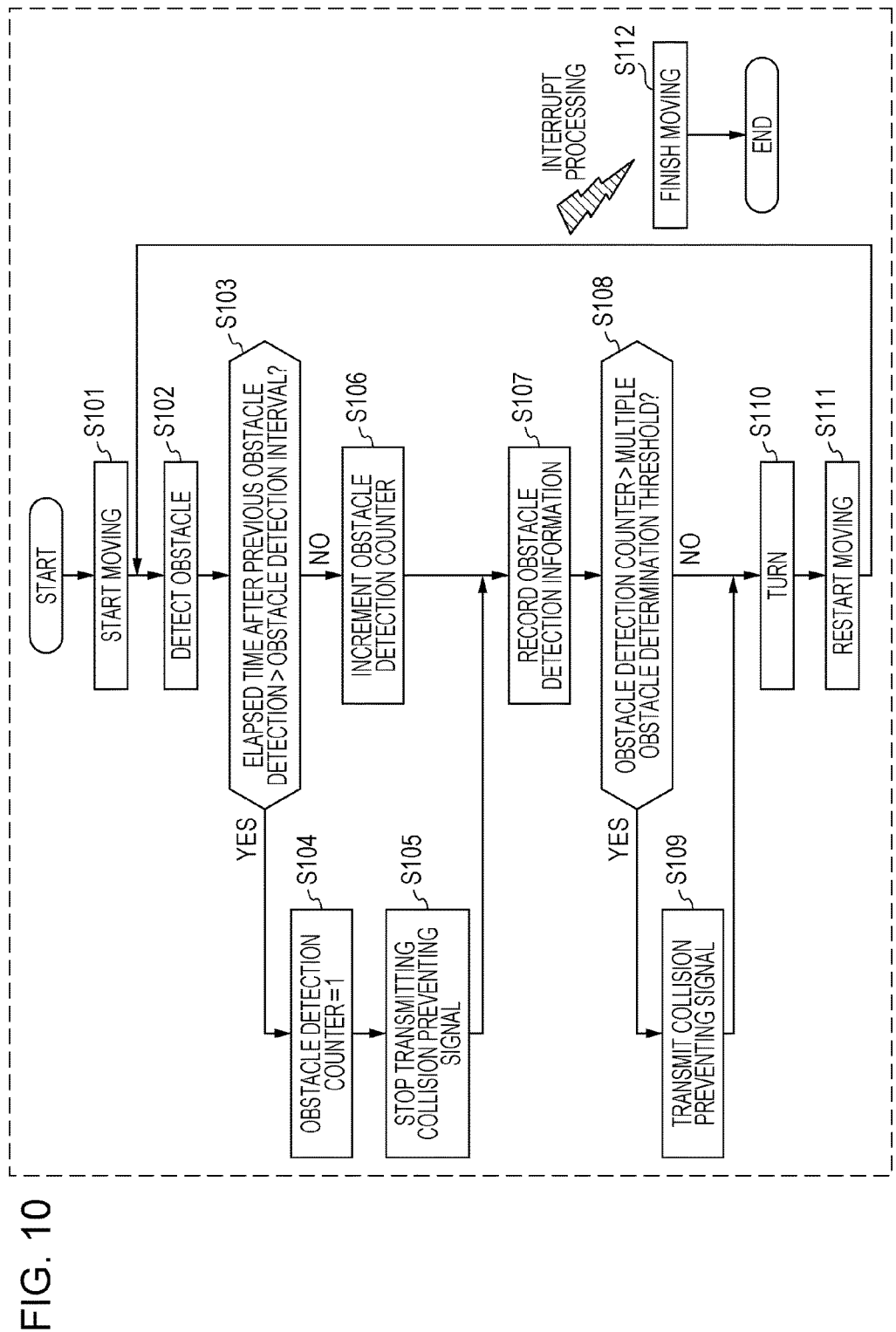
FIG. 10 is a flowchart illustrating an operation of the self-propelled vacuum of Embodiment 2 to transmit collision preventing signal.

FIG. 10 is a flowchart for explaining the operation of the self-propelled vacuum 11A according to Embodiment 2.

First, the vacuum 11A starts moving by causing the movement controller 1122 to control the driver 117 based on the cleaning basic program 1131 stored in the storage 113A (S101). In Embodiment 2, to measure the travel distance and time between obstacle detections by the self-propelled vacuum 11A, the central controller 1121 starts measurement of the travel distance sensor 1114A and timer 1115A at the same time the self-propelled vacuum 11A starts moving.

After the self-propelled vacuum 11A starts moving, the self-propelled vacuum 11A continues the moving operation until the obstacle sensor 1111A or contact sensor 1112A detects an obstacle. When the obstacle sensor 1111A or contact sensor 1112A detects an obstacle while the self-propelled vacuum 11A is moving (S102), the multiple obstacle detector 1123A measures the time period between the previous and current obstacle detections with the timer 1115A and determines whether the measured time is longer than the obstacle detection interval 1137A (S103).

When it is determined that the measured time is longer than the obstacle detection interval 1137A in S103, the multiple obstacle detector 1123A sets the obstacle detection counter 1136A to one and stores the same in the storage 113 (S104). If the collision preventing signal is being transmitted by the transmitter 118, the multiple obstacle detector 1123A instructs the collision preventing signal transmission determination unit 1124A to stop transmitting the collision preventing signal (S105). According to this process, the multiple obstacle detector 1123A determines that the self-propelled vacuum 11A has moved out of a space containing many obstacles and decides to stop transmitting the collision preventing signal.

When determining that the measured time is not longer than the obstacle detection interval 1137A in S103, the multiple obstacle detector 1123A reads the stored value of the obstacle detection counter 1136A, increments the value of the obstacle detection counter 1136A, and stores the same in the storage 113A (S106).

The multiple obstacle detector 1123A additionally stores the obstacle detection information concerning the current obstacle detection, in the obstacle detection history information 1135A in the storage 113A (S107). The obstacle detection information includes information about the travel distance and time between the previous and current obstacle detections by the self-propelled vacuum 11A and information of the angle by which the self-propelled vacuum 11A turns upon the current obstacle detection, for example. The aforementioned travel distance and time and angle can be extracted from the sensing information of the travel distance sensor 1114A, timer 1115A, and the gyroscope sensor 1113A.

Next, the multiple obstacle detector 1123A determines whether the obstacle detection counter 1136A exceeds the multiple obstacle determination threshold 1138A previously stored (S108).

When the value of the obstacle detection counter 1136A exceeds the multiple obstacle determination threshold 1138A in S108, the multiple obstacle detector 1123A determines that the self-propelled vacuum 11A is moving in a space containing many obstacles and notifies the collision preventing signal transmission determination unit 1124A of the determination. Upon being notified, the collision preventing signal transmission determination unit 1124A instructs the collision preventing signal transmission controller 1125 to start transmitting the collision preventing signal from the transmitter 118 (S109).

When the value of the obstacle detection counter 1136A does not exceed the multiple obstacle determination threshold 1138A in S108, the multiple obstacle detector 1123A determines that the self-propelled vacuum 11A is not moving in a space containing many obstacles.

The self-propelled vacuum 11A turns by causing the movement controller 1122 to control the driver 117 based on the cleaning basic program 1131 in the storage 113A (S110). The self-propelled vacuum 11A then starts moving again (S111).

After starting moving again, the self-propelled vacuum 11A continues moving until the obstacle sensor 1111A or contact sensor 1112A detects an obstacle and then repeats the aforementioned process.

The self-propelled vacuum 11A shifts to interrupt processing when the moving operation based on the cleaning basic program 1131 is completed or when the battery of the self-propelled vacuum 11A runs out of charge, for example, and terminates the operation.

With the aforementioned process, when detecting that the self-propelled vacuum 11A is moving in a space containing many obstacles, such as under tables and chairs, the self-propelled vacuum 11A transmits the collision preventing signal so as to be prevented from colliding with the self-propelled vacuum 12A.

In Embodiment 2, the self-propelled vacuum 11A stops transmitting the collision preventing signal when it is detected that the self-propelled vacuum 11A has escaped from the situation where the self-propelled vacuum 11A is moving in a space containing many obstacles. However, the self-propelled vacuum 11A may be configured to stop transmitting the collision preventing signal when it is detected that the self-propelled vacuum 11A has moved out of the space containing many obstacles and traveled a predetermined distance or for a predetermined time. In some cases, the self-propelled vacuum 11A does not detect an obstacle just for a brief moment accidentally while moving in a space containing many obstacles. Even in such a case, the aforementioned configuration prevents the self-propelled vacuum 11A from stopping transmitting the collision preventing signal by erroneously determining that the self-propelled vacuum 11A has moved out of the space containing many obstacles. It is thus possible to prevent another self-propelled vacuum from entering the space containing many obstacles.

In Embodiment 2, the self-propelled vacuum 11A stops transmitting the collision preventing signal when it is detected that the self-propelled vacuum 11A has escaped from the situation where the self-propelled vacuum 11A is moving in a space containing many obstacles. However, the self-propelled vacuum 11A may be configured to stop transmitting the collision preventing signal a predetermined period of time after it is detected that the self-propelled vacuum 11A has moved out of the space containing many obstacles. In this configuration, the predetermined period of time for which the collision preventing signal is to be transmitted is preferably longer than the obstacle detection interval 1137A. This is because the self-propelled vacuum 11A is likely to stay in the space containing many obstacles within the obstacle detection interval 1137A. If the self-propelled vacuum 11A stops transmitting the collision preventing signal within the obstacle detection interval 1137A, the transmission of the collision preventing signal could be stopped before the self-propelled vacuum 11A completely moves out of the space containing many obstacles.

In S8 of Embodiment 2, the collision preventing signal transmission controller 1125 is instructed to transmit the collision preventing signal through the transmitter 118. However, the self-propelled vacuum 11A may include a transmission power controller which controls transmission power used to transmit the collision preventing signal. The self-propelled vacuum 11A may be configured to control the transmission power with the transmission power controller to change the distance that the collision preventing signal can reach (hereinafter, referred to as the transmission range of the collision preventing signal). With this configuration, the self-propelled vacuum 11A is able to control the transmission power depending on the situation so that the collision preventing signal can be transmitted to only a necessary range. The power supplier 114 of the self-propelled vacuum 11A includes limited electric power, like a battery. Accordingly, the waste of electric power is reduced by controlling the transmission power depending on the situation so that the collision preventing signal can be transmitted to only a necessary range. Hereinafter, using FIGS. 11 to 13, a description is given of examples in which the self-propelled vacuum 11A transmits the collision preventing signal to only a necessary range by controlling the transmission power.

Figure 11:
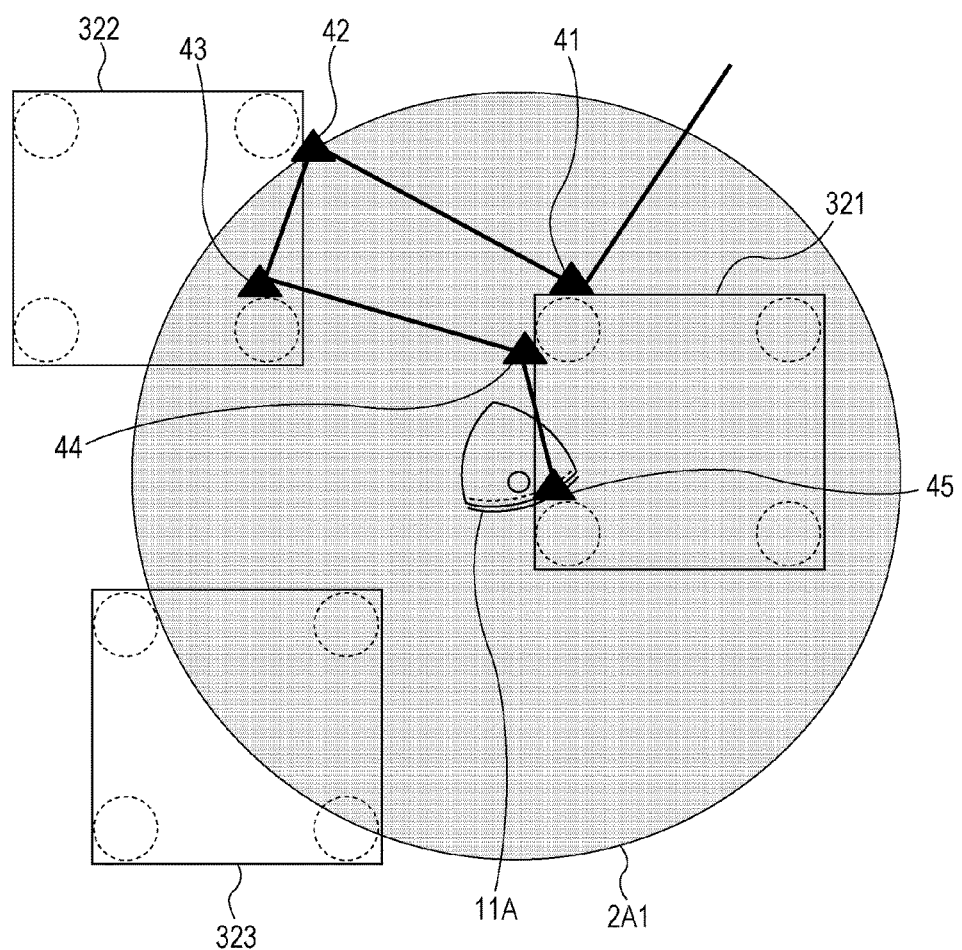
FIG. 11 is a diagram illustrating an example of the transmission range of the collision preventing signal of the self-propelled vacuum in Embodiment 2.

FIG. 11 is a diagram illustrating an example in which the self-propelled vacuum 11A successively detects legs of the chairs 321 to 323 as obstacles at obstacle detection positions 41, 42, 43, 44, and 45 at time intervals which are not longer than the obstacle detection interval 1137A and transmits a collision preventing signal 2A1 at the obstacle detection position 45.

In FIG. 11, the transmission power controller individually measures the distances between the obstacle detection position 45 and the respective successive obstacle detection positions 41 to 44 and transmits the collision preventing signal 2A1 with the transmission power controlled so that the collision preventing signal 2A1 reach the obstacle detection position 42, which is the farthest from the obstacle detection position 45. With this configuration, the self-propelled vacuum 11A is able to transmit the collision preventing signal from the obstacle detection position 45 to the minimum range that includes all of the current successive obstacle detection positions 41 to 44. Since the obstacle detection positions 41 to 44 are the positions where obstacles are located, the collision preventing signal needs to be transmitted so as to cover at least the obstacle detection positions 41 to 44. With the configuration of FIG. 11, the self-propelled vacuum 11A is able to transmit the collision preventing signal to the required minimum range.

The distances between the obstacle detection position 45 and the successive obstacle detection positions 41 to 44 can be calculated based on the travel distances between obstacle detections and the angles by which the self-propelled vacuum 11A turns at each obstacle detection position with reference to the obstacle detection history information 1135A. To calculate the travel distance between the obstacle detection positions 45 and 43, for example, the distance between the obstacle detection positions 45 and 44, the distance between the obstacle detection positions 44 and 43, and the angle by which the self-propelled vacuum 11A turns around at the obstacle detection position 44 are extracted with reference to the obstacle detection history information 1135A. The extracted values are applied to the cosine formula. The distances between the obstacle detection position 45 and the obstacle detection positions 41 and 42 can be extracted using the obstacle detection history information 1135A in a similar manner.

Figure 12:
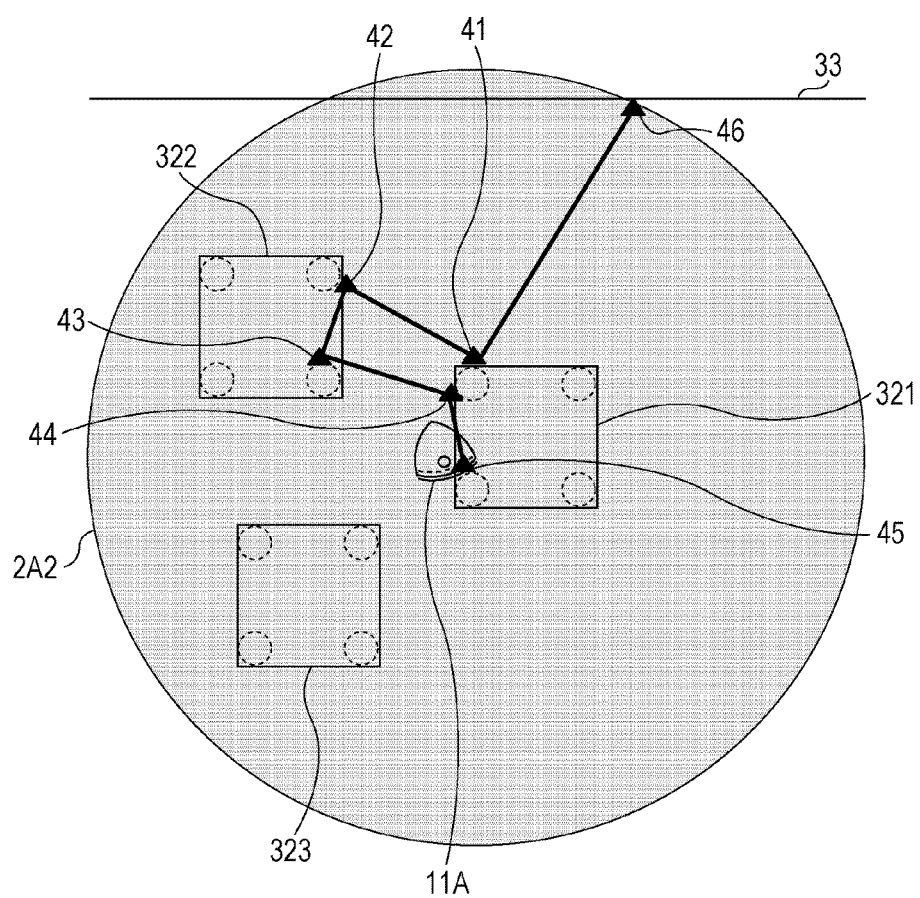
FIG. 12 is a diagram illustrating another example of the transmission range of the collision preventing signal of the self-propelled vacuum in Embodiment 2.

In a similar manner to FIG. 11, FIG. 12 is a diagram illustrating an example in which the self-propelled vacuum 11A successively detects the legs of the chairs 321 to 323 as obstacles at obstacle detection positions 41, 42, 43, 44, and 45 at time intervals which are not longer than the obstacle detection intervals 1137A and transmits a collision preventing signal 2A2 at the obstacle detection position 45.

In FIG. 12, the collision preventing signal 2A2 is transmitted with the transmission power controlled so that the collision preventing signal 2A2 reaches an obstacle detection position 46 preceding to the obstacle detection position 41 which is the first one of the successive obstacle detection positions 41 to 45.

With the configuration of FIG. 12, in a similar to the configuration of FIG. 11, the transmission power controller measures the distances between the obstacle detection position 45 and the successive obstacle detection positions 41 to 44 and 46 and transmits the collision preventing signal 2A2 with the transmission power controlled so that the collision preventing signal 2A2 reach the obstacle detection position 46, which is the farthest from the obstacle detection position 45. This configuration is able to prevent another self-propelled vacuum from approaching the entrance to the region containing many obstacles. In the case where there is only one entrance to the space containing many obstacles (a route from the obstacle detection position 46 to the obstacle detection position 41 in FIG. 12), for example, this configuration prevents another self-propelled vacuum from moving to the entrance to the space containing many obstacles and clogging the entrance in some cases and allows the self-propelled vacuum 11A to move out of the region containing many obstacles.

Figure 13B:
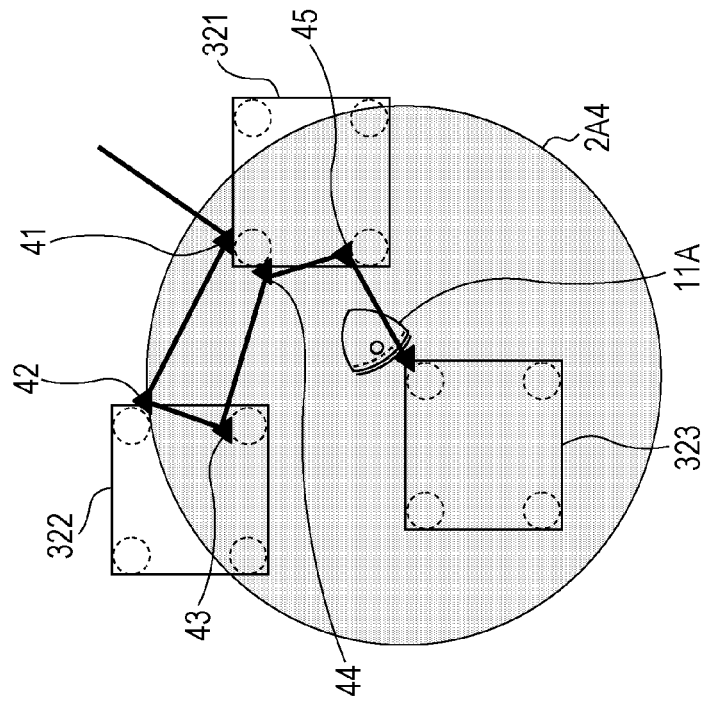
FIGS. 13A and 13B are diagrams illustrating still another example of the transmission range of the collision preventing signal of the self-propelled vacuum in Embodiment 2.
Figure 13A:
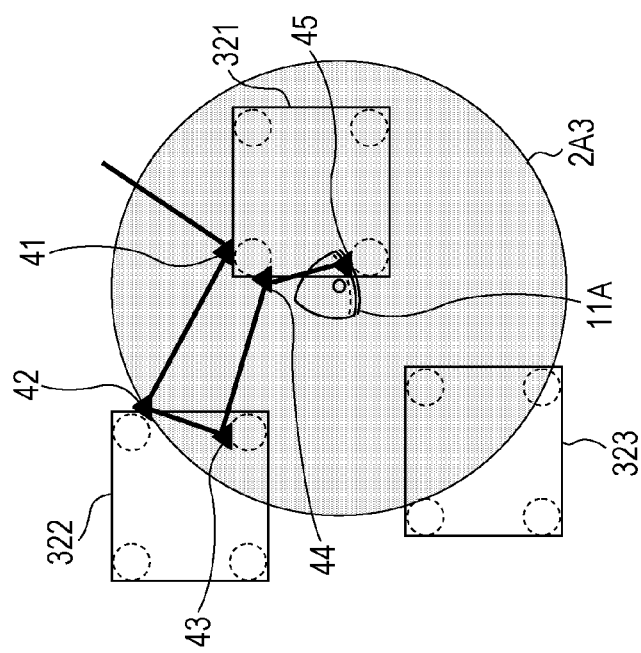

FIGS. 13A and 13B are diagrams illustrating an example in which the self-propelled vacuum 11A changes the transmission range of the collision preventing signal when detecting another obstacle, while moving, within the obstacle detection interval 1137A after transmitting the collision preventing signal.

In FIG. 13A, in a similar manner to FIG. 11, the self-propelled vacuum 11A successively detects the legs of the chairs 321 to 323 as obstacles at obstacle detection positions 41, 42, 43, 44, and 45 at time intervals which are not longer than the obstacle detection interval 1137A and transmits a collision preventing signal 2A3 at the obstacle detection position 45.

In FIG. 13B, the self-propelled vacuum 11A further moves from the obstacle detection position 45 and detects an obstacle at an obstacle detection position 47. The self-propelled vacuum 11A recalculates the transmission range of the collision preventing signal and, based on the result of recalculation, transmits a collision preventing signal 2A4.

In FIG. 13B, in a similar manner to FIG. 11, the transmission range of the collision preventing signal is recalculated by measuring the distances between the obstacle detection position 47 and the obstacle detection positions 41 to 45. The collision preventing signal 2A3 is transmitted with the transmission power controlled so that the collision preventing signal 2A3 reach the obstacle detection position 42, which is the farthest from the obstacle detection position 47. With this configuration, the self-propelled vacuum 11A is able to transmit the collision preventing signal properly so as to cover all of the successive obstacle detection positions at each obstacle detection. It is therefore possible to minimize the electric power consumed for transmitting the collision preventing signal and prevent another self-propelled vacuum from entering the region containing many obstacles and colliding with the self-propelled vacuum 11A.

(Embodiment 3)

In Embodiment 3, a description is given of a method with which a self-propelled vacuum 11B outputs a collision preventing signal in order to prevent the following situation. When another self-propelled vacuum 12B approaches and collides with the self-propelled vacuum 11B while the self-propelled vacuum 11B is moving in the room corner, the self-propelled vacuum 11B repeatedly collides with the room corner and the self-propelled vacuum 12B and spends a lot of time moving out of the room corner.

Figure 14:
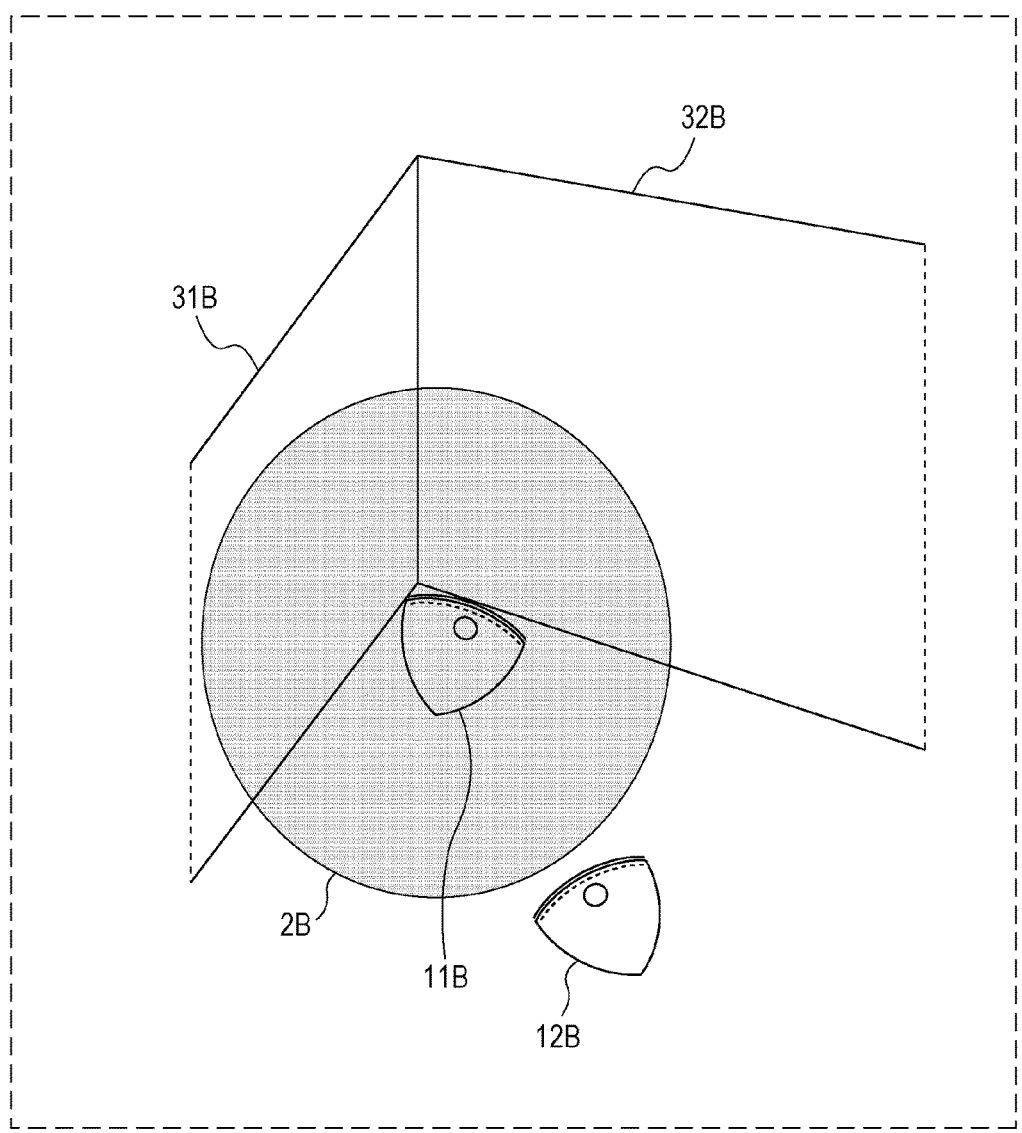
FIG. 14 is a conceptual diagram illustrating an entire image of a robot system of Embodiment 3.

FIG. 14 is a conceptual view illustrating an example in which when the self-propelled vacuum 11B detects a wall 32B in the direction of travel while moving along a wall 31B and determines that the self-propelled vacuum 11B is in a room corner, the self-propelled vacuum 11B transmits a collision preventing signal 2B to prevent the self-propelled vacuum 12B from approaching and colliding with the self-propelled vacuum 11B.

Figure 15:
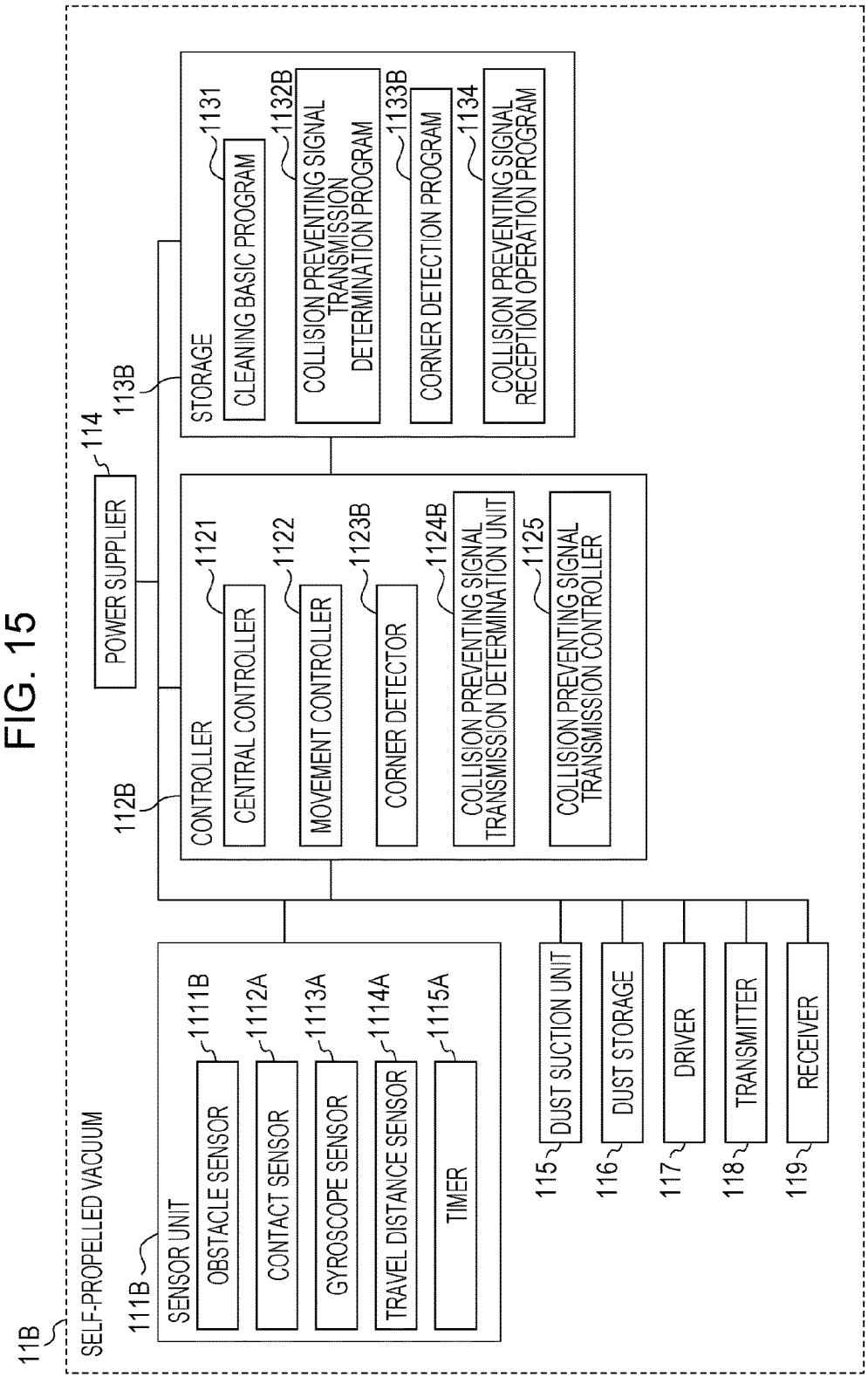
FIG. 15 is a block diagram illustrating the configuration of a self-propelled vacuum of Embodiment 3.

FIG. 15 is a block diagram illustrating an example of the functional configuration of the self-propelled vacuum 11B of Embodiment 3. The same elements as those of FIG. 8 are given the same numerals, and the description thereof is omitted.

The self-propelled vacuum 11B illustrated in FIG. 15 is different from the self-propelled vacuum 11A illustrated in FIG. 8 in a sensor unit 111B, a controller 112B, and a storage 113B.

The sensor unit 111B is different from the sensor unit 111A of the self-propelled vacuum 11A illustrated in FIG. 8 in an obstacle sensor 1111B.

The obstacle sensor 1111B is a sensor which measures the distance to an obstacle similarly to the obstacle sensor 1111A of FIG. 8. The obstacle sensor 1111B emits infrared rays or ultrasonic waves and measures the distance to an obstacle for obstacle detection by measuring the reflection from the obstacle, for example. In Embodiment 3, the obstacle sensor 1111B is configured to detect obstacles which are located in the direction of travel of the self-propelled vacuum 11B and are located on the right and left sides of the self-propelled vacuum 11B.

The controller 112B is different from the controller 112A of the self-propelled vacuum 11A illustrated in FIG. 8 in a corner detector 1123B and a collision preventing signal transmission determination unit 1124B.

The corner detector 1123B performs processing based on a corner detection program 1133B.

The collision preventing signal transmission determination unit 1124B performs processing based on a collision preventing signal transmission determination program 1132B.

The storage 113B is different from the storage 113A of the self-propelled vacuum 11A illustrated in FIG. 8 in the configurations of the collision preventing signal transmission determination program 1132B and corner detection program 1133B.

The collision preventing signal transmission determination program 1132B is executed by the collision preventing signal transmission determination unit 1124B. Specifically, when the corner detector 1123B detects that the self-propelled vacuum 11B is located in the corner, the collision preventing signal transmission determination unit 1124B starts transmitting the collision preventing signal. When the corner detector 11238 detects that the self-propelled vacuum 11B has moved of the corner, the collision preventing signal transmission determination unit 1124B stops transmitting the collision preventing signal.

The corner detection program 1133B is executed by the corner detector 1123B. Specifically, the corner detector 1123B determines that the self-propelled vacuum 11B is located in the corner when the self-propelled vacuum 11B moves along the obstacle as detecting the obstacle with the obstacle sensor 1111B provided in the right or left side of the self-propelled vacuum 11B and then detects an obstacle in the direction of travel with the obstacle sensor 1111B provided in the front of the self-propelled vacuum 11B in the direction of travel. The corner detector 11238 determines that the self-propelled vacuum 11B has moved out of the room corner when it is detected that the self-propelled vacuum 11B determined to be located in the corner has traveled a predetermined distance after turning to the direction other than the direction of the obstacle and starting moving again.

Figure 16:
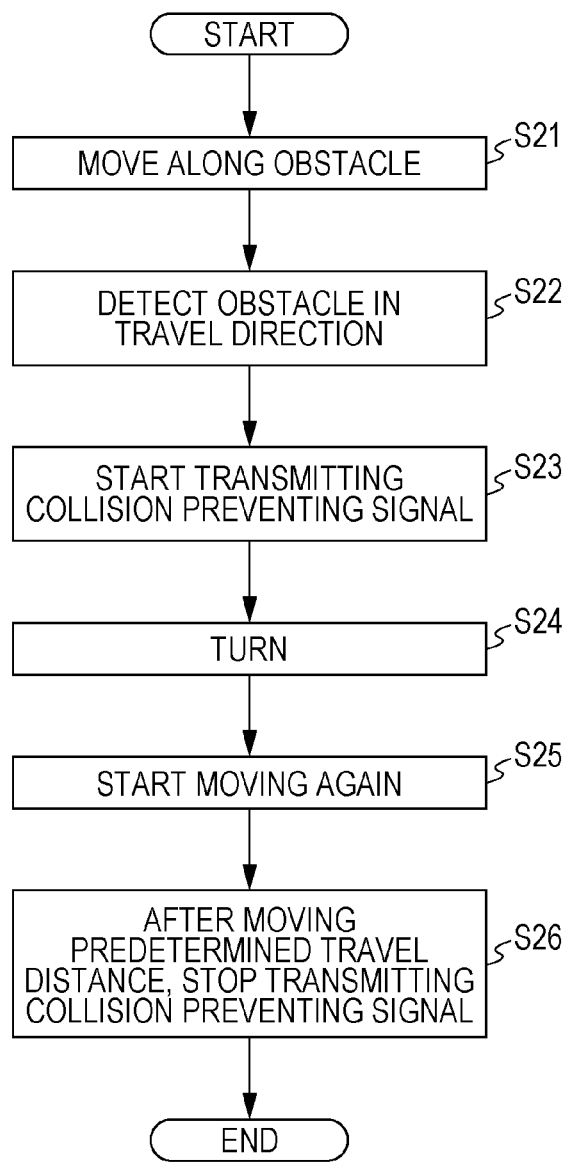
FIG. 16 is a flowchart illustrating an operation of the self-propelled vacuum of Embodiment 3 to transmit collision preventing signal.

FIG. 16 is a flowchart illustrating the flow of the operation of the self-propelled vacuum 11B of Embodiment 3 to start and stop transmitting a collision preventing signal when the self-propelled vacuum 11B of Embodiment 3 detects a corner while moving along an obstacle.

Hereinafter, the flowchart is described in detail.

The self-propelled vacuum 11B moves along an obstacle while detecting the obstacle with the obstacle sensor 1111B provided in the right or left side of the self-propelled vacuum 11B (S21). The movement of the self-propelled vacuum 11B is based on one of the predetermined moving patterns included in the cleaning basic program 1131, such as wall travel or zigzag travel, for example. The self-propelled vacuum 11B moves as sensing an obstacle with the obstacle sensor 1111B, which is provided in the front of the self-propelled vacuum 11B in the direction of travel.

The corner detector 1123B determines that the self-propelled vacuum 11B is located in the corner when, the self-propelled vacuum 11B which is moving along the obstacle detects another obstacle in the direction of travel (S22). The corner detector 1123B notifies the collision preventing signal transmission determination unit 1124B of the determination.

Upon being notified by the corner detector 1123B that the self-propelled vacuum 11B is located in the corner, the collision preventing signal transmission determination unit 1124B instructs the collision preventing signal transmission controller 1125 to start transmitting the collision preventing signal from the transmitter 118 (S23).

When the obstacle sensor 1111B detects based on the cleaning basic program 1131 that the distance to the obstacle in the direction of travel is equal to a predetermined distance, the movement controller 1122 turns the self-propelled vacuum 11B to the direction that no obstacle is located (S24) and causes the self-propelled vacuum 11B to start moving again. The self-propelled vacuum 11B starts moving along the obstacle again as detecting the obstacle with the obstacle sensor 1111B, which is provided to the right or left side (S25).

When it is detected that the self-propelled vacuum 11B starts moving again, the corner detector 1123B causes the travel distance sensor 1114A to measure the distance that the self-propelled vacuum 11B has traveled after starting moving again. When detecting that the self-propelled vacuum 11B has traveled a predetermined distance, the corner detector 1123B determines that the self-propelled vacuum 11B has escaped from the situation of being located in the corner. The corner detector 1123B then notifies the collision preventing signal transmission determination unit 1124B of the determination. With the above configuration, it is determined that the self-propelled vacuum 11B has escaped from the situation of being in the corner by measuring the distance that the self-propelled vacuum 11B has traveled after starting moving again and detecting that the self-propelled vacuum 11B has travelled a predetermined distance. This is because the self-propelled vacuum 11B is thought to be still in the room corner just after turning in the corner and starting moving again.

Upon being notified by the corner detector 1123B that the self-propelled vacuum 11B has escaped from the situation of being located in the corner, the collision preventing signal transmission determination unit 1124B instructs the collision preventing signal transmission controller 1125 to stop transmitting the collision preventing signal from the transmitter 118 (S26).

With the aforementioned configuration, it is possible to prevent another self-propelled vacuum from approaching and colliding with the self-propelled vacuum 11B which is moving in the room corner. The self-propelled vacuum 11B is therefore able to move out of the room corner smoothly.

In Embodiment 3, obstacles are detected using the obstacle sensor 1111B. However, obstacles may be detected using a contact sensor instead of the obstacle sensor 1111B. Alternatively, obstacles may be detected by a combination of the obstacle sensor 1111B and a collision sensor.

In Embodiment 3, the corner detector 1123B determines that the self-propelled vacuum 11B has escaped from the situation of being located in the corner when the distance that the self-propelled vacuum 11B has traveled after the self-propelled vacuum 11B turns in the corner and starts moving again exceeds the predetermined distance. However, the corner detector 1123B may be configured to determine that the self-propelled vacuum 11B has escaped from the situation of being in the corner when the travel time after the self-propelled vacuum 11B starts moving again exceeds a predetermined time. This can provide the same effect.

In Embodiment 3, the collision preventing signal transmission determination unit 1124B instructs the collision preventing signal transmission controller 1125 to start and stop transmitting the collision preventing signal from the transmitter 118. However, the collision preventing signal transmission determination unit 1124B may be configured to only instruct the collision preventing signal transmission controller 1125 to start transmitting the collision preventing signal by previously setting the duration of transmission. In this configuration, the process to stop transmitting the collision preventing signal is unnecessary. The duration of transmission of the collision preventing signal is properly set by estimating the time required for the self-propelled vacuum 11B to detect a corner and move out of the corner based on the travel speed of the self-propelled vacuum 11B and the time spent turning, which are previously known by the specifications of the self-propelled vacuum 11B.

In the configuration described Embodiment 3, the corner detector 1123B determines that the self-propelled vacuum 11B has escaped from the situation of being in the corner when the self-propelled vacuum 11B travels a predetermined distance after turning around and starting moving again. Embodiment 3 is not limited to the aforementioned configuration.

In the case where the cleaning basic program 1131 further includes a special operation pattern for cleaning a corner, the self-propelled vacuum 11B may be configured to when detecting a corner, change the moving pattern from wall travel to a moving pattern for cleaning a corner (hereinafter, referred to as a corner moving pattern).

In this configuration, when detecting a corner, the self-propelled vacuum 11B starts transmitting the collision preventing signal and performs moving operation in the corner moving pattern. When finishing the corner moving pattern, the self-propelled vacuum 11B starts moving again in another operation pattern.

In this configuration, the self-propelled vacuum 11B stops transmitting the collision preventing signal when the corner detector 1123B detects that the self-propelled vacuum 11B finishes the corner moving pattern and starts moving in another operation pattern and moreover detects that the self-propelled vacuum 11B has traveled a predetermined distance. The distance that the self-propelled vacuum 11B has traveled is measured by the travel distance sensor 1114A.

The self-propelled vacuum 11B of Embodiment 3 may include a collision preventing signal transmission direction controller configured to make control so that the collision preventing signal is transmitted only in a predetermined direction. With this configuration, the self-propelled vacuum 11B is able to transmit the collision preventing signal only in the direction that no obstacle is located when detecting a corner. It is therefore possible to prevent the collision preventing signal from being transmitted towards walls forming the corner, thus reducing the waste of the transmission power.

(Embodiment 4)

In Embodiment 4, a description is given of a method with which a self-propelled vacuum 11C outputs a collision preventing signal in order to prevent the self-propelled vacuum 11C from spending a lot of time moving out of a narrow space between obstacles 31C and 32C when another self-propelled vacuum 12C approaches and collides with the self-propelled vacuum 11C which is moving in the narrow space.

Figure 17:
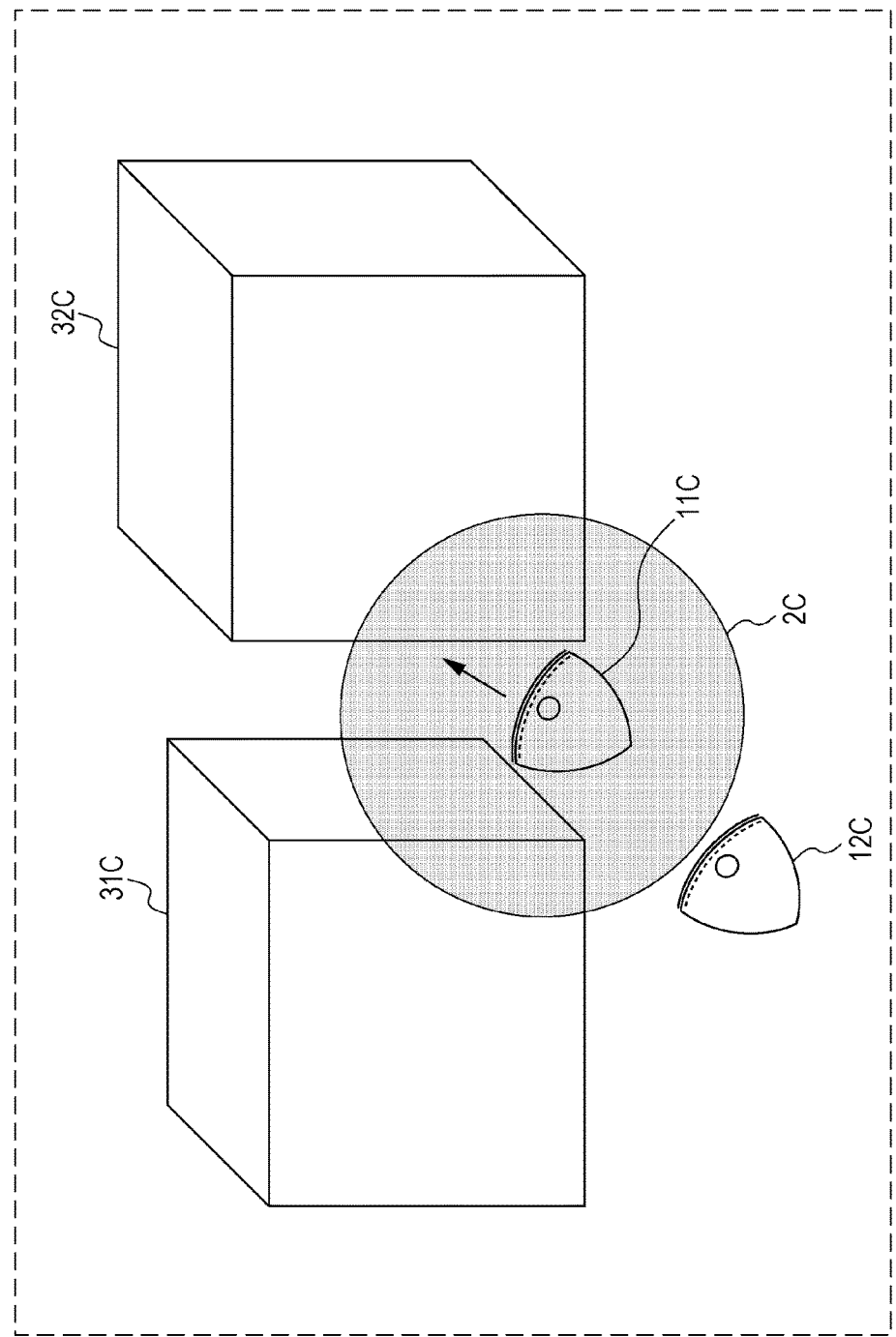
FIG. 17 is a conceptual diagram illustrating an entire image of a robot system of Embodiment 4.

FIG. 17 is a conceptual diagram illustrating an example in which the self-propelled vacuum 11C transmits a collision preventing signal 2C when determining that the self-propelled vacuum 11C is moving between the obstacles 31C and 32C so that the self-propelled vacuum 12C does not approach and collide with the self-propelled vacuum 11C.

Figure 18:
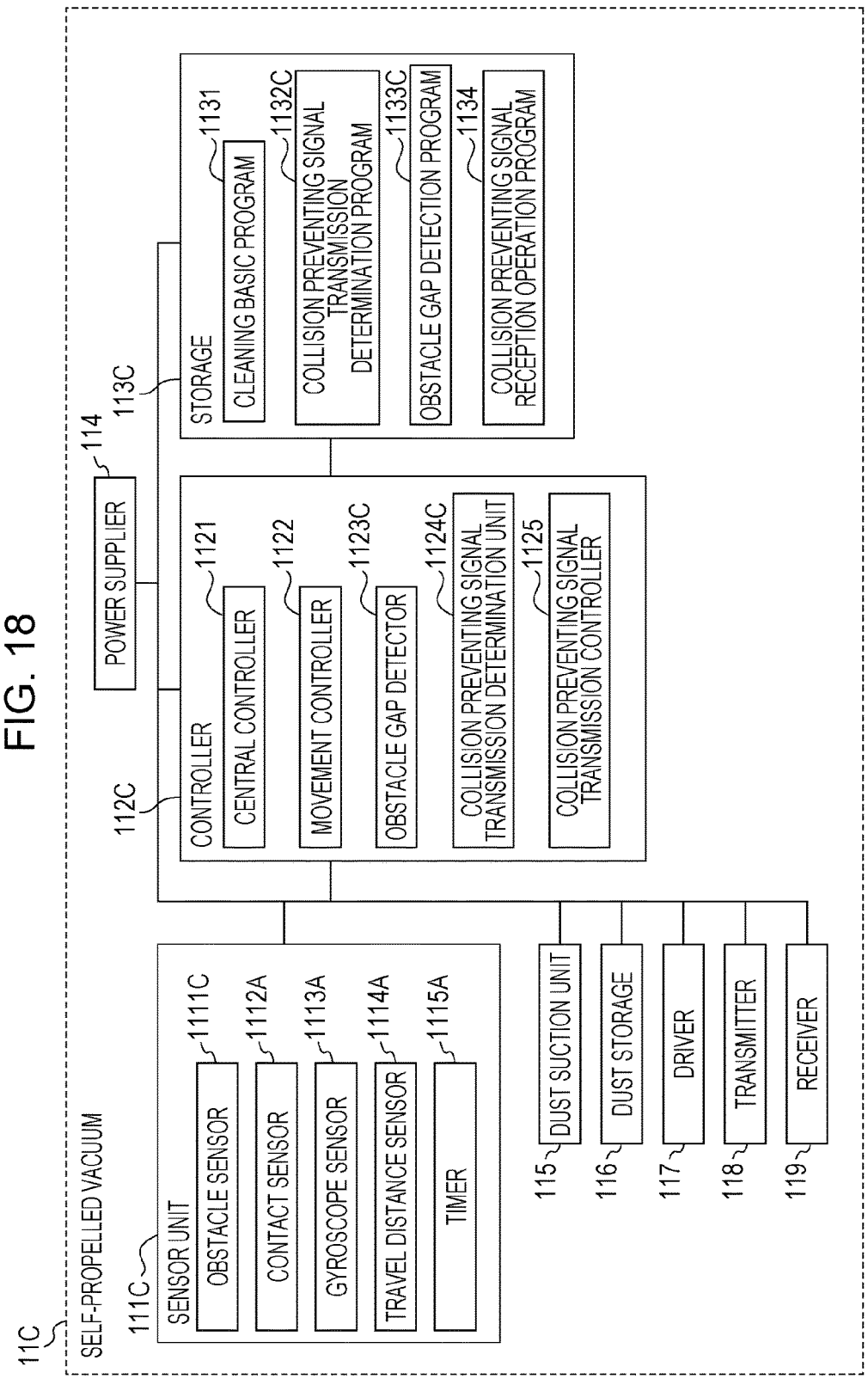
FIG. 18 is a block diagram illustrating the configuration of a self-propelled vacuum of Embodiment 4.

FIG. 18 is a block diagram illustrating an example of the functional configuration of the self-propelled vacuum 11C in Embodiment 4. The same elements as those in FIG. 8 are given the same numerals, and the detailed description thereof is omitted.

The self-propelled vacuum 11C illustrated in FIG. 18 is different from the self-propelled vacuum 11A illustrated in FIG. 8 in a sensor unit 111C, a controller 112C, and a storage 113C.

The sensor unit 111C is different from the sensor unit 111A of the self-propelled vacuum 11A illustrated in FIG. 8 in obstacle sensors 1111C.

Each obstacle sensor 1111C is a sensor to measure the distance to an obstacle similarly to the obstacle sensor 1111A. The obstacle sensor 1111C emits infrared rays or ultrasonic waves and measures the distance to an obstacle for obstacle detection by measuring the reflection from the obstacle, for example. In Embodiment 4, the obstacle sensor 1111C is configured to detect at least obstacles which are located on the right and left sides of the self-propelled vacuum 11C.

The controller 112C is different from the controller 112A of the self-propelled vacuum 11A illustrated in FIG. 8 in an obstacle gap detector 1123C and a collision preventing signal transmission determination unit 1124C.

The obstacle gap detector 1123C performs processing based on an obstacle gap detection program 1133C.

The collision preventing signal transmission determination unit 1124C performs processing based on a collision preventing signal transmission determination program 1132C.

The storage 113C is different from the storage 113A of the self-propelled vacuum 11A illustrated in FIG. 8 in the configurations of the collision preventing signal transmission determination program 1132C and obstacle gap detection program 1133C.

The collision preventing signal transmission determination program 1132C is executed by the collision preventing signal transmission determination unit 1124C. Specifically, when the obstacle gap detector 1123C detects that the self-propelled vacuum 11C is located in a narrow space between obstacles, the collision preventing signal transmission determination unit 1124C starts transmitting the collision preventing signal. When the obstacle gap detector 1123C detects that the self-propelled vacuum 11C has escaped from the situation of being in the narrow space between obstacles, the collision preventing signal transmission determination unit 1124C stops transmitting the collision preventing signal.

The obstacle gap detection program 1133C is executed by the obstacle gap detector 1123C. Specifically, the obstacle gap detector 1123C determines that the self-propelled vacuum 11C is located in a narrow space between obstacles when obstacle sensors 1111C, which are provided in right and left sides of the self-propelled vacuum 11C, detect obstacles on the right and left sides of the self-propelled vacuum 11C, respectively. The obstacle detector 1123C determines that the self-propelled vacuum 11C has escaped from the situation of being in a narrow space between obstacles when at least one of the obstacle sensors 1111C, which are provided in the right and left sides of the self-propelled vacuum 11C, stops detecting an obstacle.

Figure 19:
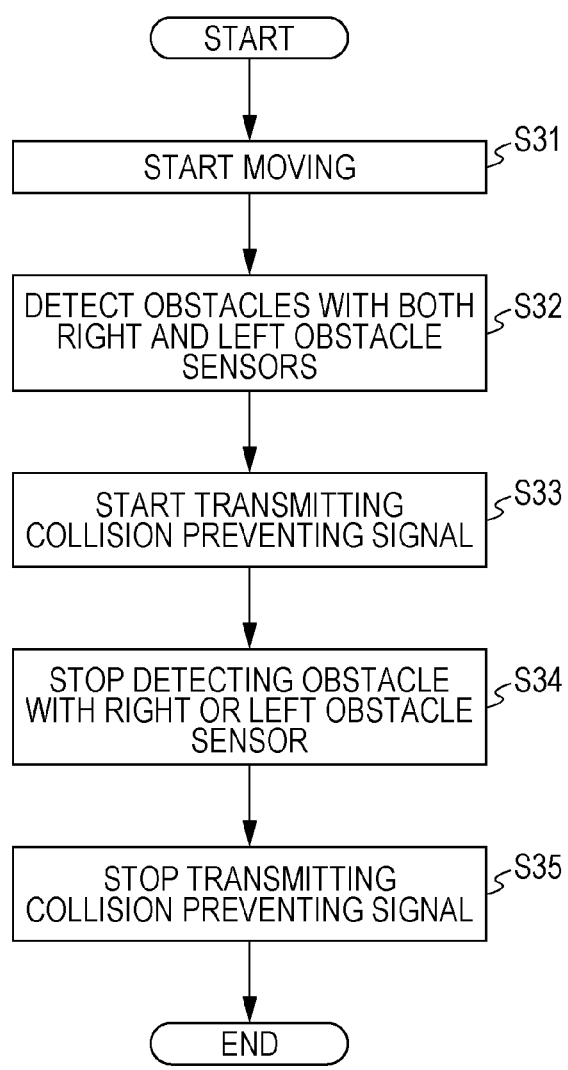
FIG. 19 is a flowchart illustrating an operation of the self-propelled vacuum of Embodiment 4 to transmit collision preventing signal.

FIG. 19 is a flowchart illustrating the flow of the operation of the self-propelled vacuum 11C of Embodiment 4 to start and stop transmitting the collision preventing signal while moving between obstacles.

Hereinafter, the flowchart is described in detail.

The self-propelled vacuum 11C starts moving by causing the movement controller 1122 to control the driver 117 based on the cleaning basic program 1131 in the storage 113C (S31). The self-propelled vacuum 11C continues the moving operation until both of the obstacle sensors 1111C provided in the right and left sides of the self-propelled vacuum 11C detect obstacles.

When both of the obstacle sensors 1111C, which are provided in the right and left sides of the self-propelled vacuum 11C, detect obstacles while the self-propelled vacuum 11C is moving (S32), the obstacle gap detector 1123C determines that the self-propelled vacuum 11C is in a narrow space between the obstacles and notifies the collision preventing signal transmission determination unit 1124C of the determination.

Upon being notified by the obstacle gap detector 1123C that the self-propelled vacuum 11C is in a narrow space between the obstacles, the collision preventing signal transmission determination unit 1124C instructs the collision preventing signal transmission controller 1125 to start transmitting the collision preventing signal from the transmitter 118 (S33).

The self-propelled vacuum 11C continues moving as transmitting the collision preventing signal. When at least one of the obstacle sensors 1111C, which are provided in the right and left sides of the self-propelled vacuum 11C, stops detecting an obstacle while the self-propelled vacuum 11C is moving (S34), the obstacle gap detector 1123C determines that the self-propelled vacuum 11C has escaped from the situation of being in the narrow space between the obstacles and notifies the collision preventing signal transmission determination unit 1124C of the determination.

When being notified by the obstacle gap detector 1123C that the se propelled vacuum 11C has escaped from the situation of being in the narrow space between the obstacles, the collision preventing signal transmission determination unit 1124C instructs the collision preventing signal transmission controller 1125 to stop transmitting the collision preventing signal from the transmitter 118 (S35).

With the aforementioned configuration, it is possible to prevent the self-propelled vacuum 11C from spending a lot of time moving out of the narrow space between the obstacles 31C and 32C when the self-propelled vacuum 12C approaches and collides with the self-propelled vacuum 11C which is moving in the narrow space.

In Embodiment 4, the obstacle gap detector 1123C determines that the self-propelled vacuum 11C is located in a narrow space between obstacles when the obstacle sensors 1111C, which are provided in the right and left sides of the self-propelled vacuum 11C, detect obstacles on the right and left sides of the self-propelled vacuum 11C, respectively. However, the obstacle gap detector 1123C may be configured to determine that the self-propelled vacuum 11C is located in a narrow space between obstacles when the obstacle sensors 1111C, which are provided in the right and left sides of the self-propelled vacuum 11C, detect obstacles on the right and left sides of the self-propelled vacuum 11C, respectively and when the distance between the self-propelled vacuum 11C and the obstacles is shorter than a predetermined distance. It is assumed that the obstacle sensors 1111C are able to detect distant obstacles. When the obstacle sensors 1111C, which are provided in the right and left sides of the self-propelled vacuum 11C, individually detect distant obstacles, there is a space between the obstacles, but the space is not narrow. In such a case, the self-propelled vacuum 11C does not need to transmit the collision preventing signal. In this configuration, the condition that the distance between the self-propelled vacuum 11C and obstacles is shorter than the predetermined distance may include the condition that distance 1 between the self-propelled vacuum 11C and the right obstacle and distance 2 between the self-propelled vacuum 11C and the left obstacle are individually shorter than a predetermined distance and the condition that distance 3, which is the sum of the distances 1 and 2, is shorter than a predetermined distance.

Moreover, in the above configuration where the obstacle gap detector 1123C determines that the self-propelled vacuum 11C is located in a narrow space between obstacles when the obstacle sensors 1111C, which are provided in the right and left sides of the self-propelled vacuum 11C, detect obstacles on the right and left sides of the self-propelled vacuum 11C, respectively and when the distance between the self-propelled vacuum 11C and the obstacles is shorter than a predetermined distance, the obstacle gap detector 1123C determines that the self-propelled vacuum 11C has escaped from the situation of being in the narrow space between the obstacles when the obstacle sensor 1111C provided in the right or left side of the self-propelled vacuum 11C does not detect an obstacle or when the distance between the self-propelled vacuum 11C and the obstacles exceeds the predetermined distance.

In Embodiment 4, the collision preventing signal is transmitted by the obstacle gap detector 1123C when the obstacle sensors 1111C, which are provided in the right and left sides of the self-propelled vacuum 11C, detect obstacles on the right and left sides of the self-propelled vacuum 11C, respectively. However, Embodiment 4 is not limited to the configuration.

The collision preventing signal may be transmitted obstacle gap detector 1123C when the obstacle sensors 1111C, which are provided in the right and left sides of the self-propelled vacuum 11C, detect obstacles on the right and left sides of the self-propelled vacuum 11C, respectively and moreover when it is detected that the self-propelled vacuum 11C has traveled a predetermined distance or for a predetermined travel time as continuing to detect the right and left obstacles.

With the aforementioned configuration, the self-propelled vacuum 11C is prevented from temporarily detecting obstacles on the right and left of the self-propelled vacuum 11C to transmit the collision preventing signal. For example, while the left obstacle sensor 1111C continues to detect an obstacle, a moving body, such as a person or a pet, passes on the right side of the self-propelled vacuum 11C in some cases. In such a situation, the above configuration prevents the self-propelled vacuum 11C from transmitting the collision preventing signal when the right obstacle sensor 1111C detects a narrow space temporarily formed between the obstacle and the moving body, such as a person or a pet. According to the configuration, it is possible to reduce power consumption for transmitting the collision preventing signal.

In Embodiment 4, the self-propelled vacuum 11C stops transmitting the collision preventing signal when at least one of the obstacle sensors 1111C provided in the right and left sides of the self-propelled vacuum 11C stops detecting an obstacle while the self-propelled vacuum 11C is moving. However, Embodiment 4 is not limited to the above configuration.

The self-propelled vacuum 11C may be configured to stop transmitting the collision preventing signal obstacle gap detector 1123C when at least one of the obstacle sensors 1111C provided in the right and left sides of the self-propelled vacuum 11C stops detecting an obstacle while the self-propelled vacuum 11C is moving and moreover when the self-propelled vacuum 11C detects that the self-propelled vacuum 11C has traveled a predetermined distance or for a predetermined travel time with no change in the situation where the self-propelled vacuum 11C has escaped from the situation of being in a narrow space between the obstacles.

With the aforementioned configuration, it is possible to prevent the self-propelled vacuum 11C from stopping transmitting the collision preventing signal when the self-propelled vacuum 11C temporarily moves out of the narrow space between obstacles. For example, it is assumed that the self-propelled vacuum 11C travels between an obstacle on the right side and plural obstacles on the left side which are arranged at short intervals in the direction of travel of the self-propelled vacuum 11C. In such a situation, the self-propelled vacuum 11C senses gap between the plural obstacles arranged on the left side and cannot detect the plural obstacles in some cases. Even in such a case, the aforementioned configuration prevents the self-propelled vacuum 11C from determining that the self-propelled vacuum 11C has escaped from the situation of being in a narrow space between obstacles and stopping transmitting the collision preventing signal. It is therefore possible to prevent another self-propelled vacuum 11C from entering the narrow space between the obstacles even though the self-propelled vacuum 11C has not completely moved out of the narrow space between the obstacles.

In Embodiment 4, the collision preventing signal transmission determination unit 1124C instructs the collision preventing signal transmission controller 1125 to transmit the collision preventing signal from the transmitter 118. However, the self-propelled vacuum 11C may further include a transmission power controller which controls the transmission power of the collision preventing signal. The self-propelled vacuum 11C controls the transmission power with the transmission power controller and changes the transmission range of the collision preventing signal.

With this configuration, the self-propelled vacuum 11C is able to transmit the collision preventing signal only to the necessary range by controlling the transmission power depending on the situation. It is therefore possible to reduce power waste.

For example, when the self-propelled vacuum 11C enters a narrow space between obstacles, it is necessary to transmit the collision preventing signal so as to prevent another self-propelled vacuum from approaching the self-propelled vacuum 11C through the entrance to the space between the obstacles. Accordingly, the self-propelled vacuum 11C may be configured to measure the distance between the current position thereof and the entrance through the travel distance sensor 1114A and control the transmission power of the transmitter 108 so that the collision preventing signal reach the entrance of the narrow space between the obstacles.

Figure 20:
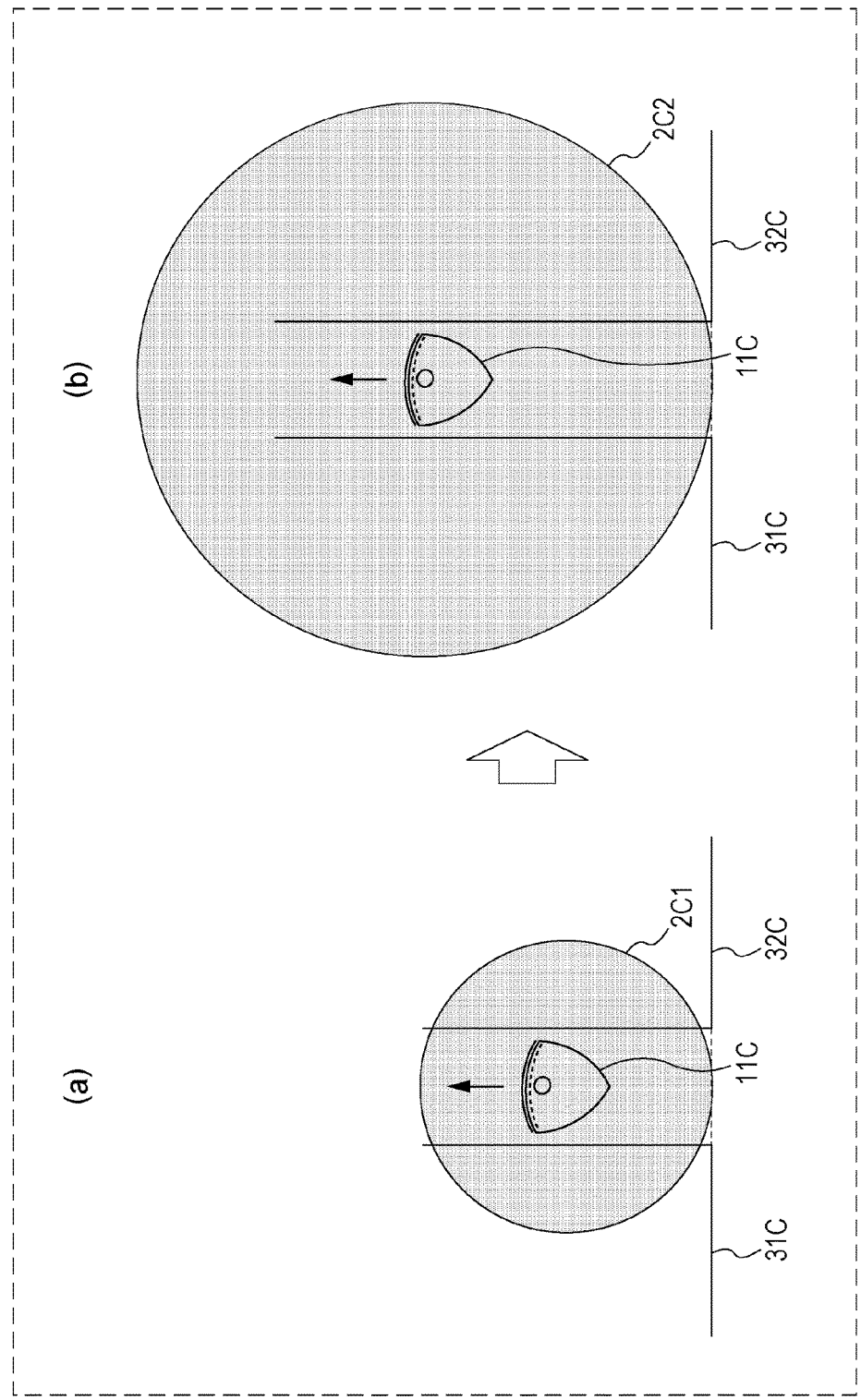
FIG. 20 is a diagram illustrating an example of the range to which the self-propelled vacuum of Embodiment 4 transmits collision preventing signal.

FIG. 20 is a conceptual diagram illustrating the situation where the self-propelled vacuum 11C is transmitting the collision preventing signal from the current position of the self-propelled vacuum 11C to the entrance of the narrow space between the obstacles 31C and 32C. In FIG. 20, the self-propelled vacuum 11C is transmitting a collision preventing signal 2C1 which can reach the entrance of the narrow space between the obstacles 31C and 32C from the current position of the self-propelled vacuum 11C just after entering the entrance of the narrow space between the obstacles 31C and 32C. In FIG. 20, the self-propelled vacuum 11C is transmitting the collision preventing signal 2C2 when further traveling into the narrow space between the obstacles 31C and 32C. As illustrated in FIG. 20, the self-propelled vacuum 11C transmits the collision preventing signal to a necessary range by changing the transmission range of the collision preventing signal based on the distance from the current position of the self-preventing vacuum 11C to the entrance of a narrow space between obstacles. This can prevent electric power from being wasted in transmitting the collision preventing signal.

The self-preventing vacuum 11C of Embodiment 4 may include a collision preventing signal transmission direction controller which makes control so that collision preventing signal is transmitted only in a predetermined direction. With this configuration, the self-propelled vacuum 11C is able to transmit the collision preventing signal only in the direction that no obstacles are located when it is detected that the self-propelled vacuum 11C is moving between obstacles. It is therefore possible to reduce wasted transmission power.

(Embodiment 5)

In Embodiment 5, a description is given of a method with which a self-propelled vacuum 11D outputs a collision preventing signal 2D to prevent another self-propelled vacuum 12D from approaching and colliding with the self-propelled vacuum 11D which is moving toward the charger 5 to return to the charger 5 so that the self-propelled vacuum 11D smoothly move to the charger 5.

Figure 21:
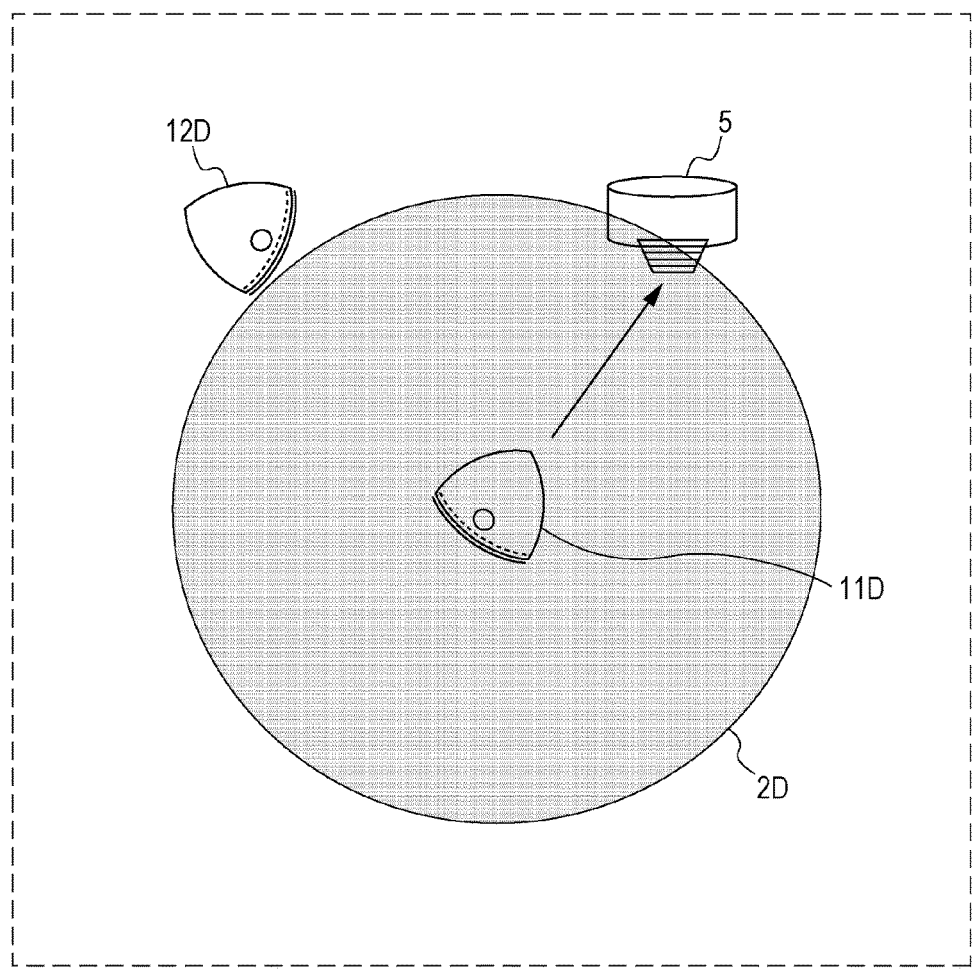
FIG. 21 is a conceptual diagram illustrating an entire image of a robot system of Embodiment 5.

FIG. 21 is a conceptual diagram illustrating an example in which the self-propelled vacuum 11D transmits the collision preventing signal 2D so that the self-propelled vacuum 12D does not approach and collide with the self-propelled vacuum 11D as the self-propelled vacuum 11D is moving towards the charger 5 to return to the charger ]5.

A conventional self-propelled vacuum performs moving operation based on the cleaning basic program. When determining that the cleaning is completed or the battery charge is lower than a predetermined value, the conventional self-propelled vacuum moves to search for a charger. The charger emits infrared signal towards a predetermined region, and the self-propelled vacuum moves while searching for the infrared signal emitted from the charger. When receiving the infrared signal emitted from the charger, the self-propelled vacuum detects the direction of the charger and moves towards the detected direction. Embodiment 5 is described using the method with which the conventional self-propelled vacuum returns to a charger.

Figure 22:
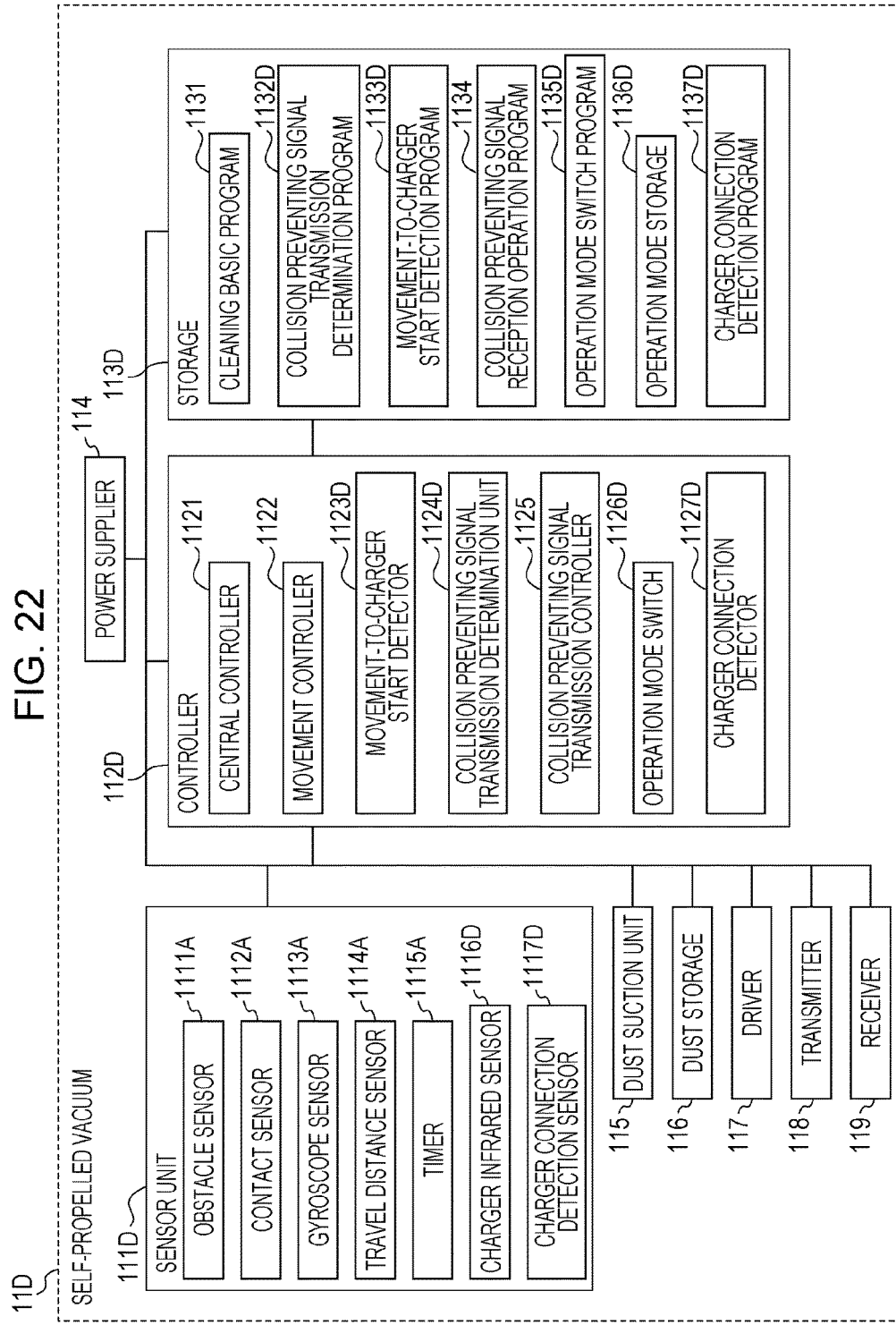
FIG. 22 is a block diagram illustrating the configuration of a self-propelled vacuum of Embodiment 5.

FIG. 22 is a block diagram illustrating an example of the functional configuration of the self-propelled vacuum 11D in Embodiment 5. The same elements as those in FIG. 8 are given the same numerals, and the detailed description thereof is omitted.

The self-propelled vacuum 11D illustrated in FIG. 22 is different from the self-propelled vacuum 11A illustrated in FIG. 8 in a sensor unit 111D, a controller 112D, and a storage 113D.

The sensor unit 111D is different from the sensor unit 111A of the self-propelled vacuum 11A illustrated in FIG. 8 in a charger infrared sensor 1116D and a charger connection detection sensor 1117D.

The charger infrared sensor 1116D is a sensor to receive infrared signal transmitted from the charger 5. When the collision preventing signal transmitted from the self-propelled vacuum is composed of infrared signal, the receiver 119 may be used as the charger infrared sensor 1116D. In this configuration, it is necessary to configure the charger and self-propelled vacuum so that the infrared signal transmitted from the charger 5 is discriminated from the infrared signal transmitted from the self-propelled vacuum. Such configuration is implemented by the charger and self-propelled vacuum transmitting differently modulated infrared signals.

The charger connection detection sensor 1117D is a sensor to detect that the self-propelled vacuum 11D has returned to the charger 5. For example, the charger connection detection sensor 1117D is a sensor to detect that the self-propelled vacuum 11D is connected to a vacuum connector 53 of the charger 5.

The controller 112D is different from the controller 112A of the self-propelled vacuum 11A illustrated in FIG. 8 in a movement-to-charger start detector 1123D, a collision preventing signal transmission determination unit 1124D, an operation mode switch 1126D, and a charger connection detector 1127D.

The movement-to-charger start detector 1123D performs processing based on a movement-to-charger start detection program 1133D.

The collision preventing signal transmission determination unit 1124D performs processing based on a collision preventing signal transmission determination program 1132D.

The operation mode switch 1126D performs processing based on an operation mode switch program 1135D.

The charger connection detector 1127D performs processing based on a charger connection detection program 1137D.

The storage 113D is different from the storage 113A of the self-propelled vacuum 11A illustrated in FIG. 8 in the configurations of the collision preventing signal transmission determination program 1132D, the movement-to-charger start detection program 1133D, the operation mode switch program 1135D, an operation mode storage 1136D, and the charger connection detection program 1137D.

The collision preventing signal transmission determination program 1132D is executed by the collision preventing signal transmission determination unit 1124D. Specifically, when the movement-to-charger start detector 1123D detects that the operation mode of the self-propelled vacuum 11D is a return-to-charger mode and the self-propelled vacuum 11D is receiving the infrared signal from the charger 5, collision preventing signal transmission determination unit 1124D determines that the self-propelled vacuum 11D is in a situation of starting to move toward the charger 5 and starts transmitting the collision preventing signal. When the charger connection detector 1127D detects that the self-propelled vacuum 11D has returned to the charger 5, collision preventing signal transmission determination unit 1124D stops transmitting the collision preventing signal.

The movement-to-charger start detection program 1133D is executed by the movement-to-charger start detector 1123D. Specifically, when the operation mode of the self-propelled vacuum 11D is the return-to-charger mode, the movement-to-charger start detector 1123D determines whether the charger infrared sensor 1116D receives infrared signal from the charger 5. On the other hand, when the operation mode of the self-propelled vacuum 11D is other than the return-to-charger mode, the movement-to-charger start detector 1123D does not determine whether the charger infrared sensor 1116D has received infrared signal from the charger 5.

The operation mode switch program 1135D is executed by the operation mode switch 1126D. Specifically, when detecting that the self-propelled vacuum 11D falls into a predetermined situation, the operation mode switch 1126D changes the operation mode of the self-propelled vacuum 11D and stores the new operation mode in the operation mode storage 1136D.

The operation mode of the self-propelled vacuum 11D includes a cleaning mode, an automatic return mode, and a charge mode, for example.

The cleaning mode is the operation mode in which the self-propelled vacuum 11D performs moving operation based on the cleaning basic program and performs cleaning as moving. The operation mode is set to the cleaning mode when the user turns on the self-propelled vacuum 11D or instructs the self-propelled vacuum 11D in the charge mode to start cleaning.

The automatic return mode is the operation mode in which the self-propelled vacuum 11D performs moving operation based on the cleaning basic program and searches for infrared rays emitted from the charger while moving. The self-propelled vacuum 11D moves to the position of the charger based on the infrared signal found by the search. The operation mode is set to the automatic return mode when the battery charge of the self-propelled vacuum 11D becomes less than a predetermined value while the self-propelled vacuum 11D is in the cleaning mode or when it is determined that the self-propelled vacuum 11D has terminated the predetermined operation pattern and finished cleaning.

The charge mode is an operation mode in which the self-propelled vacuum 11D is charged by the charger 5. The operation mode is set to the charge mode when the self-propelled vacuum 11D is connected to the charger 5 in the automatic return mode.

Embodiment 5 is described using the aforementioned operation mode examples.

The operation mode storage 1136D is a section storing the operation mode of the self-propelled vacuum 11D changed by the operation mode switch 1126D.

The charger connection detection program 1137D is executed by the charger connection detector 1127D. Specifically, the charger connection detector 1127D uses the charger connection detection sensor 1117D to determine whether the self-propelled vacuum 11D has returned to the charger 5.

Figure 23:
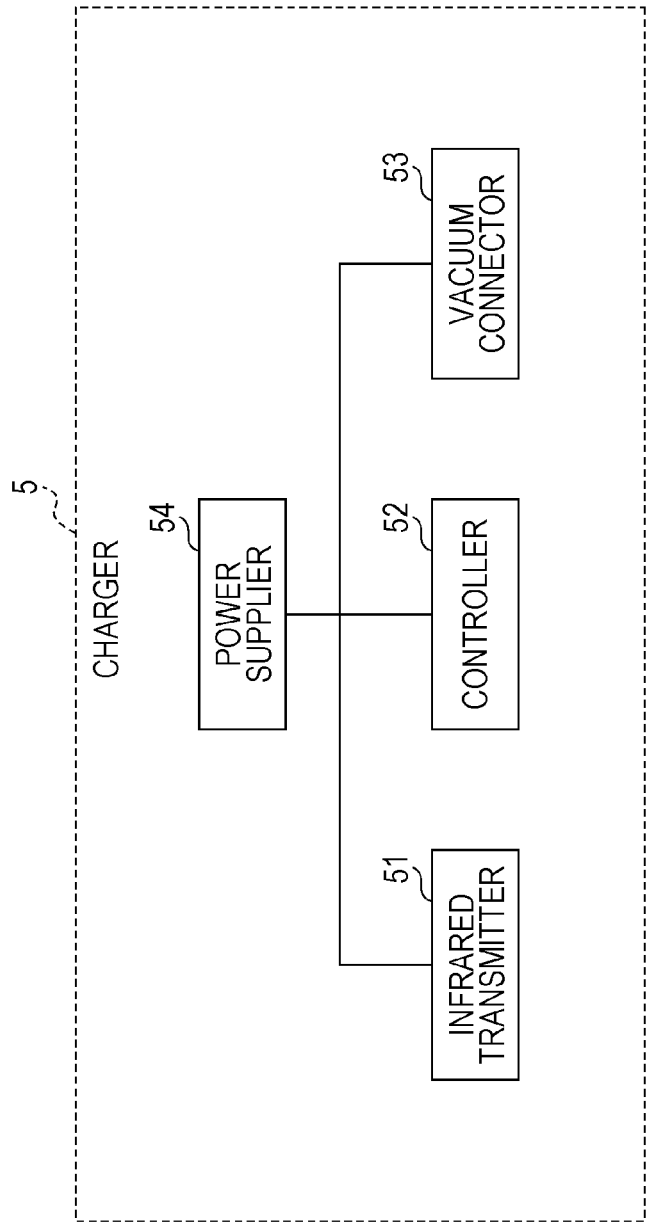
FIG. 23 is a block diagram illustrating the configuration of a charger of Embodiment 5.

FIG. 23 is a block diagram illustrating an example of the functional configuration of the charger 5 in Embodiment 5.

The charger 5 mainly includes an infrared transmitter 51, a controller 52, a vacuum connector 53, and a power supplier 54.

The infrared transmitter 51 is a section transmitting infrared rays that inform the self-propelled vacuum 11D of the position of the charger 5.

The controller 52 is a microcomputer composed of a CPU, a ROM, a RAM, an I/O controller, a timer, and the like, for example. The controller 52 is configured to control the infrared transmitter 51 and control the start of charge when the vacuum 11 is connected to the vacuum connector 53.

The vacuum connector 53 is a section for connection with the self-propelled vacuum 11D. When the self-propelled vacuum 11D is connected to the vacuum connector 53, the vacuum connector 53 supplies DC power given from the power supplier 54 to the connected self-propelled vacuum 11D.

The power supplier 54 is a section which receives AC power from a commercial power supply, converts the AC power to DC power applicable to charge of the self-propelled vacuum 11D, and supplies the DC power to the vacuum connector 53.

Figure 24:
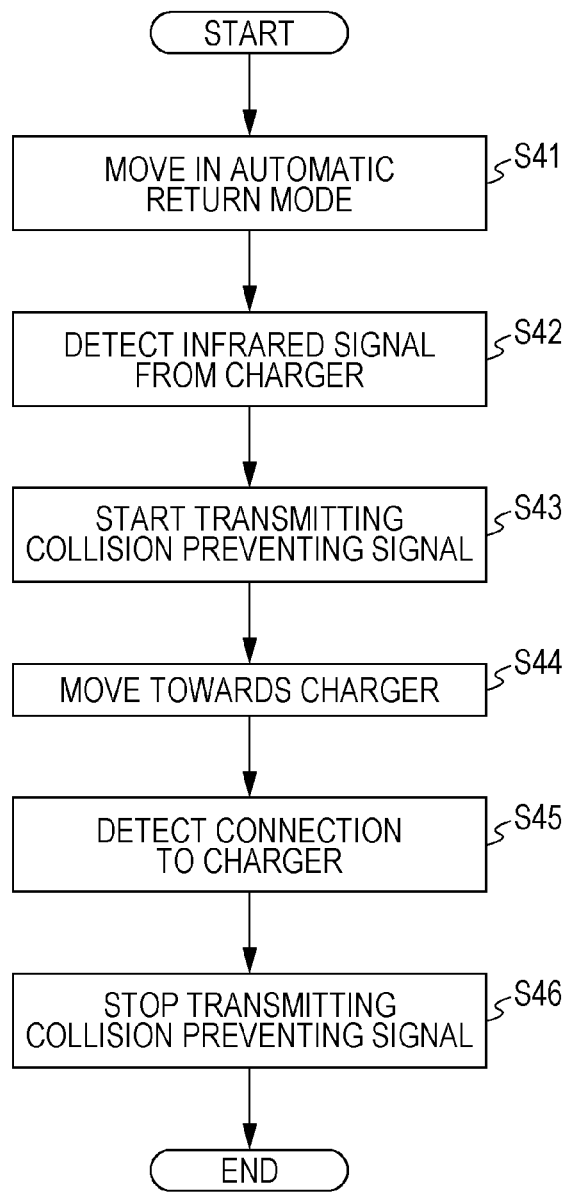
FIG. 24 is a flowchart illustrating an operation of the self-propelled vacuum of Embodiment 5 to transmit collision preventing signal.

FIG. 24 is a flowchart illustrating the flow of the operation to start and stop transmitting the collision preventing signal when the self-propelled vacuum 11D in Embodiment 5 detects infrared signal emitted from the charger 5 while searching for the charger 5 in the automatic return mode.

When determining that the battery charge of the self-propelled vacuum 11D is lower than the predetermined value while the self-propelled vacuum 11D is in the cleaning mode, the operation mode switch 1126D changes the operation mode to the automatic return mode and stores the automatic return mode in the operation mode storage 1136D. The self-propelled vacuum 11D starts moving to search for infrared signal transmitted from the charger 5 (S41). Herein, the operation mode switch 1126D may be configured to change the operation mode of the self-propelled vacuum 11D from the cleaning mode to the automatic return mode based on another reason.

The self-propelled vacuum 11D moves according to the cleaning basic program in the automatic return mode similarly to in the cleaning mode.

When detecting that the charger infrared sensor 1116D receives the infrared signal from the charger 5 while the self-propelled vacuum 11D is moving (S42), the movement-to-charger start detector 1123D determines that the self-propelled vacuum 11D is in a situation of starting to move toward the charger 5 and notifies collision preventing signal transmission determination unit 1124D of the determination.

Upon being notified by the movement-to-charger start detector 1123D, collision preventing signal transmission determination unit 1124D instructs the collision preventing signal transmission controller 1125 to start transmitting the collision preventing signal from the transmitter 118 (S43).

The self-propelled vacuum 11D moves towards the charger 5 while transmitting the collision preventing signal (S44). The self-propelled vacuum 11D moves towards the charger 5 by detecting the direction of the charger 5 based on the infrared signal emitted from the charger 5 and moving to the detected direction.

When the charger connection detection sensor 1117D detects that the self-propelled vacuum 11D is connected to the vacuum connector 53 of the charger 5 (S45), the charger connection detector 1127D determines that the self-propelled vacuum 11D completes return to the charger 5 and notifies collision preventing signal transmission determination unit 1124D of the determination.

Upon being notified by the charger connection detector 1127D, collision preventing signal transmission determination unit 1124D instructs the collision preventing signal transmission controller 1125 to stop transmitting the collision preventing signal from the transmitter 118 (S46).

With the aforementioned configuration, it is possible to prevent the self-propelled vacuum 12D from approaching and colliding with the self-propelled vacuum 11D which is moving towards the charger 5 to return to the charger 5, so that the self-propelled vacuum 11D smoothly move to the charger 5.

In Embodiment 5, when detecting that the charger 5 is connected to the vacuum connector 53, the self-propelled vacuum 11D stops transmitting the collision preventing signal. The self-propelled vacuum 11D may be configured to stop transmitting the collision preventing signal at a proper time after the self-propelled vacuum 11D completes connection to the vacuum connector 53 of the charger 5. This can provide the same effect. The self-propelled vacuum 11D may be configured to stop transmitting the collision preventing signal when detecting that the self-propelled vacuum 11D is connected to the vacuum connector 53 of the charger 5 and starts to be charged.

Figure 25:
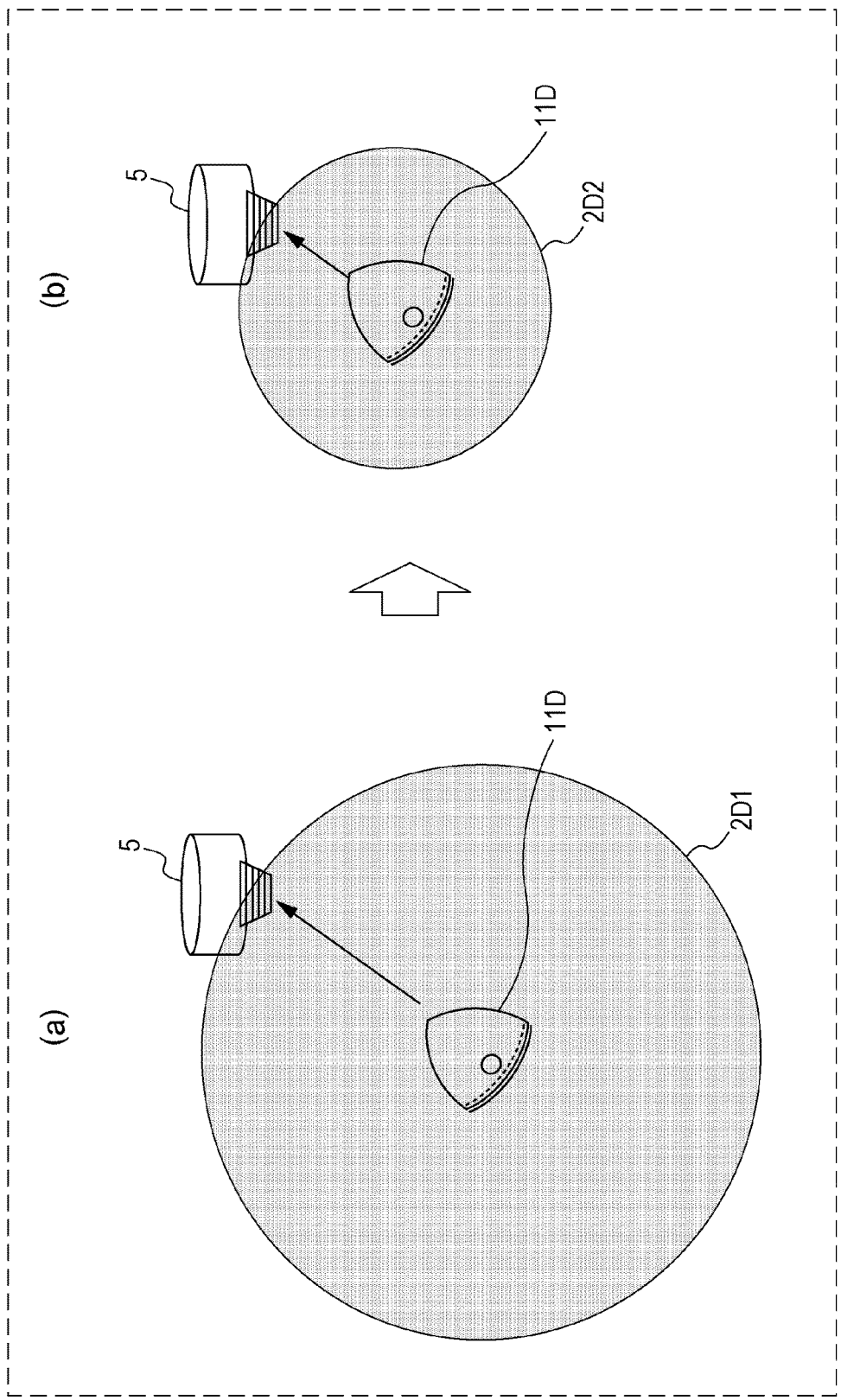
FIG. 25 is a diagram illustrating an example of the range to which the self-propelled vacuum of Embodiment 5 transmits collision preventing signal.

The self-propelled vacuum 11D of Embodiment 5 may further include a transmission power controller which controls the transmission power for the collision preventing signal. The self-propelled vacuum 11D is configured to control the transmission power with the transmission power controller to change the transmission range of the collision preventing signal. For example, when the self-propelled vacuum 11D is moving to the charger 5, the transmission power may be controlled so that the collision preventing signal from the self-propelled vacuum 11D can reach the charger 5. FIG. 25 illustrates the collision preventing signal which is transmitted from the self-propelled vacuum 11D to the charger 5. FIG. 25 illustrates a case where the distance between the self-propelled vacuum 11D and charger 5 is short while FIG. 25 illustrates a case where the distance between the self-propelled vacuum 11D and charger 5 is long.

With this configuration, the self-propelled vacuum 11D is able to transmit the collision preventing signal to only a necessary range and reduce the power consumption due to the collision preventing signal. Moreover, the collision preventing signal from the self-propelled vacuum 11D does not need to be stronger than necessary. This allows the self-propelled vacuum 12D to come as close as possible to the self-propelled vacuum 11D and charger 5 for cleaning.

(Embodiment 6)

In Embodiment 6, a description is given of a method with which a self-propelled vacuum 11E outputs a collision preventing signal to prevent another self-propelled vacuum 12E from approaching and colliding with the self-propelled vacuum 11E which is moving near a drop-off so that the self-propelled vacuum 11E cannot fall down the drop-off.

Figure 26:
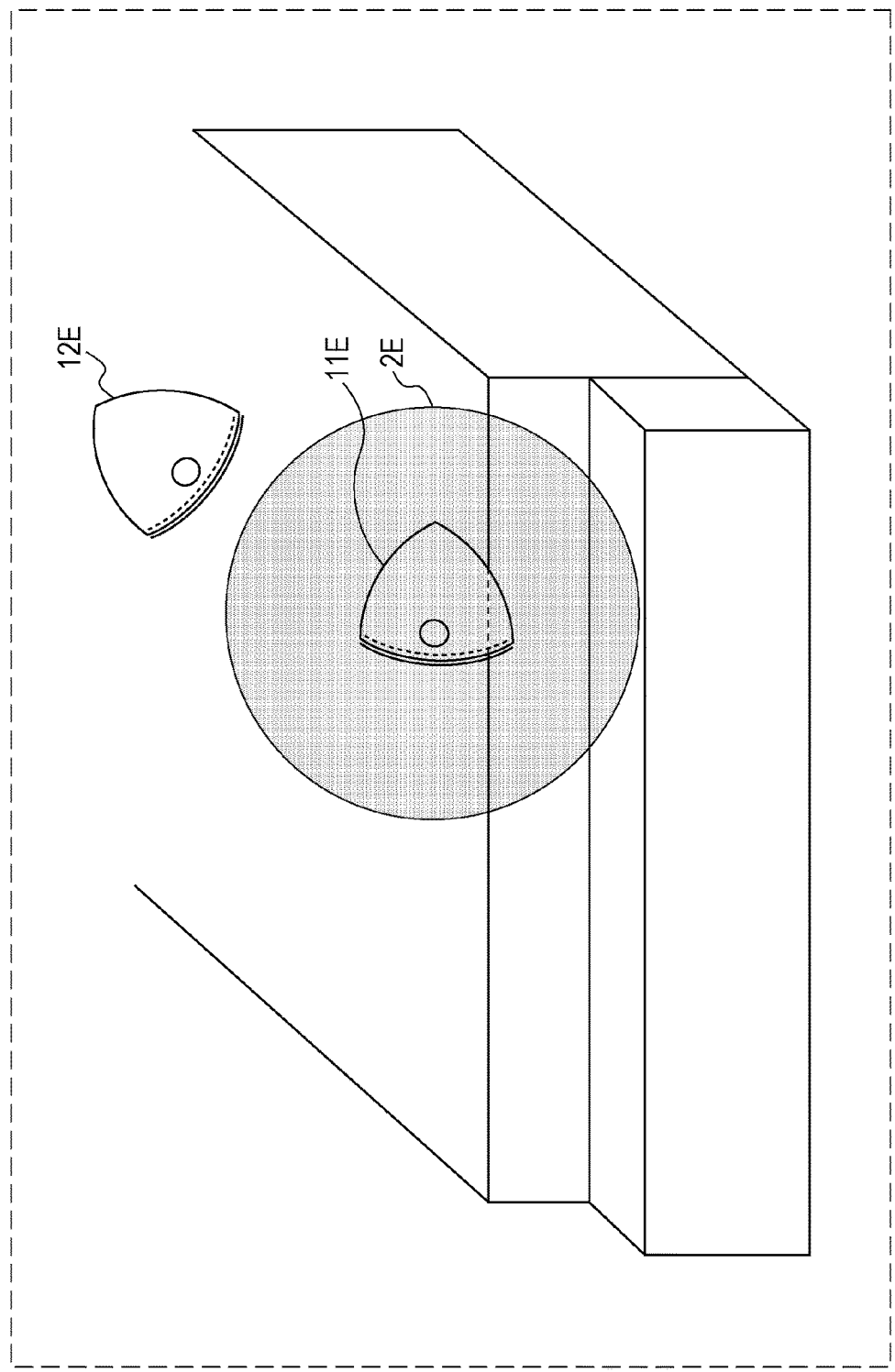
FIG. 26 is a conceptual diagram illustrating an entire image of a robot system of Embodiment 6.

FIG. 26 is a conceptual diagram illustrating an example in which the self-propelled vacuum 11E transmits a collision preventing signal 2E so that another self-propelled vacuum 12D cannot approach and collide with the self-propelled vacuum 11E while the self-propelled vacuum 11E is moving around a drop-off.

Figure 27:
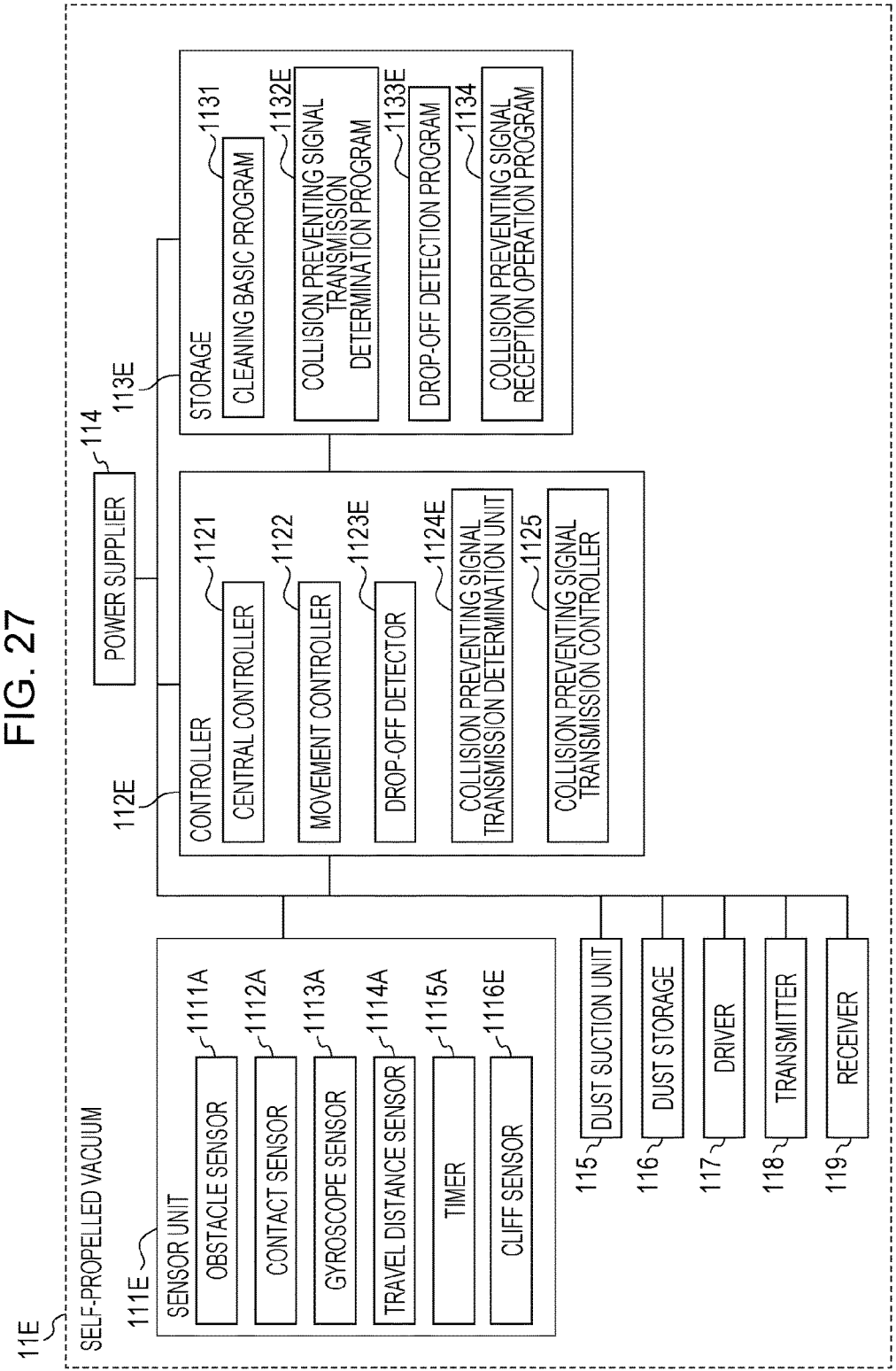
FIG. 27 is a block diagram illustrating the configuration of a self-propelled vacuum of Embodiment 6.

FIG. 27 is a block diagram illustrating an example of the functional configuration of the self-propelled vacuum 11E of Embodiment 6.

The same elements as those in FIG. 8 are given the same numerals, and the detailed description thereof is omitted.

The self-propelled vacuum 11E illustrated in FIG. 27 is different from the self-propelled vacuum 11A illustrated in FIG. 8 in a sensor unit 111E, a controller 112E, and a storage 113E.

The sensor unit 111E is different from the sensor unit 111A of the self-propelled vacuum 11A illustrated in FIG. 8 in a cliff sensor 1116E.

The cliff sensor 1116E is a sensor to measure the distance to the floor surface. The cliff sensor 1116E is provided on the bottom surface of the body of the self-propelled vacuum 11E and measures the reflection of the projected infrared rays or ultrasonic waves to determine the presence of a drop-off. Preferably, the self-propelled vacuum 11E includes plural cliff sensors on the bottom surface of the body so as to detect a drop-off with a wide range of the body.

The controller 112E is different from the controller 112A of the self-propelled vacuum 11A illustrated in FIG. 8 in a drop-off detector 1123E and a collision preventing signal transmission determination unit 1124E.

The drop-off detector 1123E performs processing based on a drop-off detection program 1133E.

The collision preventing signal transmission determination unit 1124E performs processing based on a collision preventing signal transmission determination program 1132E.

The storage 113E is different from the storage 113A of the self-propelled vacuum 11A illustrated in FIG. 8 in the configurations of the collision preventing signal transmission determination program 1132E and drop-off detection program 1133E.

The collision preventing signal transmission determination program 1132E is executed by the collision preventing signal transmission determination unit 1124E. Specifically, when the drop-off detector 1123E detects a drop-off and determines that the self-propelled vacuum 11E is moving near the drop-off, the collision preventing signal transmission determination unit 1124E starts transmitting the collision preventing signal. When the drop-off detector 1123E does not detect the drop-off and determines that the self-propelled vacuum 11E has escaped from the situation of moving near the drop-off, the collision preventing signal transmission determination unit 1124E stops transmitting the collision preventing signal.

The drop-off detection program 1133E is executed by the drop-off detector 1123E. Specifically, when the cliff sensor 1116E detects a drop-off, the drop-off detector 1123E determines that the self-propelled vacuum 11E is moving near the drop-off. When the cliff sensor 1116E detects no drop-off while continuously detecting a drop-off, the drop-off detector 1123E determines that the self-propelled vacuum 11E has escaped from the situation of moving near the drop-off.

Figure 28:
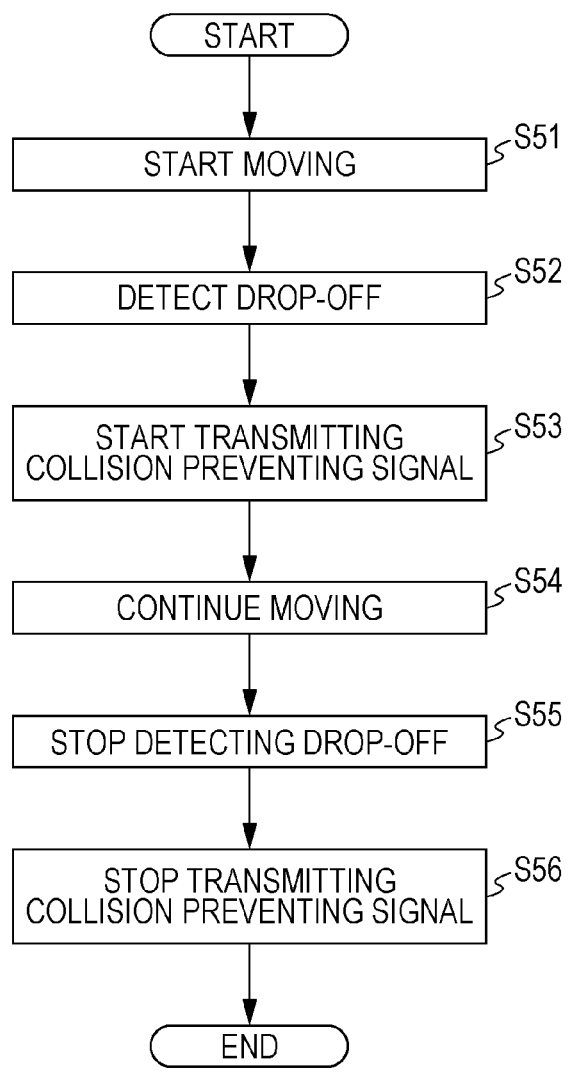
FIG. 28 is a flowchart illustrating an operation of the self-propelled vacuum of Embodiment 6 to transmit collision preventing signal.

FIG. 28 is a flowchart illustrating the flow of the operation of the self-propelled vacuum 11E of Embodiment 5 to start and stop transmitting the collision preventing signal when the self-propelled vacuum 11E detects a drop-off while moving.

Hereinafter, the flowchart is described in detail.

The self-propelled vacuum 11E starts moving by causing the movement controller 1122 to control the driver 117 based on the cleaning basic program 1131 in the storage 113E (S51).

When the cliff sensor 1116E detects a drop-off while the self-propelled vacuum 11E is moving (S52), the drop-off detector 1123E determines that the self-propelled vacuum 11E is moving near the drop-off and notifies the collision preventing signal transmission determination unit 1124E of the determination.

The collision preventing signal transmission determination unit 1124E instructs the collision preventing signal transmission controller 1125 to start transmitting the collision preventing signal from the transmitter 118 (S53). The self-propelled vacuum 11E continues moving while transmitting the collision preventing signal (S54).

When the cliff sensor 1116E stops detecting a drop-off while the self-propelled vacuum 11E is moving and transmitting the collision preventing signal (S55), the drop-off detector 1123E determines that the self-propelled vacuum 11E has escaped from the situation of moving near the drop-off and notifies the collision preventing signal transmission determination unit 1124E of the determination.

The collision preventing signal transmission determination unit 1124E instructs the collision preventing signal transmission controller 1125 to stop transmitting the collision preventing signal from the transmitter 118 (S56).

With the aforementioned configuration, the self-propelled vacuum 12E is prevented from approaching and colliding with the self-propelled vacuum 11E when the self-propelled vacuum 11E is moving near a drop-off so that the self-propelled vacuum 11E cannot fall down the drop-off.

In Embodiment 6, when the cliff sensor 1116E detects no drop-off, the self-propelled vacuum 11E stops transmitting the collision preventing signal. The self-propelled vacuum 11E may be configured to stop transmitting the collision preventing signal when the cliff sensor 1116E stops detecting a drop-off and the self-propelled vacuum 11E has traveled a predetermined distance or traveled for a predetermined period of time. This is because it is thought that the self-propelled vacuum 11E is still located near the drop-off just after the cliff sensor 1116E does not detect a drop-off, and the above configuration can prevent the self-propelled vacuum 11E from falling down the drop-off due to collision with the self-propelled vacuum 12E. In this configuration, the self-propelled vacuum 11E stops transmitting the collision preventing signal when the self-propelled vacuum 11E is sufficiently separated from the drop-off. This can reduce the possibility of the self-propelled vacuum 11E falling down the drop-off due to collision with the self-propelled vacuum 12E.

In Embodiment 6, the self-propelled vacuum 11E transmits the collision preventing signal when detecting a drop-off. However, the self-propelled vacuum 11E may be configured to transmit the collision preventing signal when the detected drop-off is greater than a predetermined value. In this configuration, the self-propelled vacuum 11E does not transmit the collision preventing signal when the detected drop-off is small. This is because even if the self-propelled vacuum 11E falls down a low drop-off, for example, the moving operation thereof cannot be greatly affected. Accordingly, the self-propelled vacuum 11E moving near a low drop-off is not badly affected by collision with another self-propelled vacuum. The aforementioned configuration can reduce power consumption by the self-propelled vacuum 11E transmitting the collision preventing signal.

<Modification 1>

As a modification of Embodiment 6, a description is given of a method with which a self-propelled vacuum 11F outputs a collision preventing signal in a situation where a virtual wall device 61 is installed. The virtual wall device 61 is configured to form an infrared virtual wall 62 and prevent self-propelled vacuums from travelling across the infrared virtual wall. In the modification, the self-propelled vacuum 11F outputs the collision preventing signal to prevent another self-propelled vacuum 12F from approaching and colliding with the self-propelled vacuum 11F which is moving near the infrared virtual wall 62 so that the self-propelled vacuum 11F cannot travel across the infrared wall 62 due to the collision.

Figure 29:
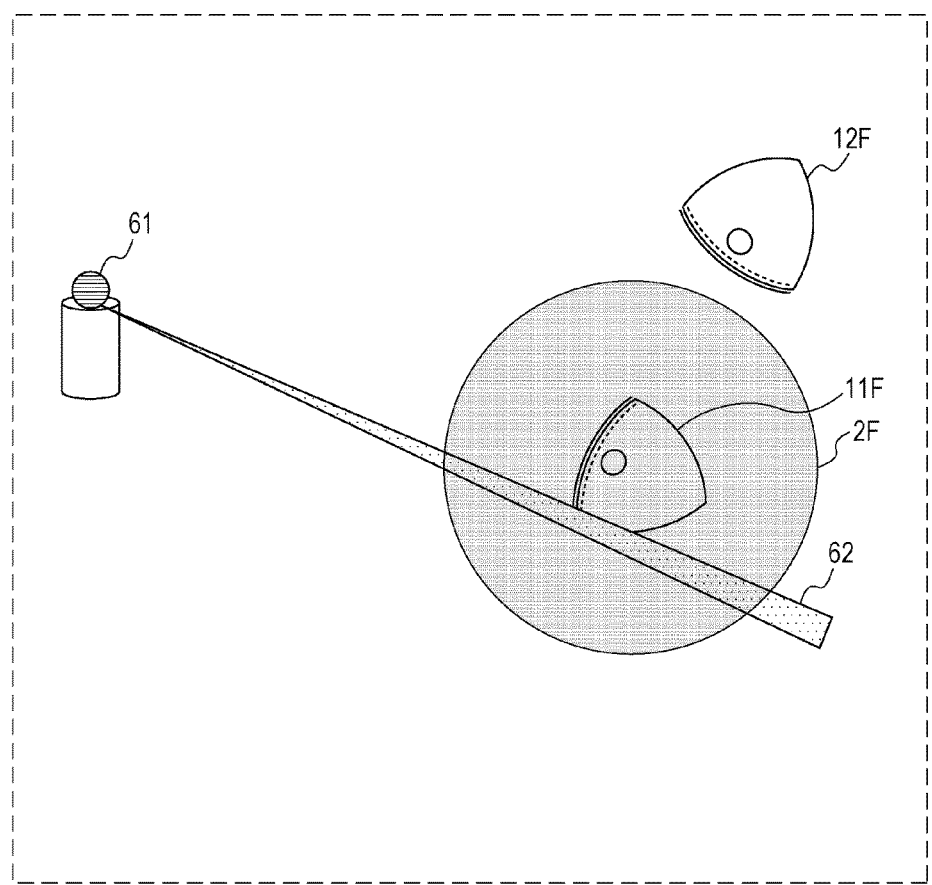
FIG. 29 is a conceptual diagram illustrating an entire image of a robot system of Modification 1 of Embodiment 6.

FIG. 29 is a conceptual diagram illustrating an example in which the self-propelled vacuum 11F transmits a collision preventing signal 2F so that the different self-propelled vacuum 12F does not approach and collide with the self-propelled vacuum 11F which is moving near the virtual wall 62 of infrared rays transmitted from the virtual wall device 61.

The virtual wall device 61 is previously installed by the user. The virtual wall device 61 is installed to define a region that the user does not want the self-propelled vacuum 11F to enter, for example.

Figure 30:
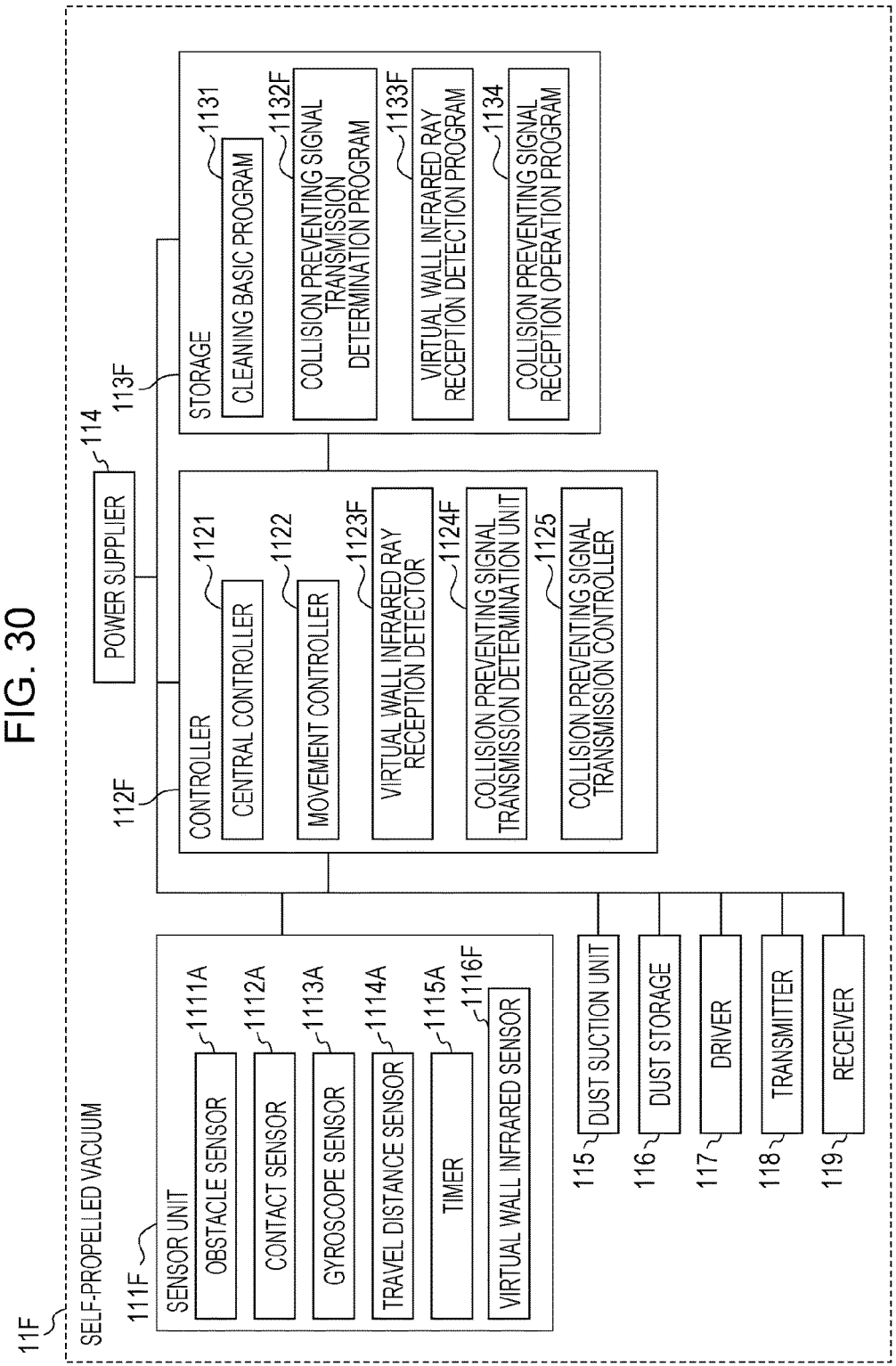
FIG. 30 is a block diagram illustrating the configuration of a self-propelled vacuum of Modification 1 of Embodiment 6.

FIG. 30 is a block diagram illustrating an example of the functional configuration of the self-propelled vacuum 11F of Modification 1 of Embodiment 6. The same elements as those in FIG. 8 are given the same numerals, and the detailed description thereof is omitted.

Figure 31:
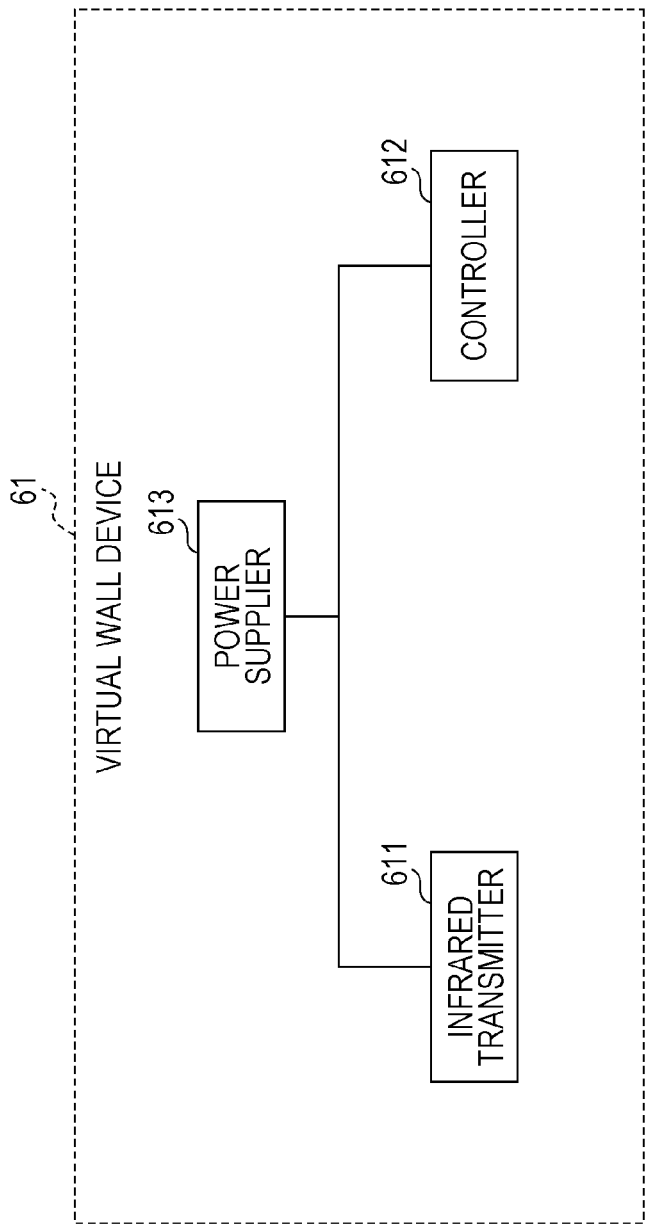
FIG. 31 is a block diagram illustrating the configuration of a virtual wall device of Modification 1 of Embodiment 6.

The self-propelled vacuum 11F illustrated in FIG. 31 is different from the self-propelled vacuum 11A illustrated in FIG. 8 in a sensor unit 111F, a controller 112F, and a storage 113F.

The sensor unit 111F is different from the sensor unit 111A of the self-propelled vacuum 11A illustrated in FIG. 8 in a virtual wall infrared sensor 1116F.

The virtual wall infrared sensor 1116F is a sensor to receive infrared signal transmitted from the virtual wall device 61. If the collision preventing signal transmitted from the self-propelled vacuum 11F is composed of infrared signal, the receiver 119 may be used as the virtual wall infrared sensor 1116F. In this configuration, it is necessary to configure the virtual wall device 61 and self-propelled vacuum 11F so that the infrared signal transmitted from the virtual wall device 61 is discriminated from the infrared signal transmitted from the self-propelled vacuum 11F. Such configuration is implemented by the virtual wall device 61 and self-propelled vacuum 11F transmitting differently modulated infrared signals.

The controller 112F is different from the controller 112A of the self-propelled vacuum 11A illustrated in FIG. 8 in a virtual wall infrared ray reception detector 1123F and a collision preventing signal transmission determination unit 1124F.

The virtual wall infrared ray reception detector 1123F performs processing based on a virtual wall infrared ray reception detection program 1133F.

The collision preventing signal transmission determination unit 1124F performs processing based on a collision preventing signal transmission determination program 1132F.

The storage 113F is different from the storage 113A of the self-propelled vacuum 11A illustrated in FIG. 8 in the configurations of the collision preventing signal transmission determination program 1132F and virtual wall infrared ray reception detection program 1133F.

The collision preventing signal transmission determination program 1132F is executed by the collision preventing signal transmission determination unit 1124F. Specifically, when the virtual wall infrared ray reception detector 1123F detects reception of infrared signal from the virtual wall device 61 and determines that the self-propelled vacuum 11F is moving near the infrared virtual wall 62, the collision preventing signal transmission determination unit 1124F starts transmitting the collision preventing signal. When the virtual wall infrared ray reception detector 1123F detects that the infrared signal from the virtual wall device 61 is not received and determines that the self-propelled vacuum 11F has escaped from the situation of moving near the infrared virtual wall 62, the collision preventing signal transmission determination unit 1124F stops transmitting the collision preventing signal.

The virtual wall infrared ray reception detection program 1133F is executed by the virtual wall infrared ray reception detector 1123F. Specifically, when the virtual wall infrared sensor 1116F detects infrared rays from the virtual wall device 61, the virtual wall infrared ray reception detector 1123F determines that the self-propelled vacuum 11F is moving near the virtual wall 62. When the virtual wall infrared sensor 1116F detects that the infrared rays from the virtual wall device 61 are not received after continuously detecting reception of the infrared rays from the virtual wall device 61, the virtual wall infrared ray reception detector 1123F determines that the self-propelled vacuum 11F has escaped from the situation of moving near the infrared virtual wall 62.

FIG. 31 is a block diagram illustrating an example of the functional configuration of the virtual wall device 61 of Modification 1 of Embodiment 6.

The virtual wall device 61 mainly includes an infrared transmitter 611, a controller 612, and a power supplier 613.

The infrared transmitter 611 is a section transmitting infrared signal. The infrared transmitter 611 is configured to inhibit self-propelled vacuums from traveling across the infrared signal.

The controller 612 is a microcomputer composed of a CPU, a ROM, a RAM, an I/O controller, a timer, and the like, for example. The controller 612 is configured to control the constituent components of the virtual wall device 61, such as the infrared transmitter 611.

The power supplier 613 is a commercial power supply or a battery.

Figure 32:
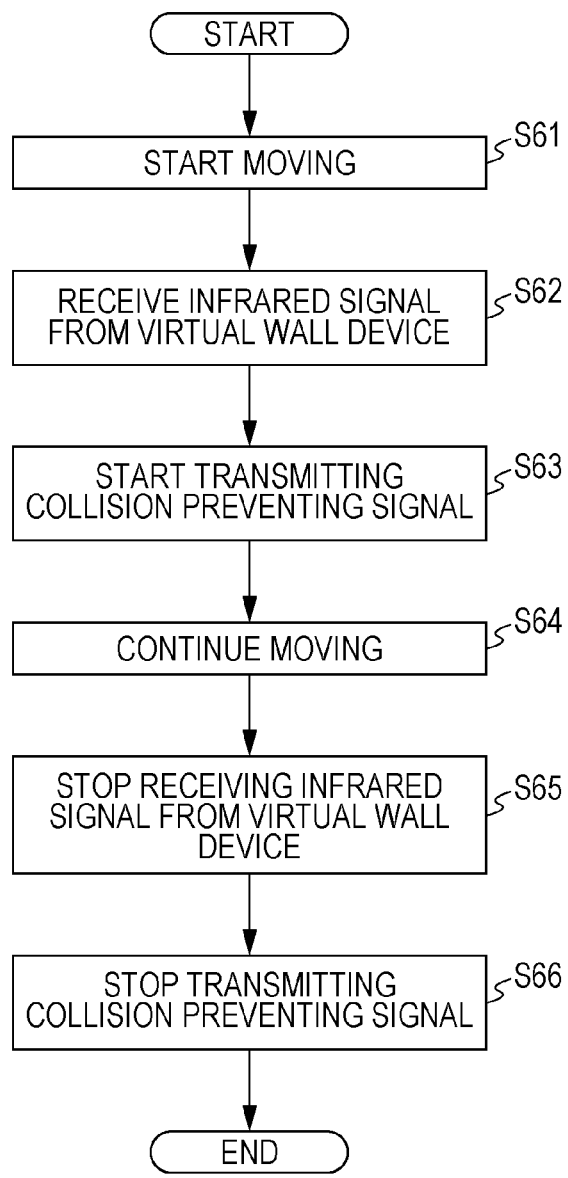
FIG. 32 is a flowchart illustrating an operation of the self-propelled vacuum of Modification 1 of Embodiment 6 to transmit collision preventing signal.

FIG. 32 is a flowchart illustrating the flow of the operation of the self-propelled vacuum 11F of Modification 1 of Embodiment 6 to start and stop transmitting the collision preventing signal when the self-propelled vacuum 11F detects infrared signal transmitted from the virtual wall device 61 while moving.

Hereinafter, the flowchart is described in detail.

The self-propelled vacuum 11F starts moving by causing the movement controller 1122 to control the driver 117 based on the cleaning basic program 1131 in the storage 113F (S61).

When the virtual wall infrared sensor 1116F detects that the infrared signal transmitted from the virtual wall device 61 is received while the self-propelled vacuum 11F is moving (S62), the virtual wall infrared ray reception detector 1123F determines that the self-propelled vacuum 11F is moving near the virtual wall 62 and notifies the collision preventing signal transmission determination unit 1124F of the determination.

When being notified by the virtual wall infrared ray reception detector 1123F, the collision preventing signal transmission determination unit 1124F instructs the collision preventing signal transmission controller 1125 to start transmitting the collision preventing signal from the transmitter 118 (S63). The self-propelled vacuum 11F continues moving while transmitting the collision preventing signal (S64).

When detecting that the virtual wall infrared sensor 1116F stops receiving infrared rays transmitted from the virtual wall device 61 while the self-propelled vacuum 11F is moving and transmitting the collision preventing signal (S65), the virtual wall infrared ray reception detector 1123F determines that the self-propelled vacuum 11F has escaped from the situation of moving near the virtual wall 62 and notifies the collision preventing signal transmission determination unit 1124F of the determination.

When being notified by the virtual wall infrared ray reception detector 1123F, the collision preventing signal transmission determination unit 1124F instructs the collision preventing signal transmission controller 1125 to stop transmitting the collision preventing signal from the transmitter 118 (S66).

With the aforementioned configuration, it is possible to prevent the self-propelled vacuum 12F from approaching and colliding with the self-propelled vacuum 11F which is moving near the virtual wall 62 composed of infrared rays transmitted from the virtual wall device 61 so that the self-propelled vacuum 11F does not travel across the virtual wall 62 due to the collision.

In Modification 1 of Embodiment 6, the self-propelled vacuum 11F stops transmitting the collision preventing signal when the virtual wall infrared sensor 1116F stops receiving the infrared rays transmitted from the virtual wall device 61. However, the self-propelled vacuum 11F may be configured to stop transmitting the collision preventing signal when the self-propelled vacuum 11F has traveled a predetermined distance or traveled for a predetermined period of time after the virtual wall infrared sensor 1116F stops receiving the infrared rays transmitted from the virtual wall device 61.

The self-propelled vacuum 11F is likely to still stay near the virtual wall 62, which is composed of infrared rays transmitted from the virtual wall device 61, just after the virtual wall infrared sensor 1116F stops receiving infrared rays transmitted from the virtual wall device 61. Accordingly, there is a likelihood that the self-propelled vacuum 12F collides with the self-propelled vacuum 11F to cause the self-propelled vacuum 11F to travel across the virtual wall 62. With the above configuration, the self-propelled vacuum 11F stops transmitting the collision preventing signal when the self-propelled vacuum 11F is estimated to be sufficiently separated from the virtual wall 62. This can further decrease the likelihood that the self-propelled vacuum 12F collides with the self-propelled vacuum 11F to cause the self-propelled vacuum 11F to travel across the virtual wall 62.

In Modification 1 of Embodiment 6, the self-propelled vacuum 11F determines that the self-propelled vacuum 11F is located near the virtual wall 62 and transmits the collision preventing signal when receiving infrared rays transmitted from the virtual wall device 61. However, Modification 1 is unnecessarily limited to the above configuration. The self-propelled vacuum 11F may be configured to determine that the self-propelled vacuum 11F is located near the virtual wall 62 and transmit the collision preventing signal when receiving directional radio signal, other than the infrared rays, transmitted from the virtual wall device 61. This configuration can provide the same effect.

In Modification 1 of Embodiment 6, the self-propelled vacuum 11F transmits the collision preventing signal when moving near the virtual wall 62 so as not to travel across the virtual wall 62. The self-propelled vacuum 11F may be configured to transmit the collision preventing signal by determining based on the sensing information of the various sensors included in the self-propelled vacuum 11F, that the self-propelled vacuum 11F is moving near the boundary of an entry inhibited region previously defined. This configuration can provide the same effect. For example, the self-propelled vacuum 11F includes a cleaning area map, on which an entry inhibited region that the self-propelled vacuum 11F is inhibited from entering is set. The self-propelled vacuum 11F moves while measuring the position information thereof with reference to the map information. In such a situation, the self-propelled vacuum 11F may be configured to transmit the collision preventing signal when detecting that the self-propelled vacuum 11F is located near the entry inhibited area. The cleaning region map of the self-propelled vacuum 11F may be distributed to the self-propelled vacuum 11F from a sever or the like, for example. Moreover, the self-propelled vacuum 11F can detect the position thereof by including simultaneous localization and mapping (SLAM) function.

(Embodiment 7)

In Embodiment 7, a description is given of a method with which a self-propelled vacuum 11G outputs a collision preventing signal in order to prevent a cable 7, such as power cables for home appliances, from getting entangled with a wheel of the driver 117 of the self-propelled vacuum 11G complicatedly in the following situation. When the cable 7 entangled on the wheel is detected while the self-propelled vacuum 11G is moving, the self-propelled vacuum 11G rotates the wheel backward to remove the entangled cable 7. If another self-propelled vacuum 12G approaches and collides with the self-propelled vacuum 11G while the self-propelled vacuum 11G is performing the operation to remove the entangled cable 7, the wheels of the self-propelled vacuum 11G sometimes rotate or/and move in an unexpected direction, thus entangling the cable 7 complicatedly.

Figure 33:
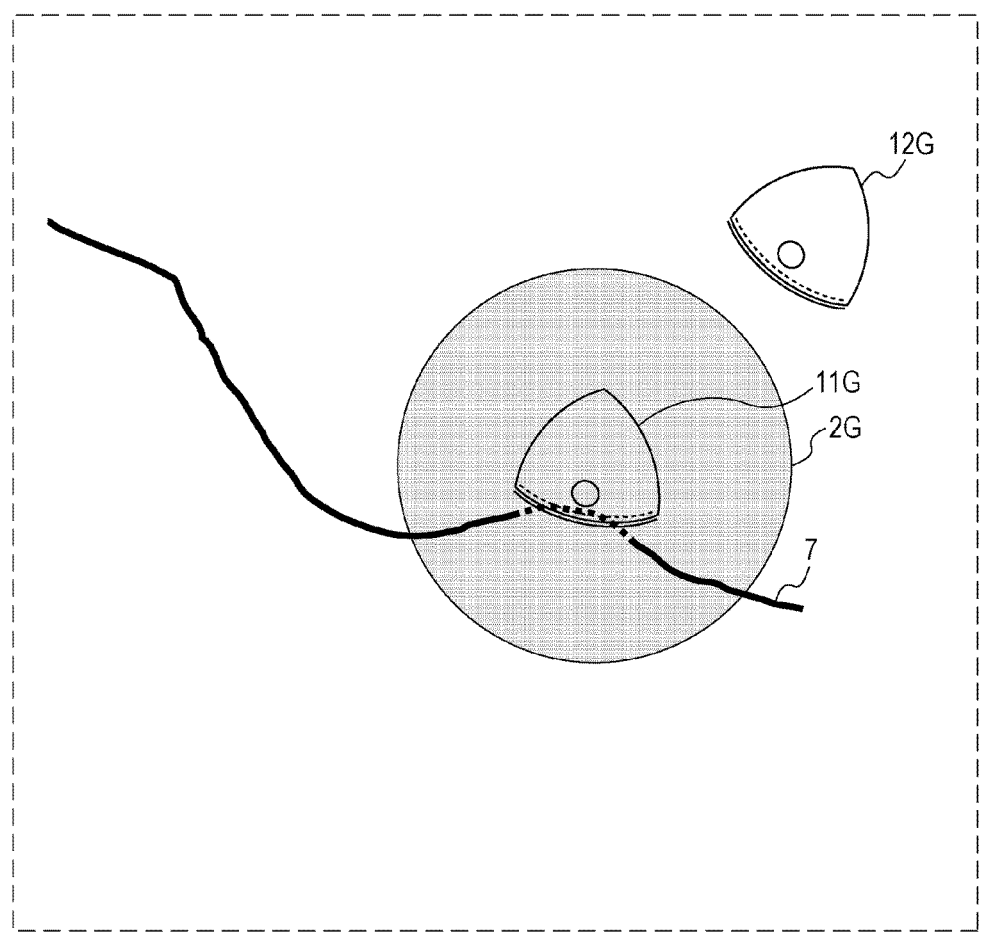
FIG. 33 is a conceptual diagram illustrating an entire image of a robot system of Embodiment 7.

FIG. 33 is a conceptual diagram illustrating the situation in which the self-propelled vacuum 11G which has detected the cable 7 entangled on a wheel of the driver 117 of the self-propelled vacuum 11G is transmitting a collision preventing signal 2G so that another self-propelled vacuum 12G does not approach and collide with the self-propelled vacuum 11G while the self-propelled vacuum 11G is performing the operation to rotate the wheel backward and remove the entangled cable 7.

Figure 34:
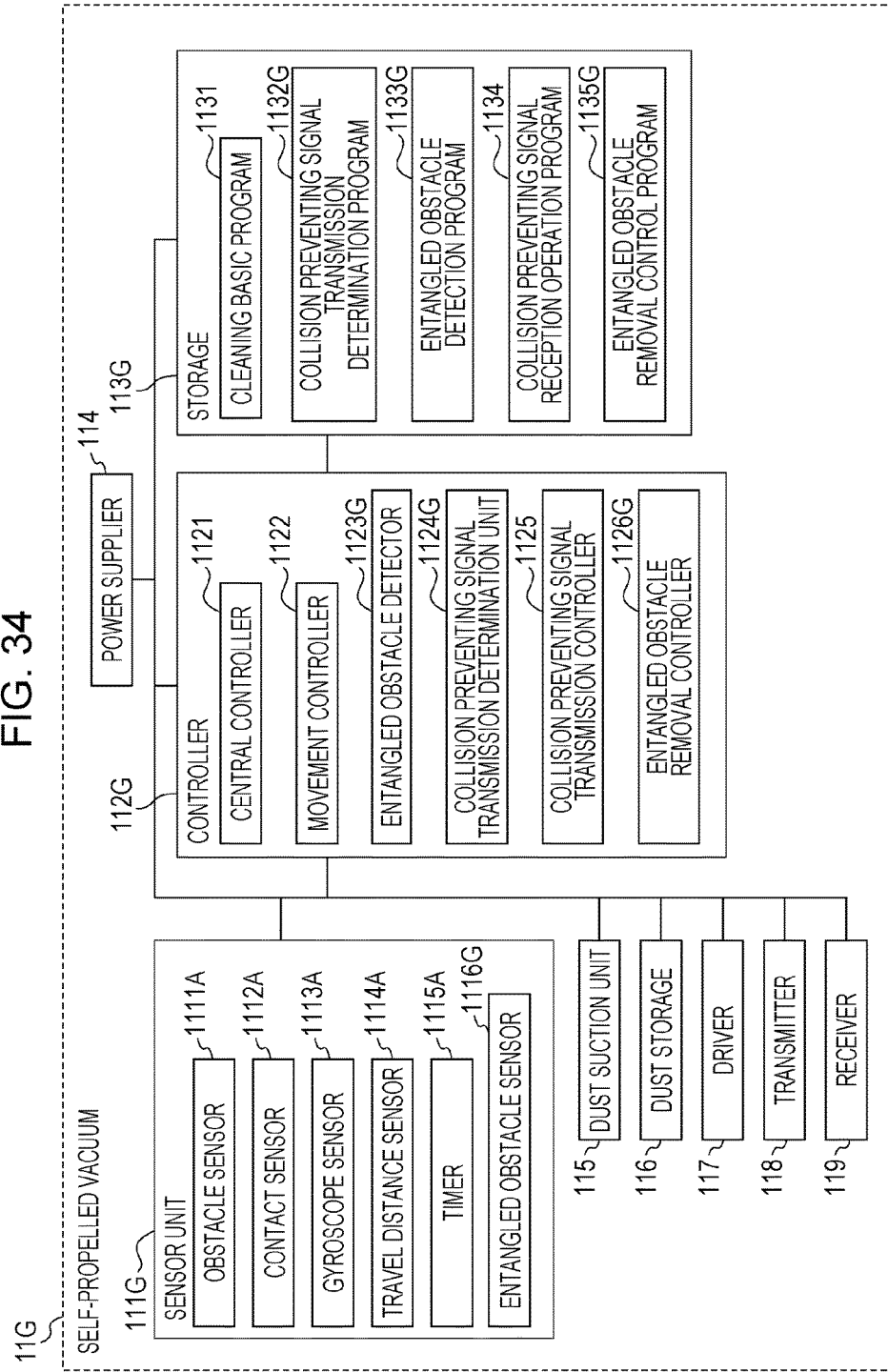
FIG. 34 is a block diagram illustrating the configuration of a self-propelled vacuum of Embodiment 7.

FIG. 34 is a block diagram illustrating an example of the functional configuration of the self-propelled vacuum 11G of Embodiment 7. The same elements as those in FIG. 8 are given the same numerals, and the detailed description thereof is omitted.

The self-propelled vacuum 11G illustrated in FIG. 34 is different from the self-propelled vacuum 11A illustrated in FIG. 8 in a sensor unit 111G, a controller 112G, and a storage 113G.

The sensor unit 111G is different from the sensor unit 111A of the self-propelled vacuum 11A illustrated in FIG. 8 in an entangled obstacle sensor 1116G.

The entangled obstacle sensor 1116G is a sensor to detect an obstacle entangled with a wheel of the driver 117. For example, the entangled obstacle sensor 1116G determines that an obstacle is entangled with a wheel of the driver 117 when determining that the motor of the driver 117 cannot rotate even though the movement controller 1122 instructs the driver 117 to rotate the motor.

The controller 112G is different from the controller 112A of the self-propelled vacuum 11A illustrated in FIG. 8 in an entangled obstacle detector 1123G, a collision preventing signal transmission determination unit 1124G, and an entangled obstacle removal controller 1126G.

The entangled obstacle detector 1123G performs processing based on an entangled obstacle detection program 1133G.

The collision preventing signal transmission determination unit 1124G performs processing based on a collision preventing signal transmission determination program 1132G.

The entangled obstacle removal controller 1126G performs processing based on an entangled obstacle removal control program 1135G.

The storage 113G is different from the storage 113A of the self-propelled vacuum 11A illustrated in FIG. 8 in the configurations of the collision preventing signal transmission determination program 1132G, entangled obstacle detection program 1133G, and entangled obstacle removal control program 1135G.

The collision preventing signal transmission determination program 1132G is executed by the collision preventing signal transmission determination unit 1124G. Specifically, the collision preventing signal transmission determination unit 1124G starts transmitting the collision preventing signal when the entangled obstacle detector 1123G detects an obstacle entangled with a wheel of the driver 117 of the self-propelled vacuum 11G and determines that the self-propelled vacuum 11G is in the situation of starting the operation to remove the obstacle entangled on the wheel of the driver 117.

The collision preventing signal transmission determination unit 1124G stops transmitting the collision preventing signal when the entangled obstacle detector 1123G detects that the self-propelled vacuum 11G finishes the operation to remove the obstacle entangled on the wheel of the driver 117 and determines that the obstacle entangled on the wheel of the driver 117 is removed.

The entangled obstacle removal control program 1135G is executed by the entangled obstacle removal controller 1126G.

Specifically, when the entangled obstacle detector 1123G detects an obstacle entangled on a wheel of the driver 117, the entangled obstacle removal controller 1126G reverses the motor of the driver 117 to rotate the wheels of the driver 117 backward, thereby removing the obstacle entangled on the wheel of the driver 117. In this process, the entangled obstacle removal controller 1126G removes the entangled obstacle by reversing the motor by a predetermined number of turns or for a predetermined period of time.

Figure 35:
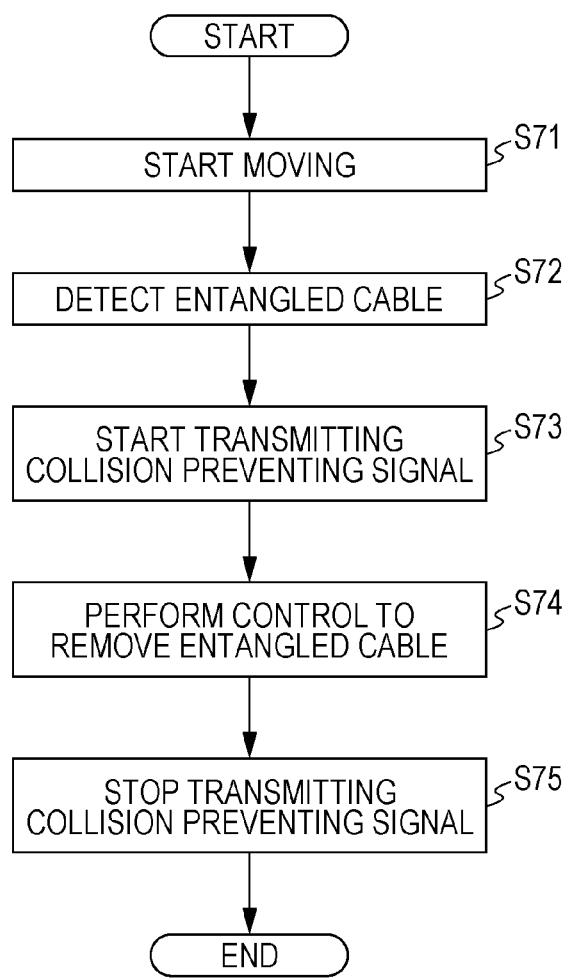
FIG. 35 is a flowchart illustrating an operation of the self-propelled vacuum of Embodiment 7 to transmit collision preventing signal.

FIG. 35 is a flowchart illustrating the flow of the operation of the self-propelled vacuum 11G of Embodiment 7 to start and stop transmitting the collision preventing signal when the self-propelled vacuum 11G detects a cable entangled with a wheel while moving.

Hereinafter, the flowchart is described in detail.

The self-propelled vacuum 11G starts moving by causing the movement controller 1122 to control the driver 117 based on the cleaning basic program 1131 in the storage 113F (S71).

When detecting that the motor of the driver 117 cannot rotate even though the movement controller 1122 instructs the driver 117 to rotate the motor while the self-propelled vacuum 11G is moving, the entangled obstacle detector 1123G determines that an obstacle is entangled with a wheel of the driver 117. The entangled obstacle detector 1123G therefore determines that the self-propelled vacuum 11G is in the situation of starting the control to remove the obstacle entangled on the wheel of the driver 117 and notifies the collision preventing signal transmission determination unit 1124G of the determination (S72).

When being notified by the entangled obstacle detector 1123G, the collision preventing signal transmission determination unit 1124G instructs the collision preventing signal transmission controller 1125 to start transmission of collision preventing signal from the transmitter 118 (S73).

The self-propelled vacuum 11F starts the operation to remove the obstacle entangled on the wheel while transmitting the collision preventing signal. Specifically, the entangled obstacle removal controller 1126G reverses the motor of the driver 117 to rotate the wheel of the driver 117 backward, thereby removing the obstacle entangled on the wheel (S74).

When detecting that the operation of the entangled obstacle removal controller 1126G to remove the obstacle entangled on the wheel is finished, the entangled obstacle detector 1123G determines that the obstacle entangled on the wheel is removed and notifies the collision preventing signal transmission determination unit 1124G of the determination.

When being notified by the entangled obstacle detector 1123G, the collision preventing signal transmission determination unit 1124G instructs the collision preventing signal transmission controller 1125 to stop transmitting the collision preventing signal from the transmitter 118 (S75).

With the aforementioned configuration, it is possible to prevent the cable 7 from being entangled with a wheel of the self-propelled vacuum 11G complicatedly in the following situation. The self-propelled vacuum 11G detects the cable 7 entangled on the wheel while moving and performs the operation to remove the entangled cable 7 from the wheel. When the self-propelled vacuum 11G is performing the operation to remove the entangled cable 7, another self-propelled vacuum 12G approaches and collides with the self-propelled vacuum 11G, and the wheel of the self-propelled vacuum 11G thereby rotate and/or move in an unexpected direction, thus entangling the cable 7 with the wheel complicatedly.

In Embodiment 7, the self-propelled vacuum 11G stops transmitting the collision preventing signal when the entangled obstacle removal controller 1126G reverses the motor to rotate the wheel backward and thereby determines that the entangled obstacle is removed from the wheel. However, the self-propelled vacuum 11G may be configured to stop transmitting the collision preventing signal when the entangled obstacle removal controller 1126G reverses the motor to rotate the wheel backward and the entangled obstacle detector 1123G does not detect an obstacle entangled on the wheel after the self-propelled vacuum 11F restarts the moving operation based on the cleaning basic program 1131 and travels a predetermined distance or for a predetermined period of time.

The obstacle entangled on the wheel is not always removed only by reversing the motor to rotate the wheel backward once with the entangled obstacle removal controller 1126G. The obstacle is sometimes removed by repeating the operation to remove the entangled obstacle and the operation to restart the moving operation for several times. With the aforementioned configuration, the self-propelled vacuum 11 continues transmitting the collision preventing signal until the obstacle is surely removed from the wheel.

In Embodiment 7, the collision preventing signal is transmitted while the self-propelled vacuum 11G detects an obstacle entangled with a wheel of the driver 117 and performs the operation to rotate the wheel backward to remove the entangled obstacle. In the case where the self-propelled vacuum 11G includes another rotary component, the collision preventing signal may be transmitted when the self-propelled vacuum 11G detects an obstacle entangled with the rotary component and performs the operation to rotate the rotary component backward to remove the entangled obstacle. This configuration can provide the same effect. For example, it is assumed that the dust suction unit 115 of the self-propelled vacuum 11G has a rotational function similarly to the wheel. The self-propelled vacuum 11G may be configured to transmit the collision preventing signal while the self-propelled vacuum 11G detects an obstacle entangled on the dust suction unit 115 of the self-propelled vacuum 11G and performs the operation to rotate the dust suction unit 115 backward to remove the entangled obstacle.

Hereinabove, the self-propelled vacuums according to one or plural aspects of the disclosure are described based on the embodiments. The disclosure is not limited to the embodiment. The one or plural aspects of the disclosure may include various modifications of the embodiments that occur to those skilled in the art and aspects composed of constituent components of the different embodiments.

In the above-described embodiments, each constituent element may be composed of dedicated hardware or may be implemented by executing a software program suitable for the constituent element. Each constituent element may be implemented by a program executing section, such as a CPU or a processor, loading and executing a software program recorded in a recording medium, such as a hard disk or a semiconductor memory.

Typically, some or all of the functions of the self-propelled vacuums according to Embodiments 1 to 7 of the disclosure are implemented as an LSI which is an integrated circuit. These functions may be integrated into chips for individual functions or integrated into chips including some or all of the functions. The integrated circuit is not limited to the LSI and may be implemented by a special circuit or a general-purpose processor. The integration may use a field programmable gate array (FPGA), which is programmable after formation of the LSI or a reconfigurable processor in which connections and settings of circuit cells within the LSI are reconfigurable.

Alternatively, some or all of the functions of the self-propelled vacuums according to Embodiments 1 to 7 of the disclosure may be implemented by a processor, such as a CPU, executing programs.

All the numerals used above are illustrated by way of example to describe the disclosure specifically, and the disclosure is not limited by the illustrated numerals.

The execution order of the steps illustrated in each of FIGS. 5, 10, 16, 19, 24, 28, 32, and 35 is shown by way of example to describe the disclosure specifically. These steps may be executed in a different order within a range that provides the same effect. Some of the steps may be executed at the same time as different steps (in parallel).

The disclosure includes various modifications obtained by changing the embodiments of the disclosure within the range that occurs to those skilled in the art without departing from the scope of the disclosure.

The autonomous mobile robot according to the disclosure is useful in autonomous mobile robots including a function to perform an operation to avoid an obstacle when colliding with the obstacle.

What is claimed is:
1. An autonomous mobile robot comprising:
a sensor that acquires sensing information by sensing at least one of a situation around the autonomous mobile robot and a state of the autonomous mobile robot;
storage that stores a first condition;
a transmitter; and
a processor that, in operation, performs operations including
judging whether the sensing information satisfies the first condition, and
controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range,
wherein the sensor includes a first sensor that performs at least one of:
detecting an obstacle, and the first condition includes at least one of
a number of obstacle detections by the first sensor for a predetermined period of time being more than a predetermined number,
while the autonomous mobile robot is moving along the obstacle detected by the first sensor, the first sensor detects another obstacle, and the first sensor detects obstacles on right and left sides of the autonomous mobile robot in a direction of travel thereof; and detecting a difference in a travelling surface level, and the first condition is that the first sensor detects the difference in the travelling surface level.

2. The autonomous mobile robot according to claim 1, wherein the operations further include controlling the transmitter to transmit the collision preventing signal for a predetermined period.

3. The autonomous mobile robot according to claim 1, wherein the storage further stores a second condition, and the operations further include judging whether the sensing information satisfies the second condition, and controlling the transmitter to stop outputting the collision preventing signal when it is judged that the sensing information satisfies the second condition.

4. The autonomous mobile robot according to claim 1, wherein the storage further stores a transmission power control condition, and the operations further include controlling the transmitter so that power to transmit the collision preventing signal satisfies the transmission power control condition.

5. The autonomous mobile robot according to claim 1, further comprising a receiver that acquires moving operation information of the different autonomous mobile robot, and the operations further include judging based on the moving operation information, whether the different autonomous mobile robot is performing moving operation, and in the case where it is judged that the different autonomous mobile robot is not performing the moving operation, not outputting the collision preventing signal even if it is judged that the sensing information satisfies the first condition.

6. The autonomous mobile robot according to claim 1, wherein the first sensor detects a radio signal, and the first condition is that the first sensor detects a radio signal from a charger that charges the autonomous mobile robot.

7. The autonomous mobile robot according to claim 1, wherein the first sensor detects a radio signal, and the first condition is that the first sensor detects a radio signal from a virtual wall device that defines a virtual wall.

8. The autonomous mobile robot according to claim 1, wherein the first sensor detects an obstacle is entangled with the autonomous mobile robot, and the first condition is that the first sensor detects that an obstacle is entangled on a wheel of the autonomous mobile robot.

9. A method used in an autonomous mobile robot, the method comprising:

acquiring sensing information by a sensor sensing at least one of a situation around the autonomous mobile robot and a state of the autonomous mobile robot;

judging whether the sensing information satisfies a first condition; and controlling a transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range, wherein the sensor includes a first sensor that performs at least one of:

detecting an obstacle, and the first condition includes at least one of a number of obstacle detections by the first sensor for a predetermined period of time being more than a predetermined number, while the autonomous mobile robot is moving along the obstacle detected by the first sensor, the first sensor detects another obstacle, and the first sensor detects obstacles on right and left sides of the autonomous mobile robot in a direction of travel thereof; and detecting a difference in a travelling surface level, and the first condition is that the first sensor detects the difference in the travelling surface level.

10. A non-transitory computer-readable recording medium including a program to control an autonomous mobile robot, the program being executed in a computer to cause the computer to execute a method comprising:

acquiring sensing information by a sensor sensing at least one of a situation around the autonomous mobile robot and a state of the autonomous mobile robot;

judging whether the sensing information satisfies a first condition; and controlling a transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range, wherein the sensor includes a first sensor that performs at least one of:

detecting an obstacle, and the first condition includes at least one of a number of obstacle detections by the first sensor for a predetermined period of time being more than a predetermined number, while the autonomous mobile robot is moving along the obstacle detected by the first sensor, the first sensor detects another obstacle, and the first sensor detects obstacles on right and left sides of the autonomous mobile robot in a direction of travel thereof; and detecting a difference in a travelling surface level, and the first condition is that the first sensor detects the difference in the travelling surface level.

11. An autonomous mobile robot comprising:

a sensor that acquires sensing information by sensing at least one of a situation around the autonomous mobile robot and a state of the autonomous mobile robot;

storage that stores a first condition;

a transmitter;

a processor that, in operation, performs operations including judging whether the sensing information satisfies the first condition, and controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range; and a receiver that acquires moving operation information of the different autonomous mobile robot, wherein the operations further include judging based on the moving operation information, whether or not the different autonomous mobile robot is performing moving operation, and in the case where it is judged that the different autonomous mobile robot is not performing the moving operation, controlling the transmitter not to output the collision preventing signal even if it is judged that the sensing information satisfies the first condition.

12. An autonomous mobile robot comprising:

a sensor that acquires sensing information by sensing at least one of a situation around the autonomous mobile robot and a state of the autonomous mobile robot;

storage that stores a first condition;

a transmitter; and a processor that, in operation, performs operations including judging whether the sensing information satisfies the first condition, and controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range, wherein the sensor includes a first sensor that detects a radio signal, and the first condition is that the first sensor detects a radio signal from at least one of a charger that charges the autonomous mobile robot, and a virtual wall device that defines a virtual wall.

13. An autonomous mobile robot comprising:

a sensor that acquires sensing information by sensing at least one of a situation around the autonomous mobile robot and a state of the autonomous mobile robot;

storage that stores a first condition;

a transmitter; and a processor that, in operation, performs operations including judging whether the sensing information satisfies the first condition, and controlling the transmitter to output a collision preventing signal to a predetermined range outside of the autonomous mobile robot when it is judged that the sensing information satisfies the first condition, the collision preventing signal being a signal that inhibits a different autonomous mobile robot from entering the predetermined range, wherein the sensor includes a first sensor that detects an obstacle is entangled with the autonomous mobile robot, and the first condition is that the first sensor detects that an obstacle is entangled on a wheel of the autonomous mobile robot.

* * * * *